US008858315B2

(12) United States Patent
Yamauchi

(10) Patent No.: US 8,858,315 B2
(45) Date of Patent: Oct. 14, 2014

(54) GAMING MACHINE, GAMING SYSTEM, AND GAMING METHOD

(75) Inventor: Hiromoto Yamauchi, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 164 days.

(21) Appl. No.: 13/403,881

(22) Filed: Feb. 23, 2012

(65) Prior Publication Data

US 2013/0225253 A1 Aug. 29, 2013

(51) Int. Cl.
*A63F 13/06* (2006.01)

(52) U.S. Cl.
USPC .................... 463/16; 463/17; 463/19; 463/20

(58) Field of Classification Search
USPC .......................................... 463/16, 17, 19, 20
See application file for complete search history.

(56) References Cited

U.S. PATENT DOCUMENTS

2003/0199309 A1* 10/2003 DeMar et al. .................. 463/20
2004/0176157 A1* 9/2004 Walker et al. .................. 463/16
2008/0058067 A1 3/2008 Okada et al.
2008/0058072 A1 3/2008 Okada et al.
2010/0292000 A1* 11/2010 Hornik et al. .................. 463/29

* cited by examiner

*Primary Examiner* — Dmitry Suhol
*Assistant Examiner* — Brandon Gray
(74) *Attorney, Agent, or Firm* — Lexyoume IP Meister, PLLC

(57) ABSTRACT

In a gaming machine, a controller executes a base game, and triggers the bonus game including a plurality of unit games when a result of the base game satisfies a predetermined condition. The controller determines reachable cells of the character in each unit game of the bonus game. The controller determines an expected value of an award provided in each reachable cell by distributing predetermined credits to the reachable cells in each unit game. The controller determines a number of cells by which the character moves along with the course in each unit game, moves the character to any one of the reachable cells according to the number of cells in each unit game, and determines an award to be provided to the player according to the expected value of a cell at which the character arrives in each unit game.

11 Claims, 60 Drawing Sheets

FIG. 28

| RANK | EXPECTED VALUE |
| --- | --- |
| RANK #1 | 30 |
| RANK #2 | 50 |
| RANK #3 | 75 |
| RANK #4 | 100 |
| RANK #5 | 150 |
| RANK #6 | 200 |
| RANK #7 | 250 |
| RANK #8 | 300 |
| RANK #9 | 350 |
| RANK #10 | 400 |
| RANK #11 | 500 |
| RANK #12 | 600 |
| RANK #13 | 700 |
| RANK #14 | 1000 |

FIG. 34A

REACHABEL CELL

| BUMPY PATH | STEADY PATH |
|---|---|
| EVENT 10 | EVENT 14 |
| | |
| | |
| | |
| | |

UNREACHABEL CELL

| BUMPY PATH | STEADY PATH |
|---|---|
| EVENT 6 | EVENT 13 |
| EVENT 9 | EVENT 12 |
| EVENT 8 | EVENT 11 |
| EVENT 7 | EVENT 15 |
| | |

FIG. 34B

REACHABEL CELL

| BUMPY PATH | STEADY PATH |
|---|---|
| EVENT 9 | EVENT 14 |
| EVENT 10 | EVENT 15 |
| | |
| | |
| | |

UNREACHABEL CELL

| BUMPY PATH | STEADY PATH |
|---|---|
| EVENT 6 | EVENT 13 |
| EVENT 8 | EVENT 12 |
| EVENT 7 | EVENT 11 |
| | |
| | |

FIG. 34C

REACHABEL CELL

| BUMPY PATH | STEADY PATH |
|---|---|
| EVENT 6 | EVENT 11 |
| EVENT 9 | EVENT 12 |
| EVENT 10 | EVENT 13 |
| | |
| | |

UNREACHABEL CELL

| BUMPY PATH | STEADY PATH |
|---|---|
| EVENT 8 | EVENT 15 |
| EVENT 7 | EVENT 14 |
| | |
| | |
| | |

FIG. 34D

REACHABEL CELL

| BUMPY PATH | STEADY PATH |
|---|---|
| EVENT 6 | EVENT 11 |
| EVENT 8 | EVENT 12 |
| EVENT 9 | EVENT 13 |
| EVENT 10 | EVENT 14 |
| | |

UNREACHABEL CELL

| BUMPY PATH | STEADY PATH |
|---|---|
| EVENT 7 | EVENT 15 |
| | |
| | |
| | |
| | |

FIG. 34E

REACHABEL CELL

| BUMPY PATH | STEADY PATH |
|---|---|
| EVENT 6 | EVENT 11 |
| EVENT 7 | EVENT 12 |
| EVENT 8 | EVENT 13 |
| EVENT 9 | EVENT 14 |
| EVENT 10 | EVENT 15 |

UNREACHABEL CELL

| BUMPY PATH | STEADY PATH |
|---|---|
| | |
| | |
| | |
| | |
| | |

FIG. 39

| NUMBER OF REMAINING COUNTS | SPEED FOR INCREMENT BY ONE COUNT |
|---|---|
| 1~2 | ABOUT 2. 10 SEC |
| 3 | ABOUT 1. 70 SEC |
| 4 | ABOUT 1. 30 SEC |
| 5 | ABOUT 1. 20 SEC |
| 6~7 | ABOUT 1. 00 SEC |
| 8~9 | ABOUT 0. 80 SEC |
| 10~11 | ABOUT 0. 70 SEC |
| 12 | ABOUT 0. 60 SEC |
| 13~17 | ABOUT 0. 50 SEC |
| 18~23 | ABOUT 0. 40 SEC |
| 24~30 | ABOUT 0. 30 SEC |
| 31~45 | ABOUT 0. 24 SEC |
| 46~50 | ABOUT 0. 18 SEC |
| 51~80 | ABOUT 0. 16 SEC |
| 81~100 | ABOUT 0. 13 SEC |
| 101~ | SWITCH |

FIG. 40

| TIMES | SECONDS |
|---|---|
| LESS THAN 1 TIME | 0.5 SEC |
| 1~1.5 TIMES | 1 SEC |
| 1.5~2.5 TIMES | 2 SEC |
| 2.5~3.5 TIMES | 3 SEC |
| 3.5~4.5 TIMES | 4 SEC |
| 4.5~5.5 TIMES | 5 SEC |
| 5.5~6.5 TIMES | 6 SEC |
| 6.5~7.5 TIMES | 7 SEC |
| 7.5~8.5 TIMES | 8 SEC |
| 8.5~9.5 TIMES | 9 SEC |
| 9.5~10.5 TIMES | 10 SEC |
| 10.5~11.5 TIMES | 11 SEC |
| 11.5~12.5 TIMES | 12 SEC |
| 12.5~13.5 TIMES | 13 SEC |
| 13.5~14.5 TIMES | 14 SEC |
| 14.5~15.5 TIMES | 15 SEC |
| 15.5~16.5 TIMES | 16 SEC |
| 16.5~17.5 TIMES | 17 SEC |
| 17.5~18.5 TIMES | 18 SEC |
| 18.5~19.5 TIMES | 19 SEC |
| 19.5~20.5 TIMES | 20 SEC |
| 20.5~21.5 TIMES | 21 SEC |
| 21.5~22.5 TIMES | 22 SEC |
| 22.5~23.5 TIMES | 23 SEC |
| 23.5~24.5 TIMES | 24 SEC |
| 24.5~25 TIMES | 25 SEC |
| 25~50 TIMES | 30 SEC |
| GREATER THAN 50 TIMES | 35 SEC |

GAMING MACHINE, GAMING SYSTEM, AND GAMING METHOD

BACKGROUND (a) Field

The present invention generally relates to a gaming machine, a gaming system, and a gaming method.

(b) Description of the Related Art

A conventional gaming machine includes a display arranged with a plurality of symbols. The gaming machine rearranges the symbols in a unit game, and awards a payout to a player according to the combination of rearranged symbols (for example, United State Patent Application Publication No. 2008/0058067 and United State Patent Application Publication No. 2008/0058072). The player can start another unit game after one unit game ends.

However, in the conventional gaming machine, although the unit games are repeatedly executed, there is continuity of the unit games. Since the conventional gaming machine does not provide the continuity of the unit games, it is difficult to attract a player's interest in a game.

SUMMARY

Aspects of the present invention provide a gaming machine, a gaming system, and a gaming method for providing continuity of games.

According to an aspect of the present invention, a gaming machine including a first display, a second display, and a controller is provided. The first display displays a base game image in a base game and displays a bonus game image in a bonus game. The second display displays a map including a plurality of cells that form a course on which a character of a player moves in the bonus game. The controller executes the base game, triggers the bonus game including a plurality of unit games when a result of the base game satisfies a predetermined condition, and determines reachable cells of the character in each unit game of the bonus game. The reachable cells are cells at which the character can arrive from the current cell among the plurality of cells. The controller further determines an expected value of an award provided in each reachable cell by distributing predetermined credits to the reachable cells in each unit game, and determines a number of cells by which the character moves along with the course in each unit game. The controller further moves the character to any one of the reachable cells according to the number of cells in each unit game, and determines an award to be provided to the player according to the expected value of a cell at which the character arrives in each unit game.

When each of the reachable cells corresponds to any one of a plurality of events having respective levels, the controller may calculate a sum of the levels of the events corresponding to the reachable cells. Further, the controller may calculate an expected value of a level one by dividing the predetermined credits by the sum, and determine the expected value of each reachable cell based on a product of the level of the event corresponding to each reachable cell and the expected value of the level one.

The gaming machine may further include a memory configured to store data representing a plurality of ranks to which a plurality of expected values are respectively allocated. The controller may determine the product as the expected value of each reachable cell if the product is equal to any one of the plurality of expected values allocated to the plurality of ranks. The controller may determine any one of a first expected value and a second expected value as the expected value of each reachable cell if the product is between the first and second expected values allocated to two adjacent ranks among the plurality of ranks.

The controller may determine the first expected value as the expected value of each reachable cell with a probability corresponding to a difference between the second expected value and the product divided by a difference between the second expected value and the first expected value. The controller may determine the second expected value as the expected value of each reachable cell with a probability corresponding to a difference between the first expected value and the product divided by a difference between the first expected value and the second expected value.

When the reachable cells include a goal cell corresponding to a goal point of the course and each of reachable cells prior to the goal cell corresponds to any one of a plurality of events having respective levels, the controller may calculate a sum of the levels of the events corresponding to the reachable cells prior to the goal cell. Further, the controller may calculate an expected value of a level one by dividing the predetermined credits by the sum, and determine the expected value of each reachable cell prior to the goal cell based on a product of the level of the event corresponding to each reachable cell and the expected value of the level one.

When the reachable cells include a turning cell corresponding to a turning point having a plurality of paths including a first path and a second path to be selected by the player, the controller may determine any one of a plurality of events having respective levels be allocated to a reachable cell on the first path, and determine any one of the plurality of events to be allocated to a reachable cell on the second path.

The controller may calculate a sum of the levels of the events corresponding to reachable cells that is prior to the turning cell or is located on any one of the plurality of paths, calculate an expected value of a level one by dividing the predetermined credits by the sum, and determine the expected value of each reachable cell based on a product of the level of the event corresponding to each reachable cell and the expected value of the level one.

A sum of the levels of the events corresponding to the reachable cells on the first path may be equal to a sum of the levels of the events corresponding to the reachable cells on the second path.

The controller may determine any one of the plurality of events to be allocated to a cell on the first path that does not belong to the reachable cells, and determine any one of the plurality of events to be allocated to a cell on the second path that does not belong to the reachable cells.

The controller may display a die in the first display each time the unit game is executed, determine a face of the die that is uppermost according to an input of the player, and determine a number in the face of the die as the number of cells by which the character moves.

According to another aspect of the present invention, a gaming system including a plurality of main displays for a plurality of players, a common display installed on the main displays, and a controller is provided. Each main display displays a bonus game image in the bonus game including a plurality of unit games. The common display displays maps for the players, and each map includes a plurality of cells that form a course on which a character of a corresponding player moves in the bonus game. The controller determines reachable cells of the character in each unit game of the bonus game, and the reachable cells are cells at which the character can arrive from the current cell among the plurality of cells. Further, the controller determines an expected value of an award provided in each reachable cell by distributing predetermined credits to the reachable cells in each unit game, and determines a number of cells by which the character moves along with the course in each unit game. Further, the controller moves the character to any one of the reachable cells according to the number of cells in each unit game, and determines an award to be provided to the player according to the expected value of a cell at which the character arrives in each unit game.

The controller may calculate a sum of the levels of the events corresponding to the reachable cells, and calculate an expected value of a level one by dividing the predetermined credits by the sum. Further, the controller may determine the expected value of each reachable cell based on a product of the level of the event corresponding to each reachable cell and the expected value of the level one.

The controller may determine the product as the expected value of each reachable cell if the product is equal to any one of a plurality of expected values that are respectively allocated to a plurality of ranks. The controller may determine any one of a first expected value and a second expected value as the expected value of each reachable cell if the product is between the first and second expected values allocated to two adjacent ranks among the plurality of ranks.

The controller may determine the first expected value as the expected value of each reachable cell with a probability corresponding to a difference between the second expected value and the product divided by a difference between the second expected value and the first expected value. The controller may determine the second expected value as the expected value of each reachable cell with a probability corresponding to a difference between the first expected value and the product divided by a difference between the first expected value and the second expected value.

When the reachable cells include a turning cell corresponding to a turning point having a plurality of paths including a first path and a second path to be selected by the player, the controller may determine any one of a plurality of events having respective levels be allocated to a reachable cell on the first path and determine any one of the plurality of events to be allocated to a reachable cell on the second path. Further, the controller may determine any one of the plurality of events to be allocated to a cell on the first path that does not belong to the reachable cells, and determine any one of the plurality of events to be allocated to a cell on the second path that does not belong to the reachable cells.

A sum of the levels of the events corresponding to the reachable cells on the first path may be equal to a sum of the levels of the events corresponding to the reachable cells on the second path.

According to yet another aspect of the present invention, a gaming method of a gaming machine including a first display and a second display is provided. The method includes displaying a base game image on the first display in a base game, executing the base game, and triggering a bonus game including a plurality of unit games when a result of the base game satisfies a predetermined condition. The method further includes displaying a map for a player on the second display in the bonus game, and the map includes a plurality of cells that form a course on which a character of the player moves. The method further includes determining reachable cells of the character in each unit game of the bonus game, and the reachable cells are cells at which the character can arrive from the current cell among the plurality of cells. The method further includes determining an expected value of an award provided in each reachable cell by distributing predetermined credits to the reachable cells in each unit game, determining a number of cells by which the character moves along with the course in each unit game, moving the character to any one of the reachable cells according to the number of cells in each unit game, and determining an award to provided to the player according to the expected value of a cell at which the character arrives in each unit game.

Determining the expected value may include calculating a sum of the levels of the events corresponding to the reachable cells, calculating an expected value of a level one by dividing the predetermined credits by the sum, and determining the expected value of each reachable cell based on a product of the level of the event corresponding to each reachable cell and the expected value of the level one.

Determining the expected value of each reachable cell may include determining the product as the expected value of each reachable cell if the product is equal to any one of a plurality of expected values that are respectively allocated to a plurality of ranks. Determining the expected value of each reachable cell may include determining any one of a first expected value and a second expected value as the expected value of each reachable cell if the product is between the first and second expected values allocated to two adjacent ranks among the plurality of ranks.

Determining any one of the first expected value and the second expected value may include determining the first expected value as the expected value of each reachable cell with a probability corresponding to a difference between the second expected value and the product divided by a difference between the second expected value and the first expected value. Determining any one of the first expected value and the second expected value may include determining the second expected value as the expected value of each reachable cell with a probability corresponding to a difference between the first expected value and the product divided by a difference between the first expected value and the second expected value.

BRIEF DESCRIPTION OF THE DRAWINGS

FIG. 28 shows an example of data representing a relationship between a plurality of ranks and a plurality of expected values.

FIG. 34A to FIG. 34E show examples of event tables for cases shown in FIG. 33A to FIG. 33E.

FIG. 39 shows an example of a table representing a relationship between a speed for increment by one count and the number of remaining counts.

FIG. 40 shows an example of a table representing a relationship between a speed for incrementing a value of credits and times between an award and a magnitude of a BET.

DETAILED DESCRIPTION

Figure 1:
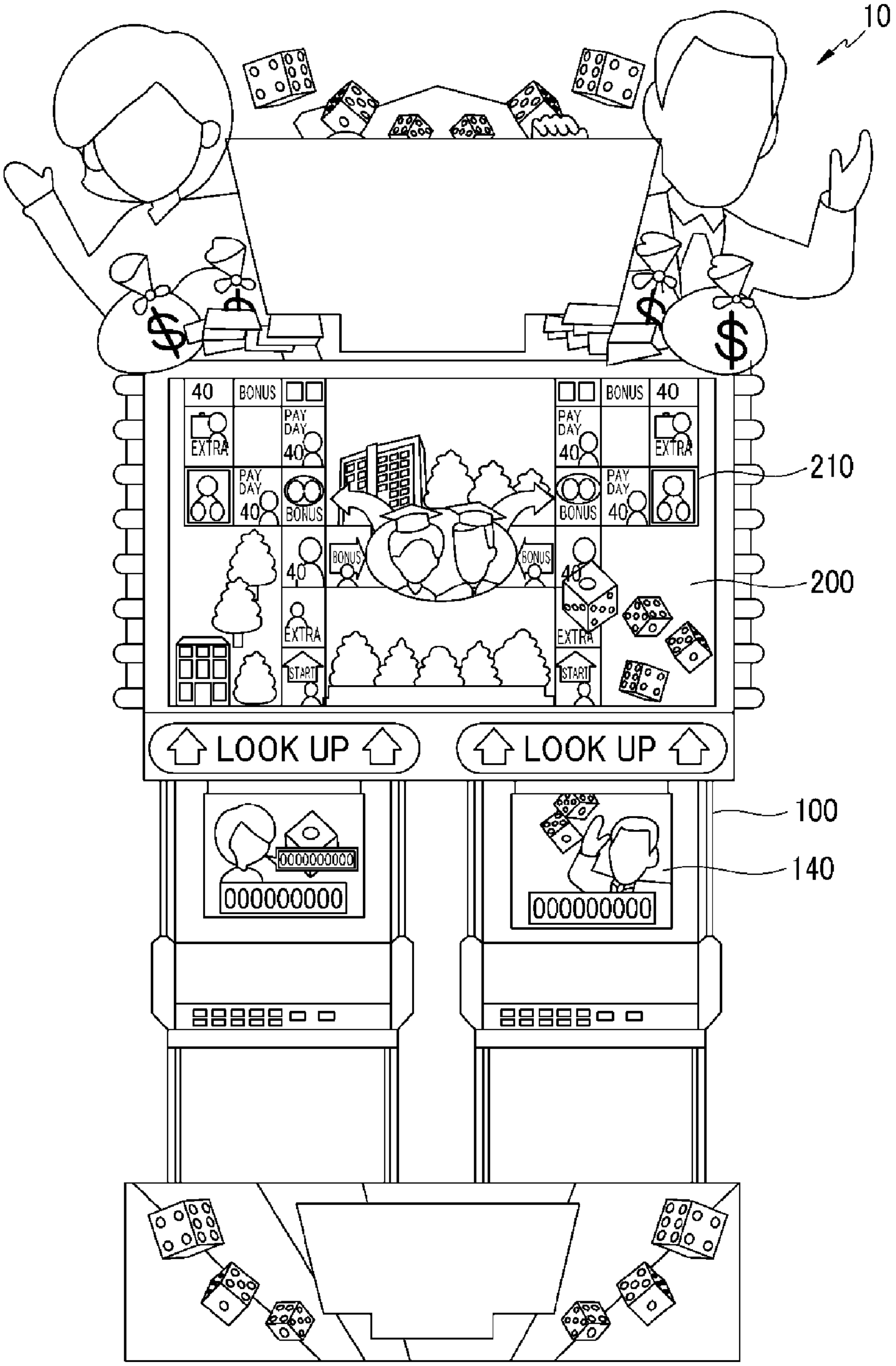
FIG. 1 is a front view of a gaming system according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A gaming machine, a gaming system, and a gaming method thereof according to embodiments of the present invention are described in detail with reference to the accompanying drawings.

Figure 2:
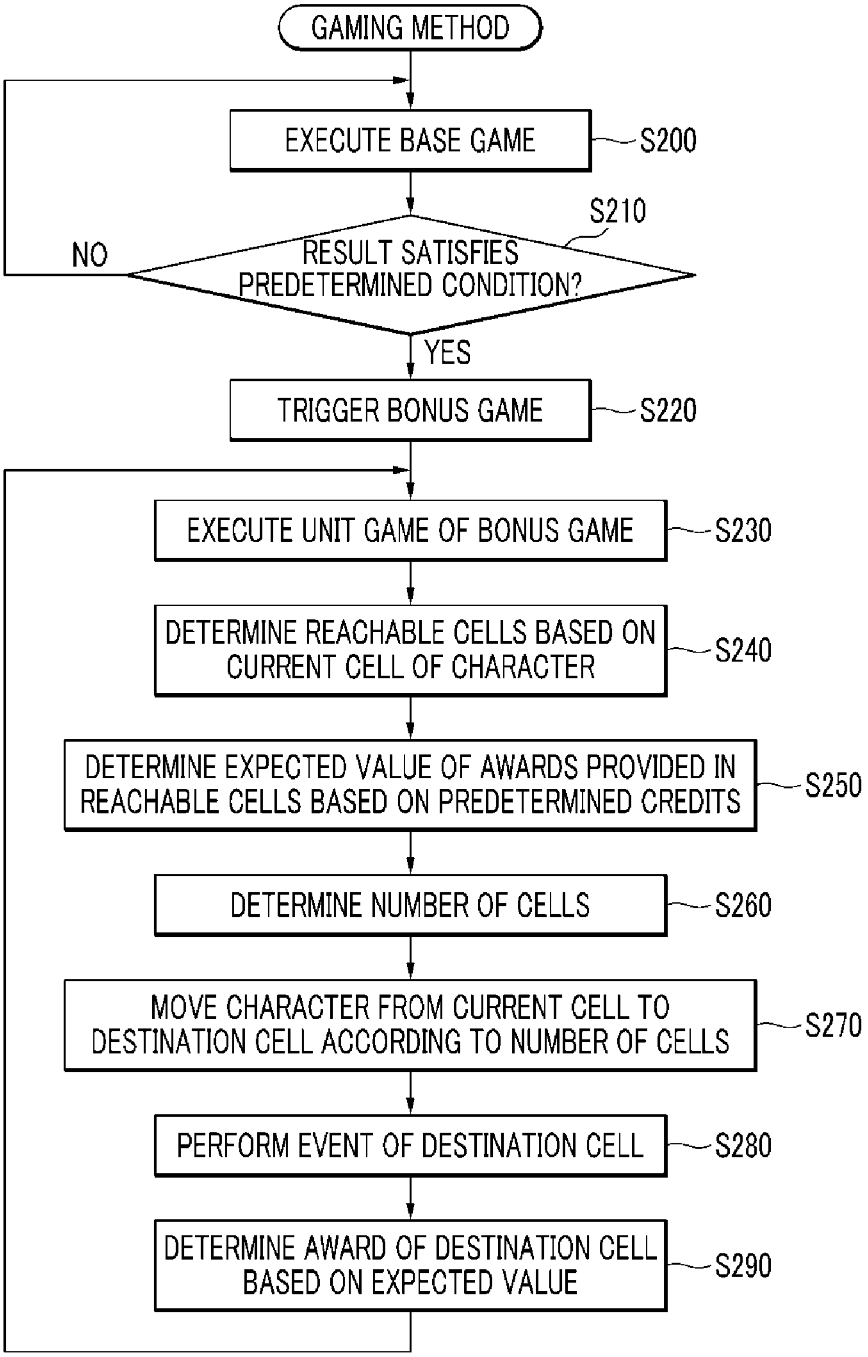
FIG. 2 is a flowchart of a gaming method according to an embodiment of the present invention.

FIG. 1 is a front view of a gaming system according to an embodiment of the present invention, and FIG. 2 is a flowchart of a gaming method according to an embodiment of the present invention.

Referring to FIG. 1, a gaming system 10 includes a plurality of gaming machines 100 and a common display 200 installed on the gaming machines 100. The gaming machines 100 are disposed side by side, and are connected via a wire or wireless network. Each gaming machine 100 includes a main display 140 disposed below the common display 200.

In another embodiment, each gaming machine 100 may include a top display installed on the main display 140. In this case, the common display 200 of the gaming system 10 is replaced by top displays of the gaming machines 100.

The common display 200 displays a map 210 including a plurality of cells forming courses in each unit game of a bonus game. Characters corresponding to players of the gaming machines 100 move along with the courses of the map 210 in each unit game. The cells may represent various events. The main display 140 displays images for a base game and the bonus game.

Referring to FIG. 1 and FIG. 2, each gaming machine 100 displays a plurality of symbols for the base game in the main display 140, and executes the base game to rearrange the symbols according to an input of a corresponding player (S200). When a result of the base game, i.e., a combination of the rearranged symbols satisfies a predetermined condition (S210: YES), the gaming machine 100 or the gaming system 10 triggers the bonus game (S220).

When the bonus game is triggered, the gaming machine 100 or the gaming system 10 displays the map 210 in the common display 200 and executes a unit game of the bonus game (S230). The gaming machine 100 or the gaming system 10 determines reachable cells of the character based on a current cell at which the character is located (S240). The reachable cells are cells at which the character can arrive among the plurality of cells of the map 210. The gaming machine 100 or the gaming system 10 distributes predetermined credits to the reachable cells to determine an expected value of an award provided in each reachable cell (S250).

Next, the gaming machine 100 or the gaming system 10 determines the number of cells by which the character moves along with the course in the unit game (S260), and moves the character of the player from the current cell to a destination cell according to the number of cells in the unit game (S270). In this case, the gamine machine 100 or the gaming system 10 may randomly determine the number of cells according to an input of the player, and the number of cells may be represented by a number indicated by a die. In the case that the number of cells is represented by a number indicated by the die, the number of reachable cells is six.

When the character arrives at the destination cell, the gamine machine 100 or the gaming system 10 performs an event corresponding to the destination cell (S280). Further, the gamine machine 100 or the gaming system 10 determines an award of the destination cell based on the expected value of the destination cell and provides the award of the destination cell to the player (S290). That is, the award is controlled by the expected value. When the award of the destination cell is a fixed credit value, the fixed credit value corresponds to the expected value. When the award of the destination cell is determined by any one of a plurality of credit values, a weighted average of the credit values corresponds to the expected value.

After providing the award of the destination cell to the player, the gaming machine 100 or the gaming system set the destination cell to a current cell, and execute a next unit game again (S230). Then, the character can start from the current cell, i.e., the destination cell of a previous unit game. That is, the current unit game is continued to the next unit game. At this time, the gaming machine 100 or the gaming system may require the player to bet another credits to execute the next unit game.

As described above, according to an embodiment of the present invention, since the current unit game is continued to the next unit game in the bonus game, the player can continuously play a plurality of unit games in the bonus game. As a result, the gaming machine can attract the player's interest. Further, since the predetermined credits are distributed to reachable cells of the current cell each time the unit game is executed, the expected value of the award provided in the unit game can be maintained at a uniform value. Accordingly, the gaming machine or the gaming system can prevent the player from increasing a bet amount in a unit game that can provide a greater award.

Next, a structure of a gaming machine according to an embodiment of the present invention will be described with reference to FIG. 3 to FIG. 5.

Figure 3:
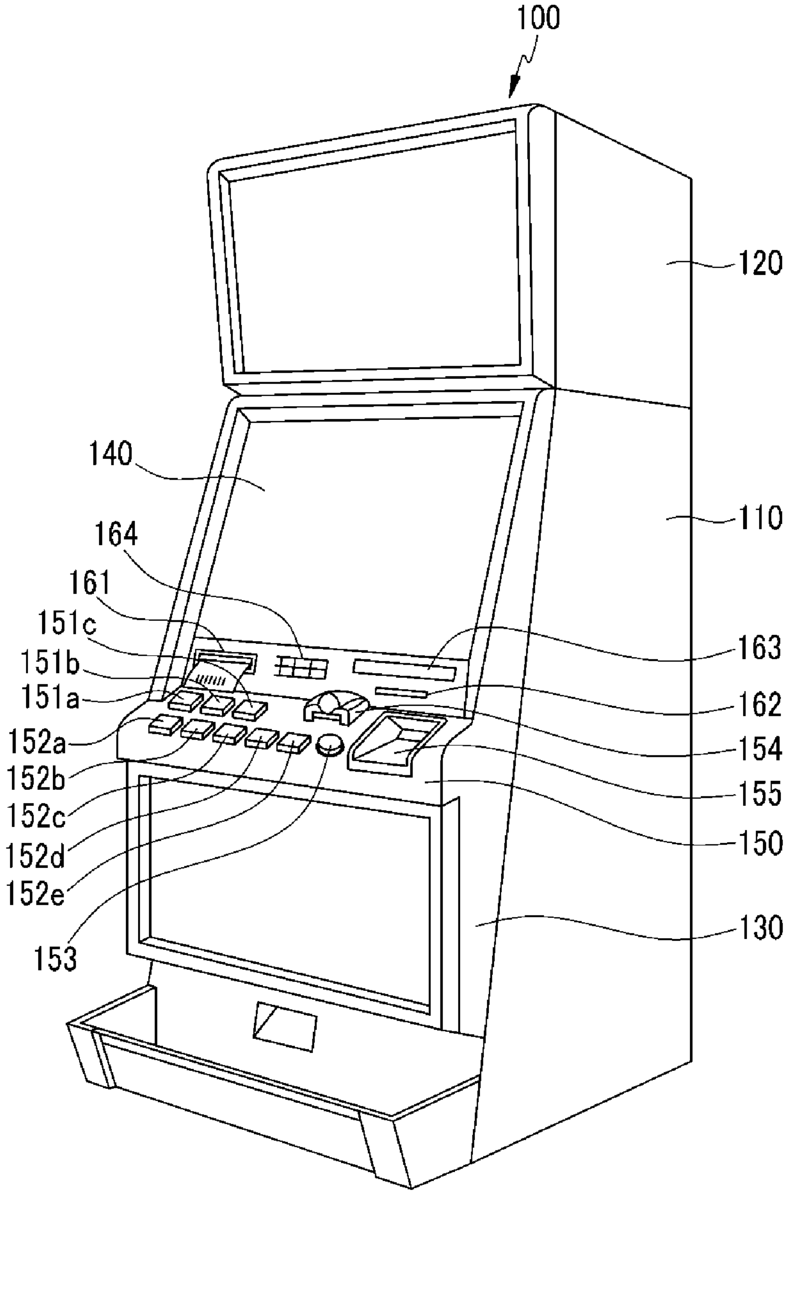
FIG. 3 is a perspective view of a gaming machine according to an embodiment of the present invention.
Figure 4A:
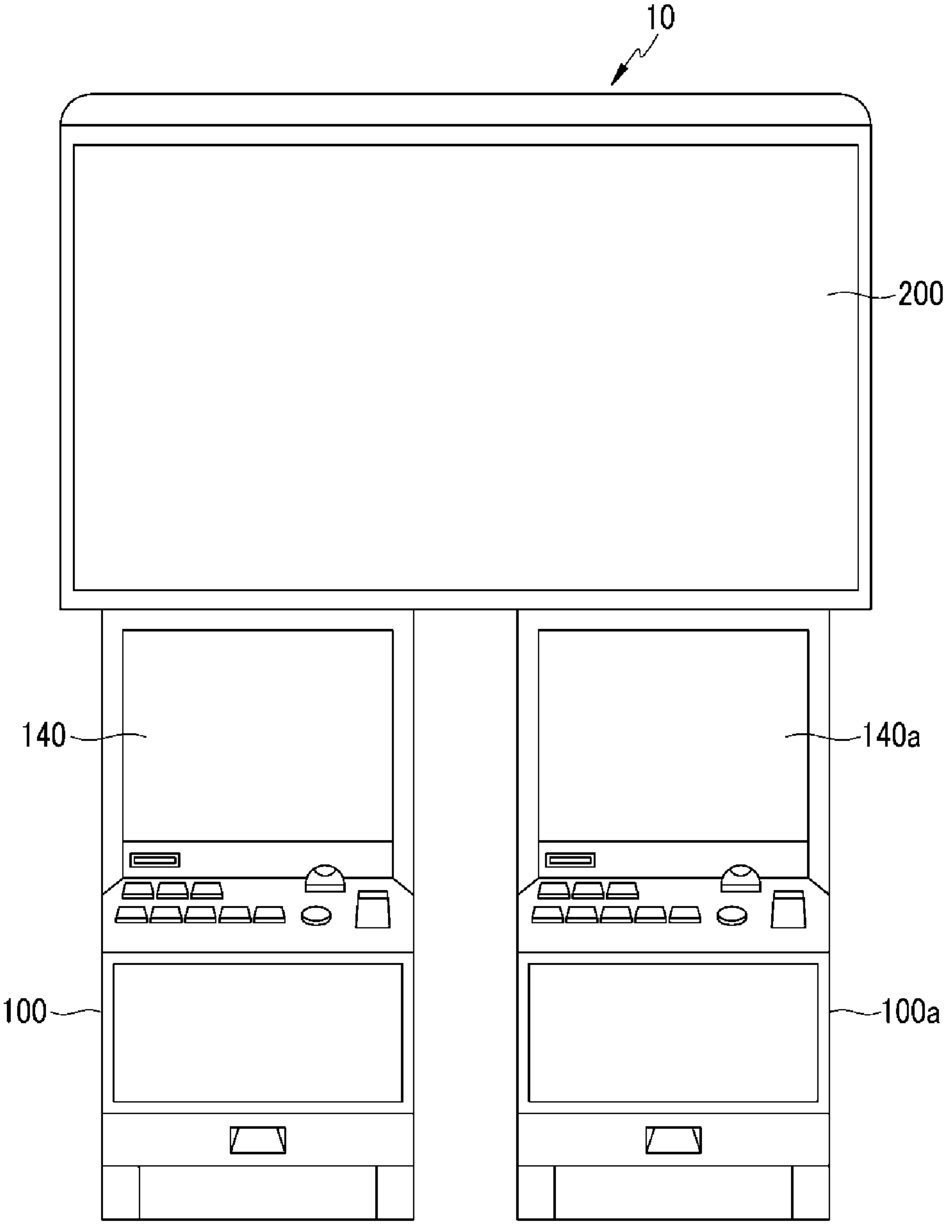
FIG. 4A is a schematic front view of a gaming system according to an embodiment of the present invention.
Figure 4B:
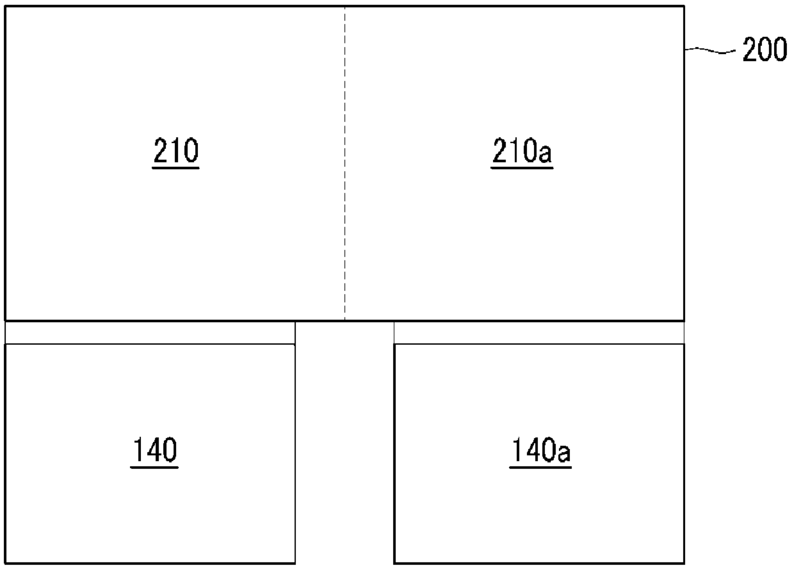
FIG. 4B shows a common display and main displays of a gaming system according to an embodiment of the present invention.
Figure 5:
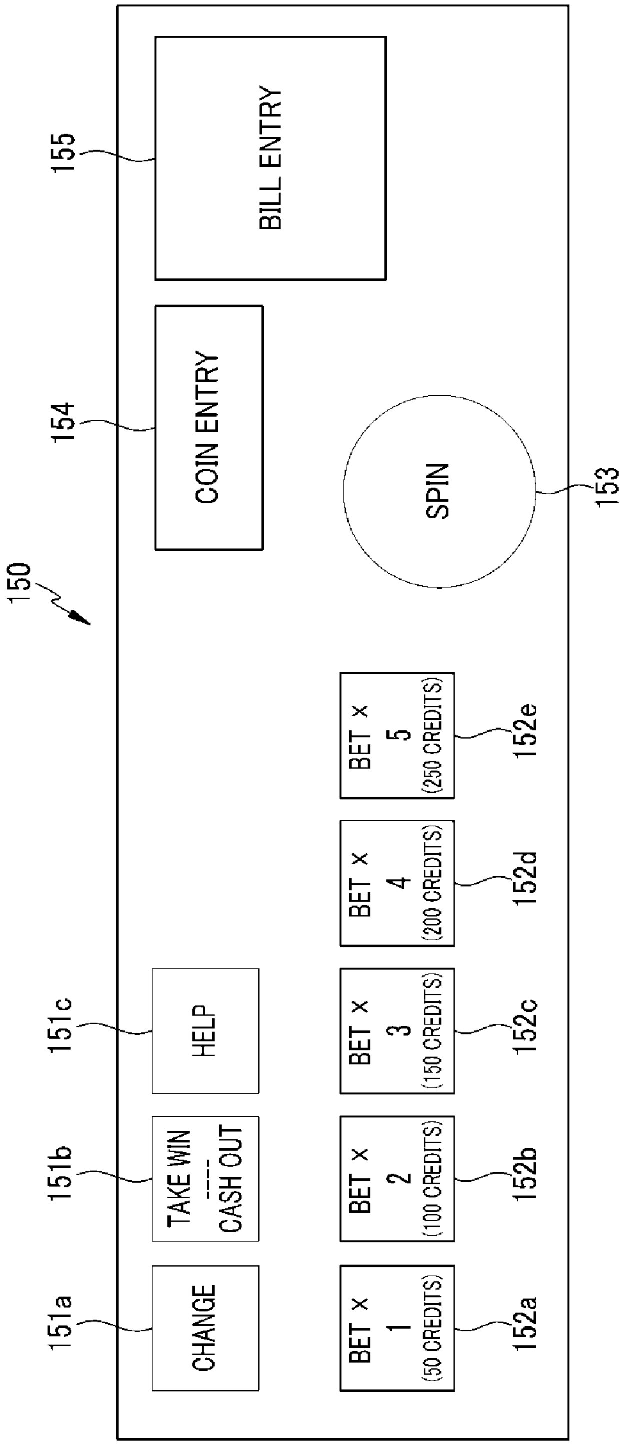
FIG. 5 shows a control panel of a gaming machine according to an embodiment of the present invention.

FIG. 3 is a perspective view of a gaming machine according to an embodiment of the present invention, FIG. 4A is a schematic front view of a gaming system according to an embodiment of the present invention, FIG. 4B shows a common display and main displays of a gaming system according to an embodiment of the present invention, and FIG. 5 shows a control panel of a gaming machine according to an embodiment of the present invention.

In a gaming machine 100 according to an embodiment of the present invention, a coin, a bill or a ticket having a barcode is used as a gaming medium. Alternatively, credit-related data such as money data, stored in a smart card may be used as the gaming medium.

Referring to FIG. 3, a gaming machine 100 includes a cabinet 110, a top display 120 installed at an upper side of the cabinet 110, and a main door 130 provided on a front face of the cabinet 110.

The top display 120 is installed on the cabinet 110 of the gaming machine 100. The top display 120 includes a display panel for displaying a variety of information. An example of the display panel may be a liquid crystal display (LCD) panel or an organic light emitting diode (OLED) panel. The top display 120 displays images related to a bonus game or images related to a versus event.

As shown in FIG. 4A, in another embodiment, one top display 200 may be installed on the cabinets of two adjacent gaming machines 100 and 100*a*, and may be shared by the two adjacent gaming machines 100 and 100*a*. That is, one top display 200 is a common display of the two gaming machines 100 and 100*a*. The common display 200 and the adjacent gaming machines 100 and 100*a* forms a gaming system 10. In this case, the common display 200 and the main displays 140 and 140*a* of the two gaming machines 100 and 100*a* are disposed as shown in FIG. 4B. The common display 200 includes a top display portion 210 corresponding to the gaming machine 100 and a top display portion 210*a* corresponding to the gaming machine 100*a*.

Referring to FIG. 3 again, the gaming machine 100 further includes a main display 140 provided on the main door 130. The main display 140 includes a display panel for displaying a variety of information, and the display panel may be a touch screen panel that enables a player to interact with the gaming machine 100 by touching areas on a screen. An example of the display panel may be an LCD panel or an OLED panel. The main display 140 displays a display window including video reels for scroll-displaying and arranging a plurality of symbols in a base game, and displays a variety of game-related information or images as required. This embodiment exemplifies a case where the main display 140 electrically displays a plurality of symbols in fifteen display blocks formed by five columns and three rows. Further, a pay line is generated by connecting five display blocks that are placed on the five columns, respectively. For example, a total of 30 pay lines may be generated. The pay lines are configured to establish a variety of winning combinations.

In addition, in a bonus game, the main display 140 displays images related to the bonus game. The images related to the bonus game include a die image and an image for throwing the die.

The gaming machine 100 further includes a control panel 150 disposed below the main display 140. The control panel 150 includes a variety of buttons 151*a*-151*c*, 152*a*-152*e*, and 153, a coin entry 154, and a bill entry 155.

The control panel 150, as shown in FIG. 5, includes a change button 151*a*, a take win button 151*b*, and a help button 151*c* that are disposed at an upper stage in a left side region toward the panel. The control panel 150 further includes BET×1 button 152*a*, a BET×2 button 152*b*, BET×3 button 152*c*, a BET×4 button 152*d*, and BET×5 button 152*e* that are disposed at a middle stage in a left side region. The control panel 150 further includes a coin entry 154 and a bill entry 155 that are disposed at an upper stage in a right side region toward the panel, and a spin button 153 that is disposed at a lower stage in a right side region.

The change button 151*a* is an operating button to be used when a player wants to leave a seat or when a player wants to request the staffs in a gaming facility to exchange money. The take win button 151*b* is a cash out button used to add the credit data relating to credits obtained in a variety of games to the credit data that is stored in the smart card or output the bill or the ticket corresponding to the total credits. The help button 151*c* is a button to be used in a case where a game operation method or the like is unclear, and when the help button 151*c* is pushed, a variety of help information is displayed on the main display 140.

The BET×1 button 152*a* is a button to be used when player's current credits are betted on a one-by-one basis for each winning pay line every time the button is pushed. In this embodiment, an amount of 1 BET may correspond to 50 credits. The BET×2 button 152*b* is a button for starting a game in 2 BETs for each winning pay line. In addition, the BET×3 button 152*c* is a button for starting a game by placing 3 BETs for each winning pay line. Further, the BET×4 button 152*d* is a button for starting a game by placing 4 BETs for each winning pay line. Furthermore, the BET×5 button 152*e* is a button for starting a game by placing 5 BETs for each winning pay line. Therefore, a BET amount to for winning pay lines is determined by pushing any one of the BET×1 button 152*a*, the BET×2 button 152*b*, the BET×3 button 152*c*, the BET×4 button 152*d*, and the BET×5 button 152*e*. If the player bets N BETs by pushing the BET×N button, default credits (for example 50 credits) of the winning pay lines are multiplied by N such that the multiplied credits are awarded to the player. Further, the player can bet (N+M) BETs by continuously pushing the BET×N button and the BET×M button. At this time, the gaming machine 100 may restrict an upper limit of the BET amount, and the upper limit of the BET amount may be 10 BETs.

The spin button 153 is an operating button to be used when scrolling symbols in the base game and when throwing the die or selecting any situation in the bonus game. The coin entry 154 is configured to accept the coin in the cabinet 110. The bill entry 155 is configured to validate whether the entered bill is legitimate or not and to accept a legitimate bill in the cabinet 110. Further, the bill entry 155 can accept the ticket having the barcode.

Referring to FIG. 3 again, a ticket printer 161, a card reader 162, a data display 163, and a keypad 164 are provided below the main display 140.

The ticket printer 161 prints, on a ticket, a barcode having encoded data containing credit-value, date and time, identification number of a gaming machine 100, or the like, and issues the ticket 161*a* having the barcode attached thereto. A player can play a game in another gaming machine with the ticket 161*a* having the barcode, or exchange the ticket 161*a* having the barcode for bills or the like at a change booth or the like of the game arcade.

The card reader 162 reads/writes data from/to a smart card. The smart card is carried by a player, and stores therein data for identifying the player, data relating to the history of games played by the player, or the like.

The data displayer 163 includes a fluorescent display or the like, and displays the data read by the card reader 162 and the data input by the player through the keypad 164. The keypad 164 is for entering instructions or data relating to issuing of the ticket or the like.

Further, the gaming machine 100 may further include a speaker (not shown) for outputting effect sounds.

Figure 6A:
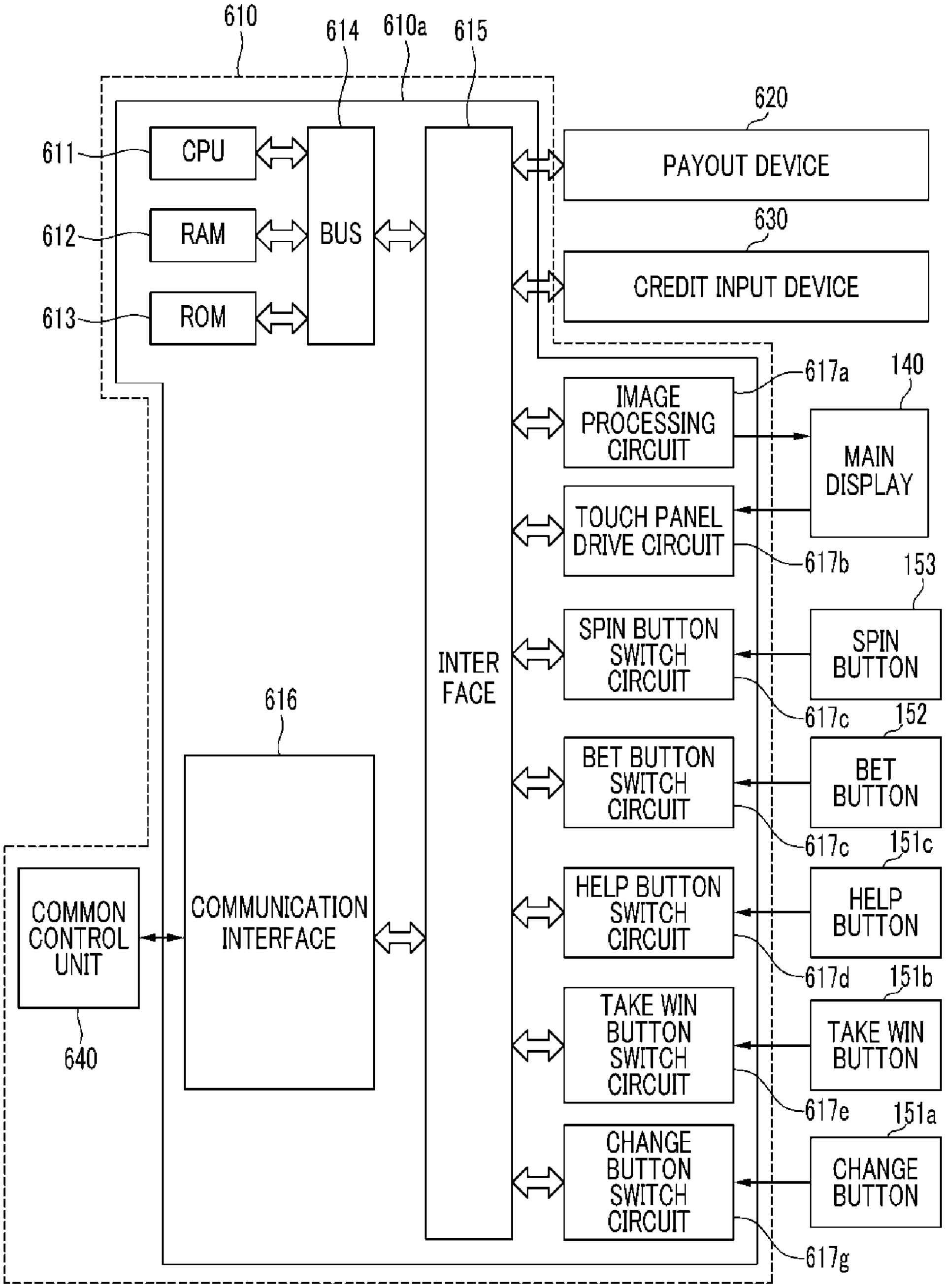
FIG. 6A is a schematic block diagram of a gaming machine according to an embodiment of the present invention.
Figure 6B:
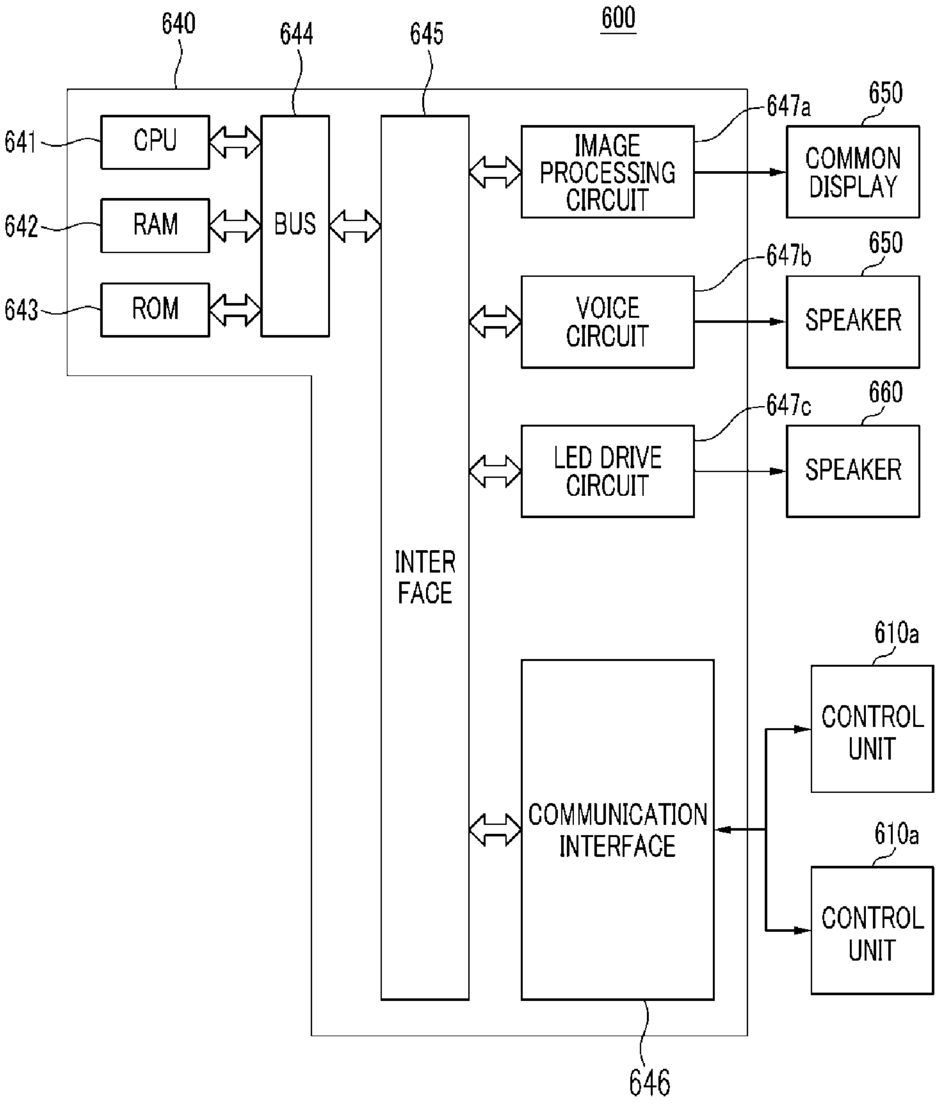
FIG. 6B is a schematic block diagram of a common unit of a gaming system according to an embodiment of the present invention.

FIG. 6A is a schematic block diagram of a gaming machine according to an embodiment of the present invention, and FIG. 6B is a schematic block diagram of a common unit of a gaming system according to an embodiment of the present invention.

Referring to FIG. 6A, a gaming machine 100 includes a controller 610, a payout device 620, a credit input device 630, a main display 140, and a plurality of button 151*a*, 151*b*, 151*c*, 152, and 153.

The controller 610 includes a control unit 610*a* and a common control unit 640. The control unit 610*a* includes a control processing unit (CPU) 611, a random access memory (RAM) 612, a storage device 613, a bus 614, an interface 615, a communication interface 616, and a plurality of circuits.

The storage device 613 may a read only memory (ROM), and stores a variety of programs for performing processing that is required to control the gaming machine 100, table data, and image data. The RAM 612 temporarily stores the number of credits accumulated in the gaming machine 100 or a variety of data computed by the CPU 611. The bus 614 transfers data between the CPU 611, the RAM 612, and the storage device 613.

The CPU 611 is connected via the interface 615, to the payout device 620, the credit input device 630, the plurality of circuits, and the communication interface 616. The plurality of circuits include an image processing circuit 617*a*, a touch panel drive circuit 617*b*, a spin button switch circuit 617*c*, a plurality of BET button switch circuits 617*d*, a help button switch circuit 617*e*, a take win button switch circuit 617*f*, and a change button switch circuit 617*g*.

The main display 140 is connected to the image processing circuit 617*a* and the touch panel drive circuit 617*b*, the spin button 153 is connected to the spin button switch circuit 617*c*, and the BET button switch circuits 617*d* are connected to a plurality of BET buttons 152, for example BET×1, BET×2, BET×3, BET×4, and BET×5 buttons (152*a* to 152*e* of FIG. 5). The help button 151*c* is connected to the help button switch circuit 617*e*, the take win button 151*b* is connected to the take win button switch circuit 617*f*, and the change button 151*a* is connected to the change button switch circuit 617*g*. Each of the switch circuits 617*a* to 617*g* outputs a signal to the CPU 611 when a corresponding button is pushed.

The common control unit 640 is connected to the communication interface 616. The common control unit 640 is shared by the gaming machine 100 and a neighbor gaming machine 100*a*. In another embodiment, the common control unit 640 may be not shared by the two gaming machines 100 and 100*a*, and each gaming machine may have own common control unit.

Various button switch circuit 617*c* to 617*g* may include a pressure sensor (not shown), and may be configured to be able to sense strength of a player's operation for a corresponding button.

The payout device 620 performs payout processing based on a control signal from the CPU 611. The payout processing may include payout of gaming media such as coins, bills, chips or tickets, or liquidation of cards such as credit cards.

The credit input device 630 accepts input of gaming media such as coins, bills, chips or tickets, or cards such as credit cards, and an input amount is stored in the RAM 612 with a predetermined amount being one credit. The credit input device 630 may be a coin entry (154 of FIG. 3) or a bill entry (155 of FIG. 3).

Referring to FIG. 6B, the gaming system includes a common unit 600 shared by the adjacent gaming machines 100. In another embodiment, the common unit may be not shared by the adjacent gaming machines 100, and each gaming machine 100 may have own common unit.

The common unit 600 includes a common control unit (640 of FIG. 6A), a common display 200, a speaker 650, and a light emitting device 660.

The common control unit 640 includes a CPU 641, a RAM 642, a storage device 643, a bus 644, an interface 645, a communication interface 646, a plurality of circuits 647.

The storage device 643 may a ROM, and stores a variety of programs for performing processing that is required to control the gaming machine 100, table data, and image data. In particular, the storage device 643 includes map pattern data for generating a map of a bonus game. The RAM 22 642 temporarily stores a variety of data computed by the CPU 641. The bus 644 transfers data between the CPU 641, the RAM 642, and the storage device 643.

The CPU 641 is connected via the interface 645 to plurality of circuits 647 and the communication interface 646. The plurality of circuits 647 include an image processing circuit 647*a*, a voice circuit 647*b*, and an light emitting device drive circuit 647*c*.

The common display 200 is connected to the image processing circuit 647*a*, and the speaker 650 is connected to the voice circuit 647*b*. The light emitting device 660 is connected to the light emitting device drive circuit 647*c*, and may include a plurality of light emitting diodes (LEDs).

The communication interface 646 is connected to control units (610*a* of FIG. 6A) of the adjacent gaming machines 100.

The CPU 641 controls a game based on the programs stored in the storage device 643 and a variety of signals received from the gaming machines 100, displays an image on the common display 200 in accordance with the progress of a game, outputs a sound from the speaker 650, and lights the LEDs 660.

In an embodiment, the CPU 611 or 641 of the controller 610 executes a variety of processes relating to a game, and a result of the processing are stored in each of the RAMs 612 and 642.

Next, a base game executed in a gaming machine according to an embodiment of the present invention will be described with reference to FIG. 7A, FIG. 7B, FIG. 8, and FIG. 9.

Figure 7A:
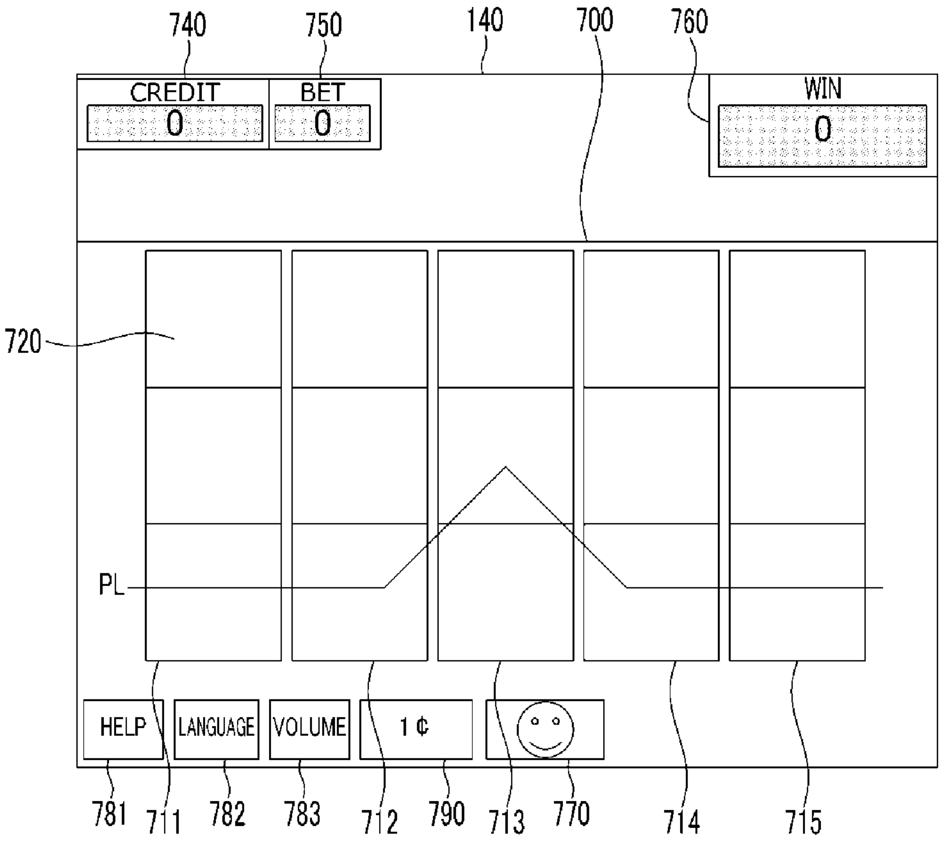
FIG. 7A shows an example of a display picture of a base game according to an embodiment of the present invention.
Figure 7B:
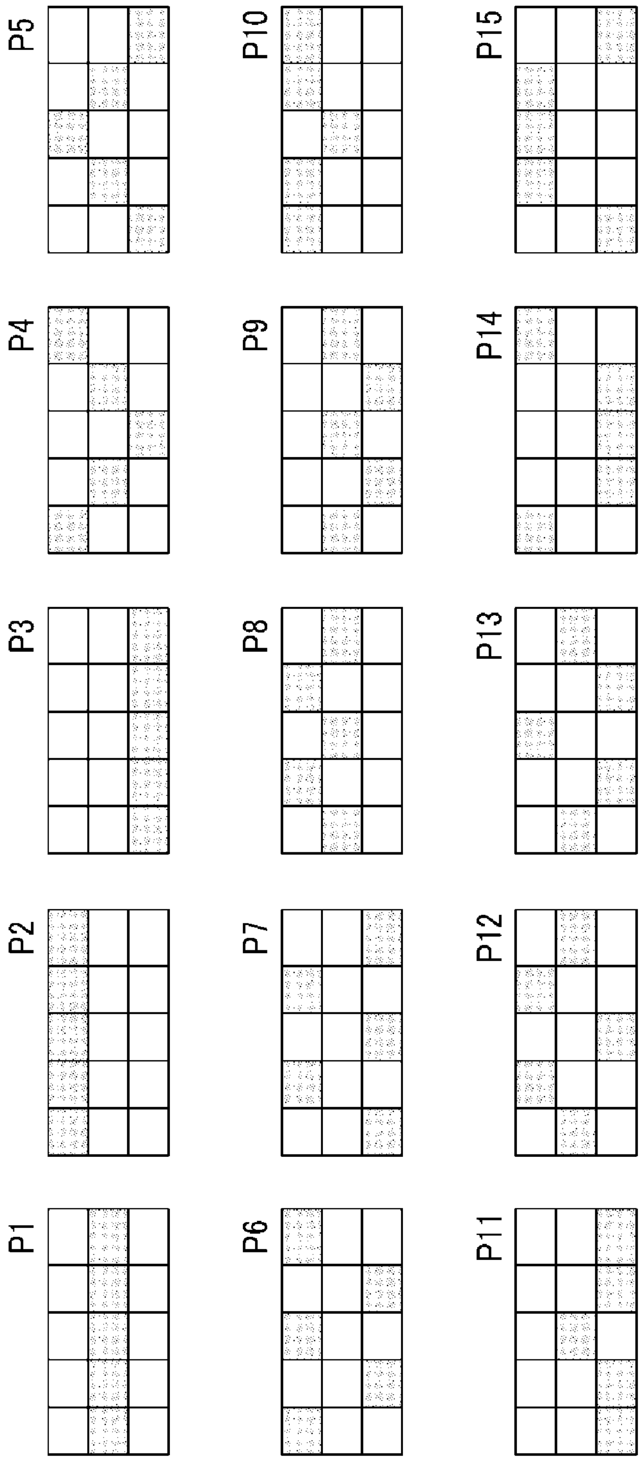
FIG. 7B and FIG. 7C show examples of pay lines of a base game according to an embodiment of the present invention.
Figure 7C:
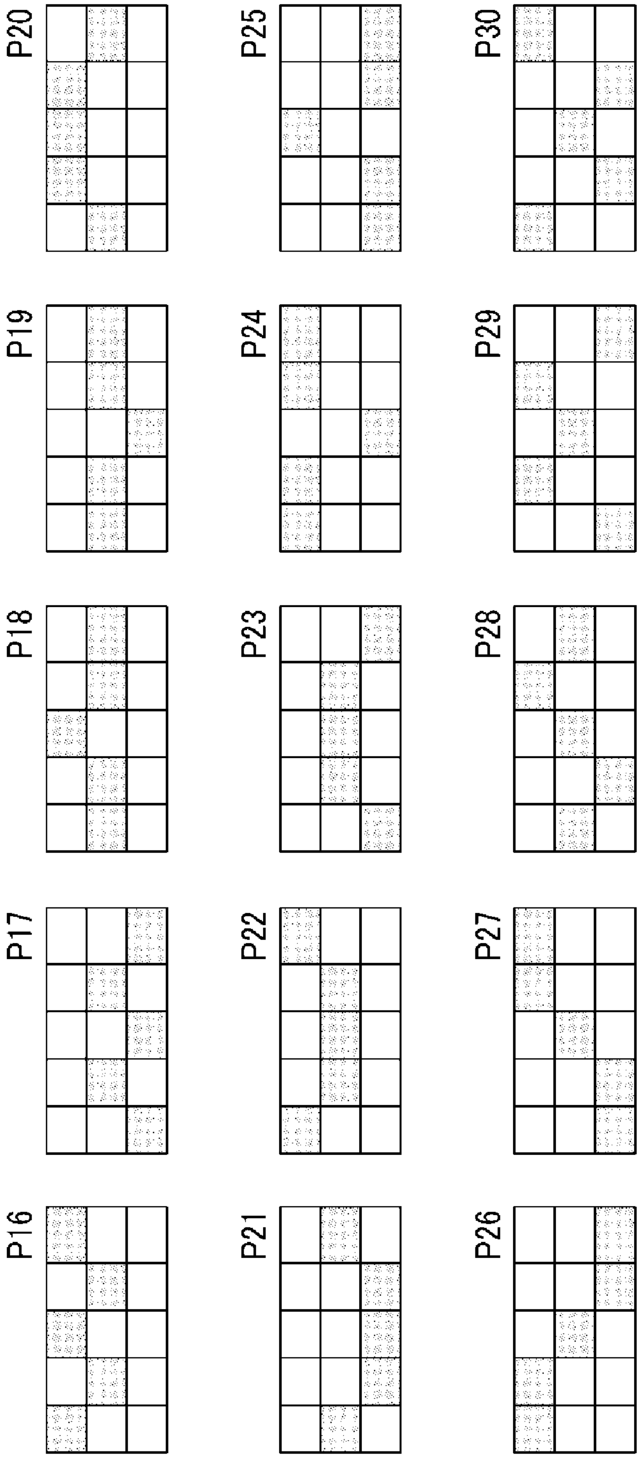
Figure 8:
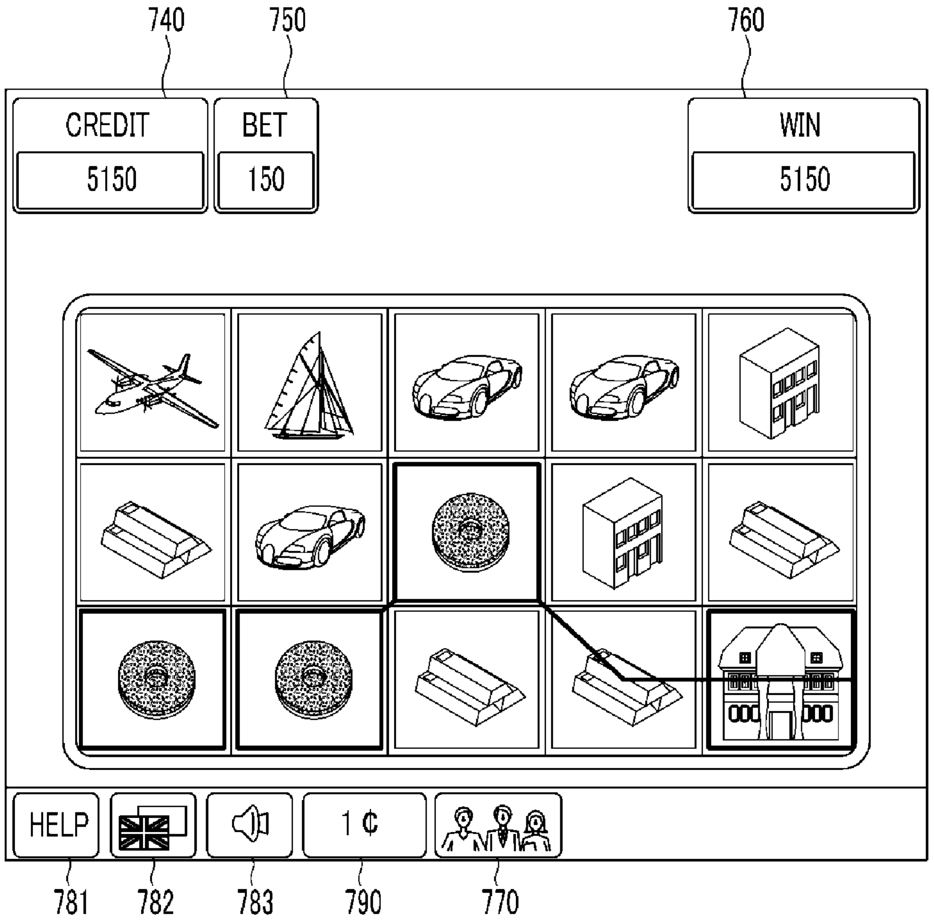
FIG. 8 and FIG. 9 show examples of pictures displayed in a bonus game according to an embodiment of the present invention.
Figure 9:
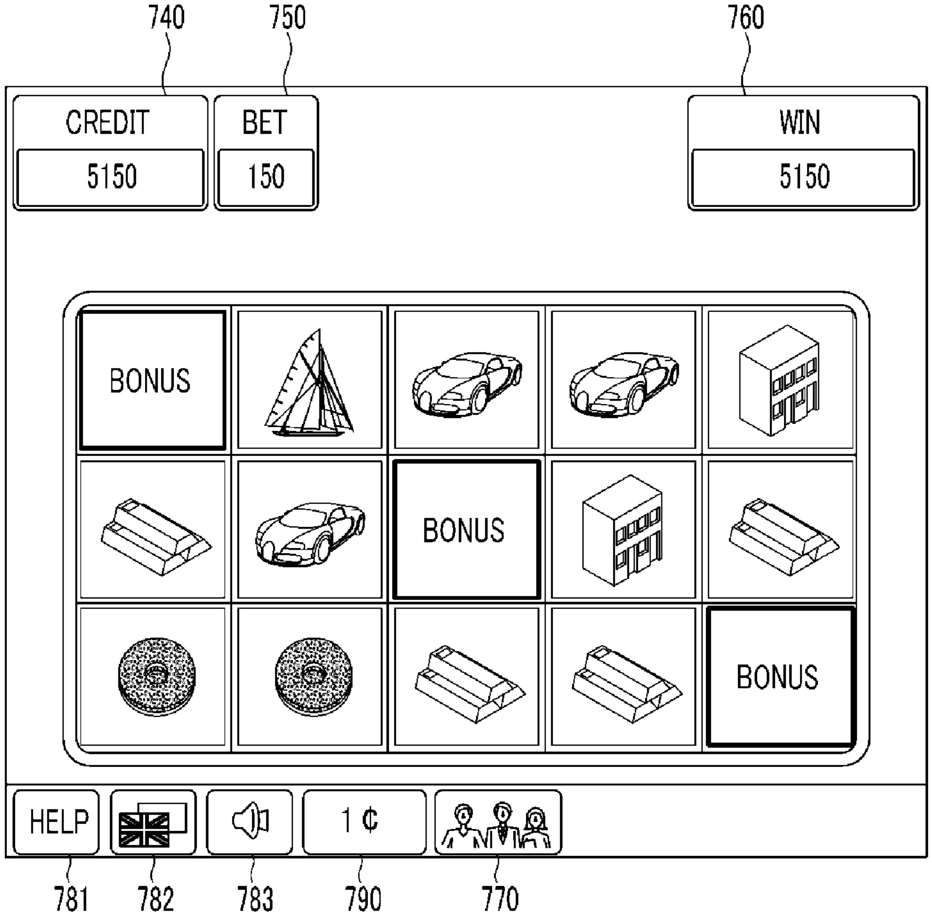

FIG. 7A shows an example of a display picture of a base game according to an embodiment of the present invention, FIG. 7B and FIG. 7C show examples of pay lines of a base game according to an embodiment of the present invention, and FIG. 8 and FIG. 9 show examples of pictures displayed in a bonus game according to an embodiment of the present invention.

Referring to FIG. 7A, a display window 700 including video reels 711 to 715 is displayed in a main display (140 of FIG. 3). The display window 700 includes fifteen display blocks 720 in five columns and three rows. In other words, each of the video reels 711 to 715 includes three display blocks 720. A plurality of symbols are displayed on the video reels 711 to 715 for displaying the base game, and are formed into symbol sequences. Each of the video reels 711 to 715 can enable three display blocks 720 to integrally change speed while moving downward to be displayed (scroll-displayed), so as to carry out the rearrangement that stops the symbols displayed in each display block 720 after spinning the symbols in a vertical direction.

Further, a pay line PL is generated by connecting five display blocks that are placed on the five columns, respectively. Only one pay line PL is drawn in FIG. 7A, but in this example, thirty pay lines P1 to P30 may be generated as shown in FIG. 7B and FIG. 7B.

Referring to FIG. 7B and FIG. 7C, for example, a play line P1 connecting five display blocks of the second row, a play line P2 connecting five display blocks of the first row, and a play line P3 connecting five display blocks of the third row may be generated. Further, a pay line P11 connecting display blocks of the first, second, fourth, and fifth columns at the third row and a display block of the third column at the second row may be generated. Furthermore, a pay line P21 connecting display blocks of the second, third, and fourth columns at the third row and display blocks of the first and fifth columns at the second row may be generated.

In this embodiment, the case in which the gaming machine 100 is a video slot machine is described, but mechanical reels may replace a part of the video reels 711 to 715 in the gaming machine 100.

The symbols forming each symbol sequence are imparted with any code among a plurality of codes. Each symbol sequence includes a symbol combination of symbols such as "BONUS", "GOLD", "BUILDING", "HOUSE", "AIRPLANE", "BOAT", "CAR", and "DONUT".

Three continuous symbols in the symbol sequence are respectively displayed (arranged) at an upper part (the first row), a middle part (the second row), and a lower part (the third row) of a display area of each of the video reels 711 to 715, so as to form a symbol matrix having five columns and three rows in the display window 700. If a spin button (153 of FIG. 3) is pushed to start the base game, the symbols forming the symbol matrix start scrolling. If a predetermined time has passed after the scrolling is started, the scrolling of all symbols is stopped such that the symbols are rearranged. In this case, the gaming machine 100 may generate random numbers for the video reels 711 to 715, and may determine symbols 740 stopped in each video real based on the random number for each video real.

Various winning combinations are predetermined for all symbols, and the winning combinations represent prize winning. The winning combination is a combination where the combination of symbols stopped on the pay line PL becomes a beneficial state for a player. The beneficial state is a state where coins corresponding to winning combinations are to be paid out, a state where the payout value of the coins is to be added to the credit, a state where the bonus game is to be started, or the like.

In this example, the winning combinations refer to cases where at least one type of symbol among the "GOLD", "BUILDING", "HOUSE", "AIRPLANE", "BOAT", "CAR", and "DONUT" are rearranged on the pay lines PL with a number greater than the predetermined number. For example, as shown in FIG. 8, in the cases where the symbols of "DONUT" with the number greater than the predetermined number are stopped on the pay line PL, the payout value of coins (value) obtained by multiplying the basic payout value of "BET" by a magnitude of the BET is paid out.

Regardless of the pay line PL, when a combination of symbols displayed on the video reels 711 to 715 satisfy a predetermined condition, the bonus game is triggered. In this embodiment, as shown in FIG. 9, when symbols of "BONUS" with a number greater than a predetermined number (for example, 3) are displayed on the video reels 711 to 715, the bonus game is triggered.

Referring to FIG. 7A again, a credit display section 740 and a bet display section 750 are displayed on the left side at the upper part of the main display 140, and a win display section 760 is displayed at the right side.

The credit display section 740 displays a player's current credits, and the bet display section 750 displays a bet amount in a current unit game. The bet amount may be displayed as the credits. The win display section 760 displays a payout value of credits at a winning combination.

Further, a character select button 770 is displayed on lower part of the main display 140. The character select button 770 is used to select or change a character of a player for the bonus game, and is operated by touching the character select button 770.

Various buttons 781, 782, and 783 for setting the gaming machine 100 may be displayed on the lower part of the main display 140, and are operated by a touch of the player. The various buttons 781, 782, and 783 includes a help button 781, a language button 782, and a volume button 783. The help button 781, if touched, displays help information on the main display 140. The language button 782, if touched, switches a language of the gaming machine 100 from one language to the other language. The volume button 783, if touched, increases and decreases a volume outputted from the gaming machine 100. Furthermore, a denomination display section 790 may be displayed on the lower part of the main display 140. The denomination display section 790 displays a current denomination.

Next, a bonus game triggered in a base game according to embodiments of the present invention will be described with reference to FIG. 10A to FIG. 20. In FIG. 10A to FIG. 20, processes of the bonus game according to a player's operation in one gaming machine of a gaming system are described, but similar operations may be performed in accordance with a neighbor player's operation in a neighbor gaming machine of the gaming system. Further, a pair of a top display (120 of FIG. 3B) and a main display (140 of FIG. 3A or 3B) is shown in FIG. 10A to FIG. 20, but the top display 120 may be a top display portion (210 of FIG. 4B) of a common display (200 of FIG. 4B).

First, a bonus game triggered when a predetermined condition is satisfied in a base game will described with reference to FIG. 10 to FIG. 12.

Figure 10A:
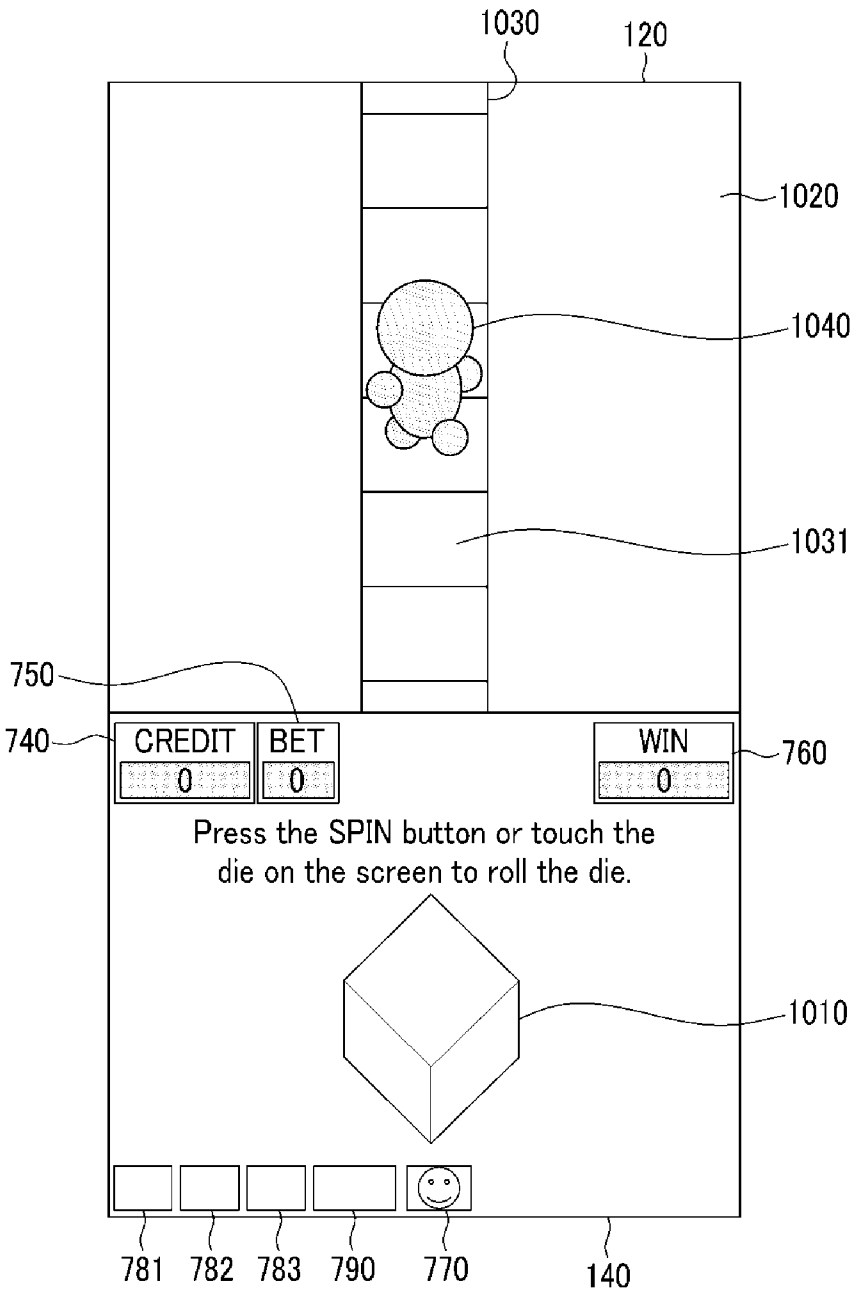
FIG. 10A shows an example of a picture displayed at a start of a unit game in a bonus game according to an embodiment of the present invention.
Figure 10B:
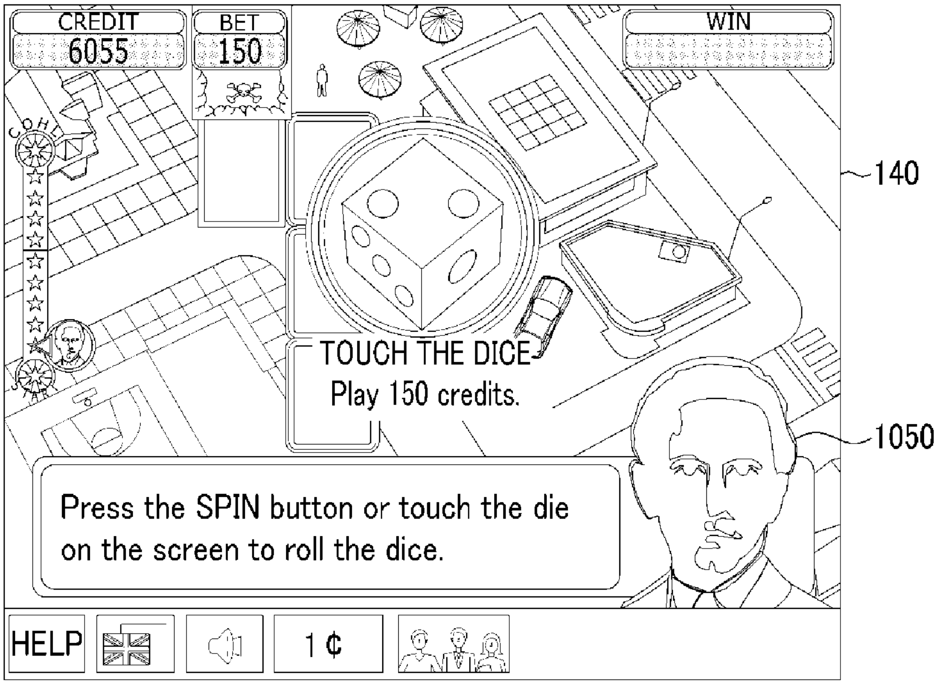
FIG. 10B shows an example of a picture displayed in a main display at a start of a unit game in a bonus game according to an embodiment of the present invention.
Figure 11:
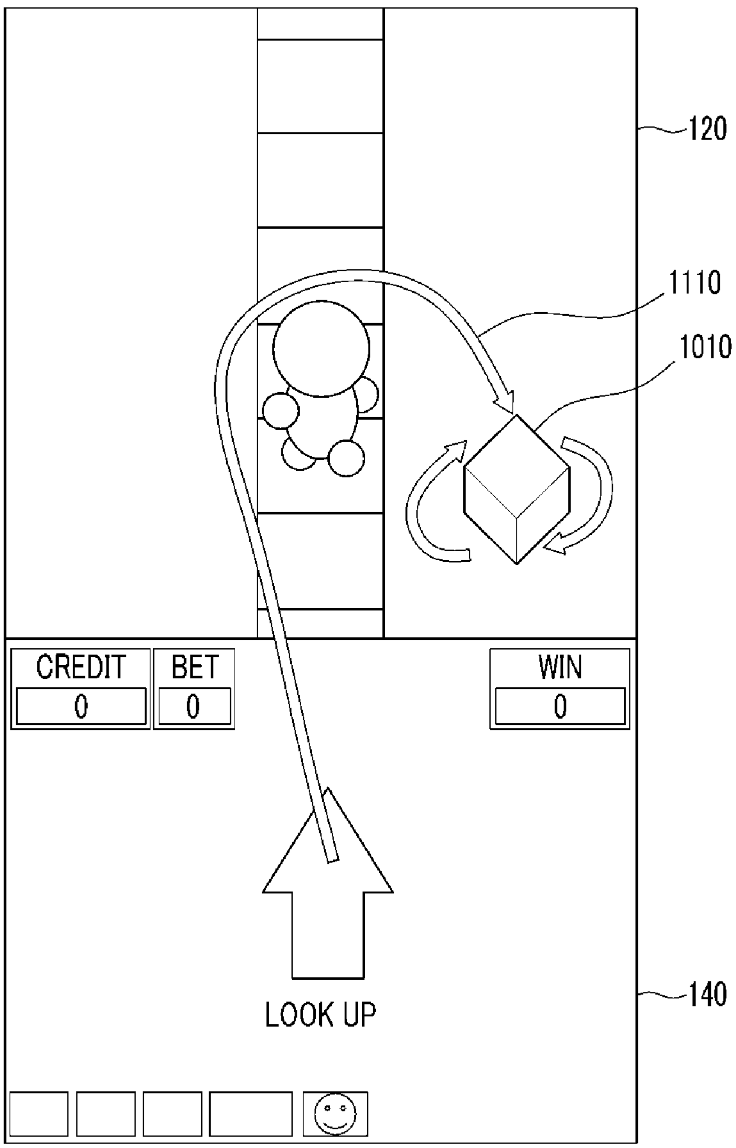
FIG. 11 shows an example of a picture representing rolling of a die in a unit game of a bonus game according to an embodiment of the present invention.
Figure 12:
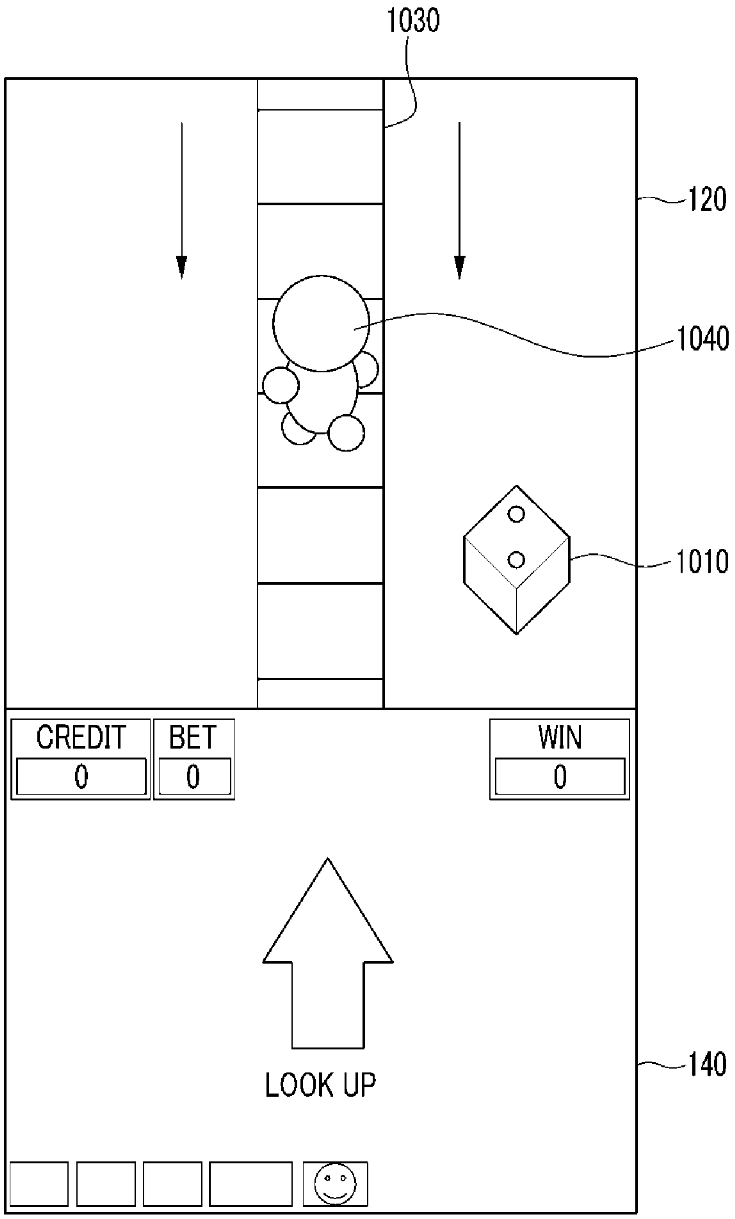
FIG. 12 shows an example of a picture representing a movement of a character in a unit game of a bonus game according to an embodiment of the present invention.

FIG. 10A shows an example of a picture displayed at a start of a unit game in a bonus game according to an embodiment of the present invention, FIG. 10B shows an example of a picture displayed in a main display at a start of a unit game in a bonus game according to an embodiment of the present invention, FIG. 11 shows an example of a picture representing rolling of a die in a unit game of a bonus game according to an embodiment of the present invention, and FIG. 12 shows an example of a picture representing a movement of a character in a unit game of a bonus game according to an embodiment of the present invention.

[A Start of a Unit Game in a Bonus Game]

Referring to FIG. 10A, if a bonus game in the base game is triggered, a unit game of the bonus game starts. In the bonus game, a plurality of unit games may be performed. In each unit game, an image for rolling a die 1010 is displayed in a main display 140 and a display window 1020 including a map 1030 is displayed in a top display 120. Further, a map that is the same as the map 1030 or a part of the map 1030 may be displayed as a background in the main display 140.

In the image for rolling the die 1010, a player can roll the die 1010 by pushing a spin button (220 of FIG. 3) of a gaming machine 100 or by touching an area where the die 1010 is displayed in the main display 140. At this time, a character of a player may be displayed in the main displays 140 and request for rolling of the dice, as shown in FIG. 10B.

In the display window 1020, the map 1030 includes a plurality of cells 1031. The plurality of cells 1031 forms courses, and a character 1040 corresponding to the player can move along with the courses. If the map 1030 is not totally displayed in the top display 120, the map 1030 may be scrolled up or down according to the character's movement. The total map includes a start cell of a start point from which the character starts and a goal cell of a goal point. Further, any one of a plurality of events may be set to each of some cells 1031. Some cells 1031 may be turning points for selecting any one course among a plurality of courses.

At this time, a top display 120 or a top display portion (210*a* of FIG. 4B) of a neighbor gaming machine 100*a* displays a display window that is symmetric to the display window 1020 of the gaming machine 100. In this case, two maps included in the display windows of the two gaming machines may share the goal point.

A character select button 770 of the main display 140 may be activated when the character locates at the start point, and may be inactivated when the character does not locate at the start point.

[Rolling of the Die]

If the player pushes the spin button 220 or touches the area where the die 1010 is displayed, the image of the die 1010 moves from the main display 140 to the top display 120 and an image 1110 representing a status where the die 1010 is being rolled are displayed in the main display 140 and the top display 120, as shown in FIG. 11. Before rolling the die 1010, the player can change BETs for current unit game by pushing any one of BET×1 button (152*a* of FIG. 5), BET×2 button (152*b* of FIG. 5), BET×3 button (152*c* of FIG. 5), BET×4 button (152*d* of FIG. 5), and BET×5 button (152*e* of FIG. 5).

[Movement of the Character]

Next, when rolling of the die 1010 stops, one face of the die 1010 is displayed in the top display 120 as shown in FIG. 12. The one face of the die 1010 indicates any one number among one, two, three, four, five, and six. The number indicated by the die 1010 may be determined based on a random number that is generated by the gaming machine 100 when rolling the die 1010. The character 1040 moves by the number of cells corresponding to the number indicated by the die 1010 such that the character moves from a current cell to a destination cell. When the character 1040 is moving from the current cell to the destination cell, the map 1030 may be scrolled down in the top display 120.

In FIG. 11 and FIG. 12, an image or a text for indicating the player to look the top display 120, for example, "LOOK UP" is displayed in the main display 140. Further, a map that is the same as the map 1030 or a part of the map 1030 may be displayed as a background in the main display 140.

[Events]

When the character arrives at a destination cell according to the number indicated by the die 1010, an event set to the destination cell starts and an effect image for the event is displayed in the top display 120 and/or the main display 140. The event is an event regarding a life, and may be one of a plurality of types. In one embodiment, the plurality of types include a fixed payout type, a random payout type, a selection type, a start over type, a free game type, a turning point type, and a goal point type. The event may provide an award to the player.

An award may be set to an event of a cell and be provided to the player when the player arrives at the cell. The award set to event may be a fixed credit value or be any one of a plurality of credit values. The award set to event may be controlled by an expected value of the credit values which can be provided in the event. When the award is the fixed credit value, the expected value is equal to the fixed credit value. When the award is any one of the credit values, the expected value corresponds to a weighted average of the credit values where weights correspond to probabilities of the credit values.

Further, the event may have any one level of a plurality of level, for example level 1, level 2, level 3, level 4, and level 5. The expected value of the level may be linearly proportional to a level number of the level. For example, when the expected value of the event having the level 1 is 100 credits, the expected value of the event having the level 2 is 200 credits.

[Fixed Payout Type]

Figure 13A:
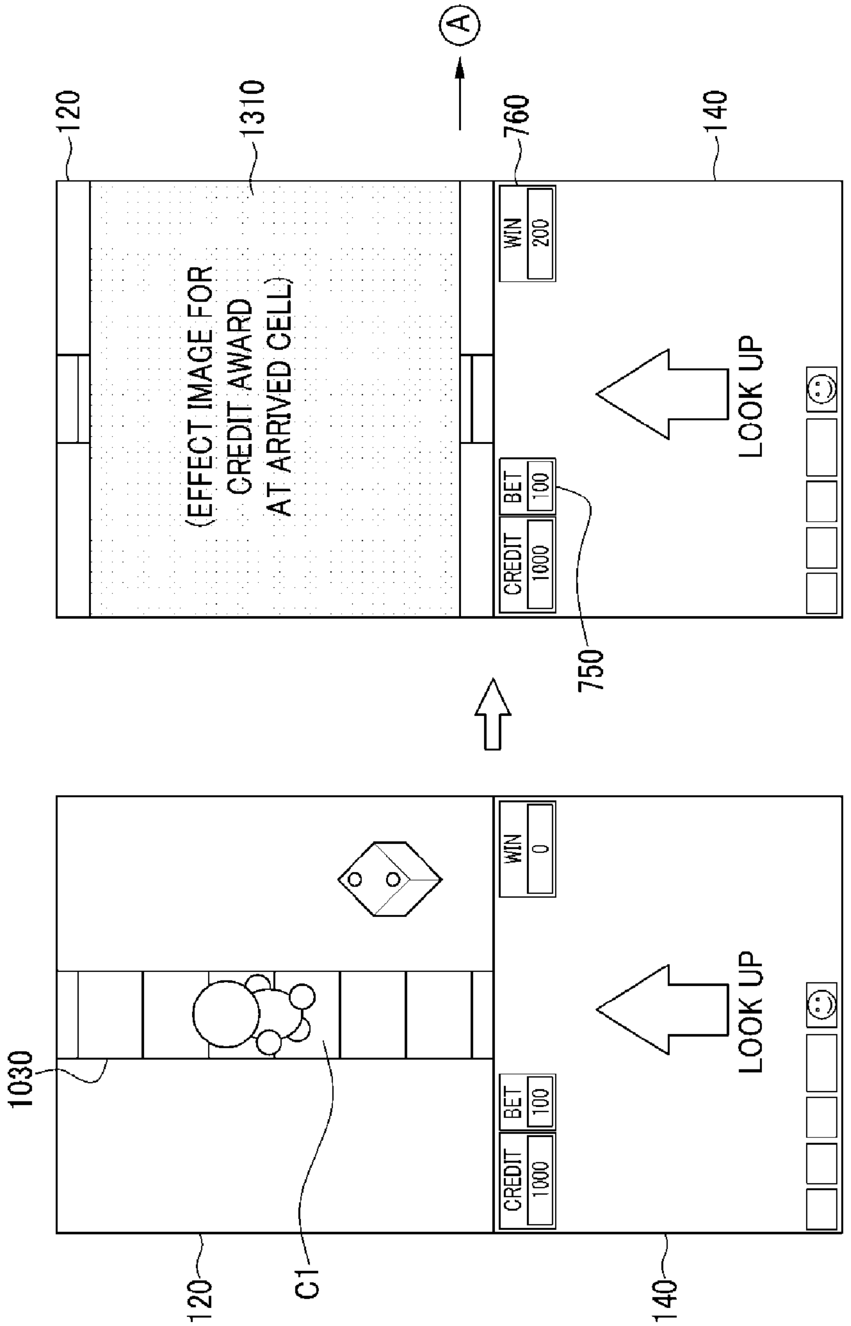
FIG. 13A and FIG. 13B show an example of a fixed payout type event in a bonus game according to an embodiment of the present invention.
Figure 13B:
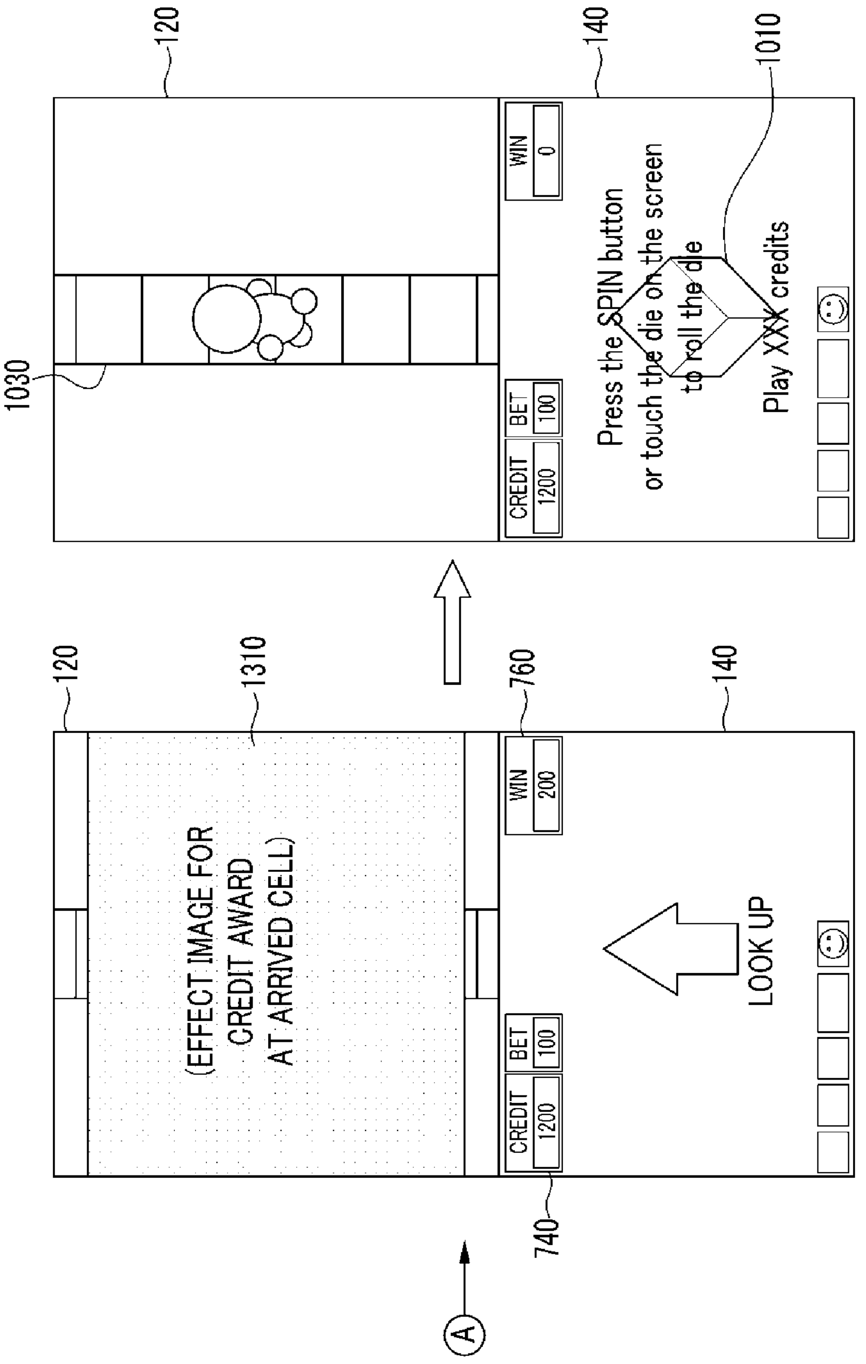

A fixed payout type event is an event for awarding fixed credits to the player when the player arrives at the cell C1 to which the fixed payout type event is set. On the cell C1 to which the fixed payout type event, a credit value corresponding to the fixed credits is shown. In the fixed payout type event, credits corresponding to the credit value set to the cell are awarded to the player. FIG. 13A and FIG. 13B show an example of the fixed payout type event in a bonus game according to an embodiment of the present invention.

When the player arrives at the cell C1, the top display 120 displays an effect image 1310 corresponding to the event and an effect sound corresponding to the event outputs. Next, as shown in FIG. 13A, the top display 120 displays an effect image 1310 for awarding the credits to the player according to the credit value set to the cell C1. At this time, the awarded credits are determined by multiplying the credit value set to the cell C1 by a current BET. For example, if the credit value set to the cell C1 is 100 credits and the player pushes BET×2 button (152*b* of FIG. 5), the awarded credits are 200 credits. A bet display section 750 displays the bet amount as the credits (100 credits in the case of the BET×2 button). The awarded credits (200) are also shown in a win display section 760 of the main display 140. Subsequently, as shown in FIG. 13B, the awarded credits are added to the current credits of the player such that the awarded credits are provided to the player. The added credits are shown in a credit display section 740 of the main display 140. When the effect image for awarding the credits is displayed in the top display 120, the main display 140 displays the image for indicating "LOOK UP".

After the credits are provided to the player, the event ends. The top display 120 displays the map 1030 again, and the main display 140 displays the image for rolling the die 1010 again. In other words, the top display 120 and the main display 140 display images for a next unit game. The player can continue the next unit game using additional credits, and change the bet amount of the next unit game by pushing any one of a BET×1 button (152*a* of FIG. 5), a BET×2 button (152*b* of FIG. 5), a BET×3 button (152*c* of FIG. 5), a BET×4 button (152*d* of FIG. 5), and a BET×5 button (152*e* of FIG. 5).

[Random Payout Type]

Figure 14A:
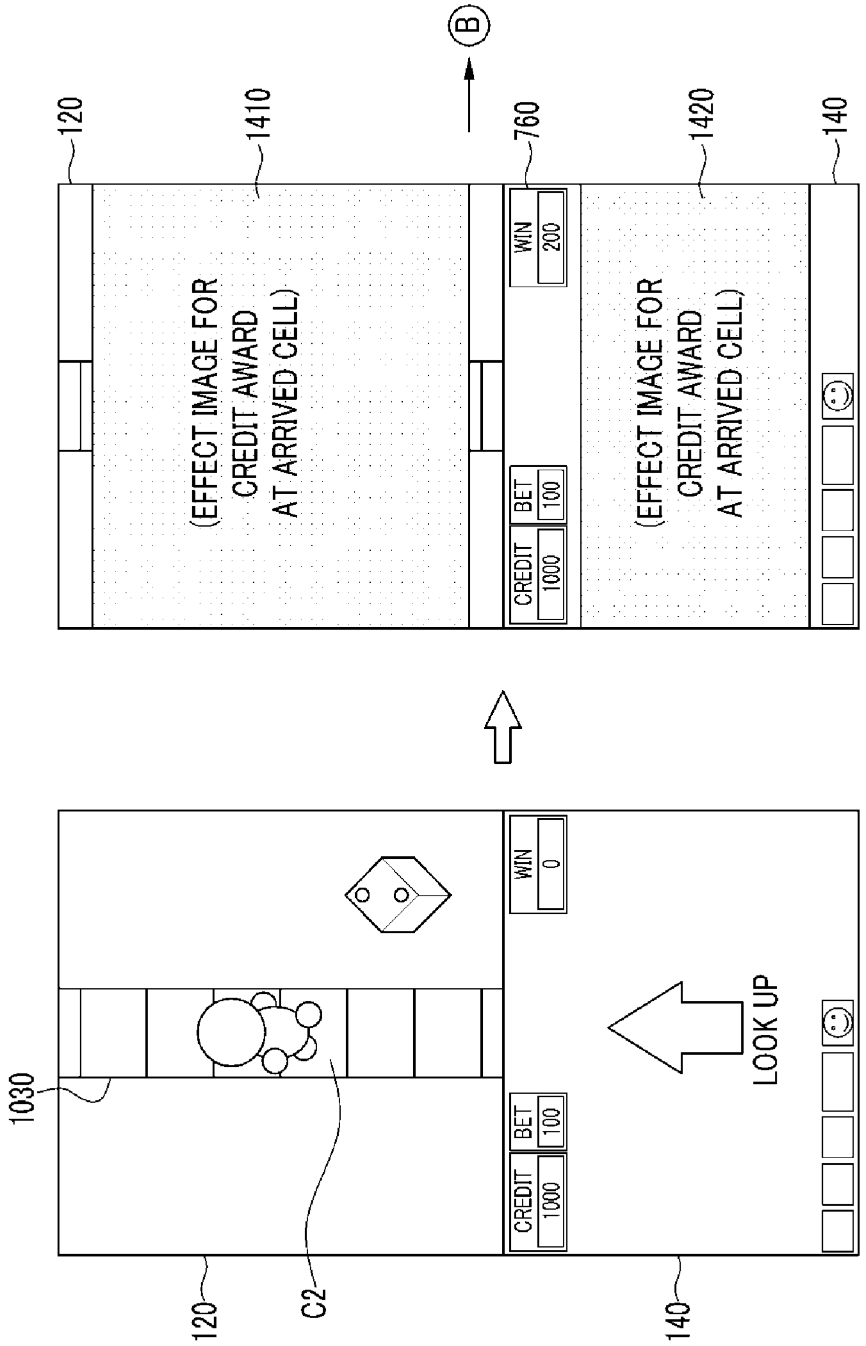
FIG. 14A and FIG. 14B show an example of a random type event in a bonus game according to an embodiment of the present invention.
Figure 14B:
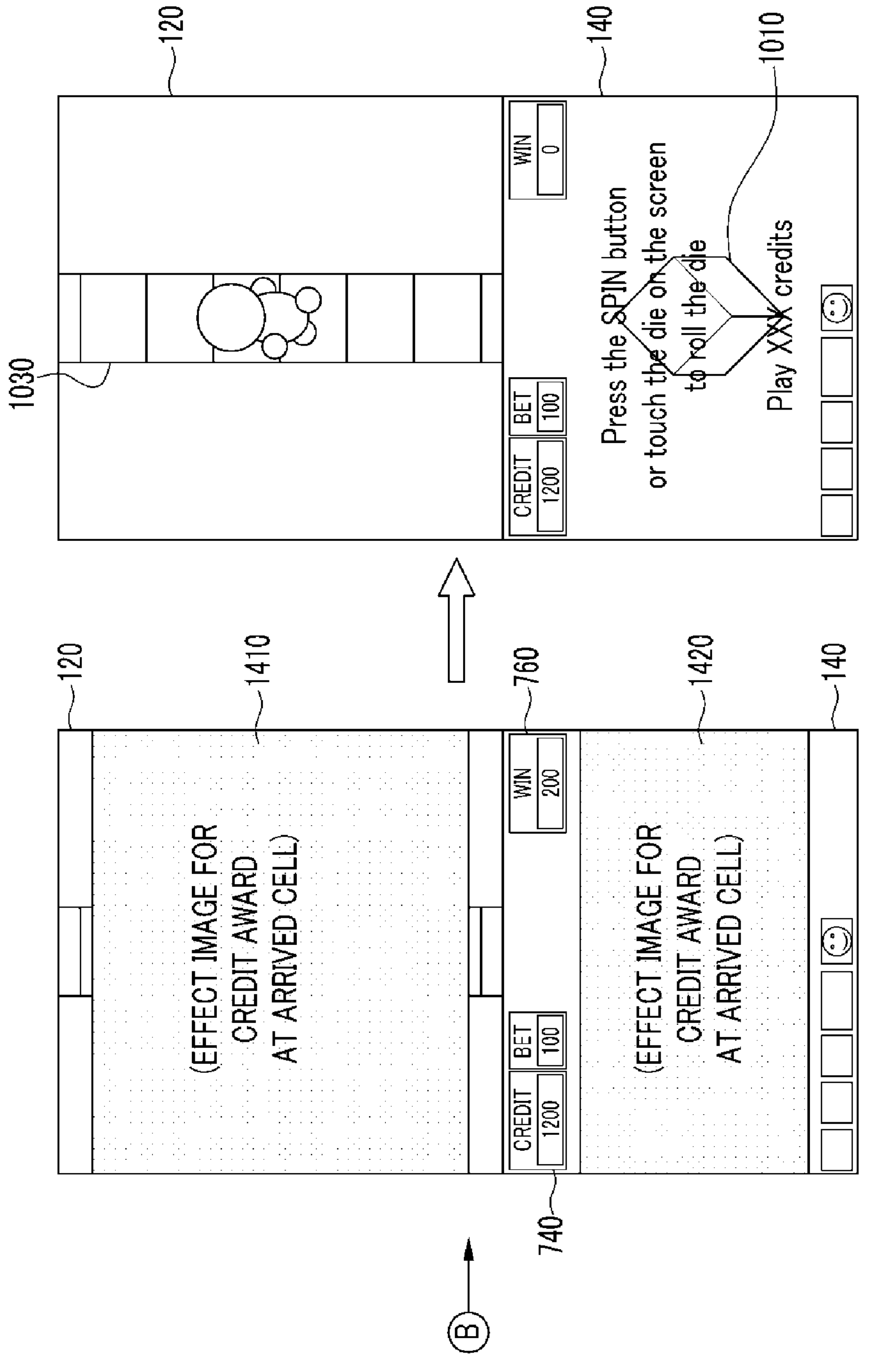

The random payout type event is one for randomly awarding credits to the player when the player arrives at the cell C2 to which the random payout type event is set. In the random payout type event, credits corresponding to a credit value that is randomly determined by the gaming machine 100 or the gaming system 10 are awarded to the player. FIG. 14A and FIG. 14B show an example of the random type event in a bonus game according to an embodiment of the present invention.

When the player arrives at the cell C2 to which the random payout type event is set, the top display 120 displays an effect image corresponding to the event and an effect sound corresponding to the event outputs. Next, the gaming machine 100 or the gaming system 10 generates a random number and determines any one among a plurality of predetermined credit values based on the random number. As shown in FIG. 14A, the top display 120 displays an effect image 1410 for awarding the credits to the player according to the determined credit value. At this time, the awarded credits are determined by multiplying the determined credit value by a current BET. The awarded credits are also shown in the win display section 760 of the main display 140. Subsequently, the awarded credits are added to the current credits of the player such that the awarded credits are provided to the player. As shown in FIG. 14B, the added credits are shown in the credit display section 740 of the main display 140. When the effect image 1410 for awarding the credits is displayed in the top display 120, the main display 140 also displays an effect image 1420 for awarding the credits. Alternatively, the main display 140 may display "LOOK UP".

After the credits are provided to the player, the event ends. The top display 120 displays the map 1030 again, and the main display 140 displays the image for rolling the die 1010 again. In other words, the top display 120 and the main display 140 display images for a next unit game. The player can continue the next unit game using additional credits, and change the bet amount of the next unit game.

[Selection Type]

Figure 15A:
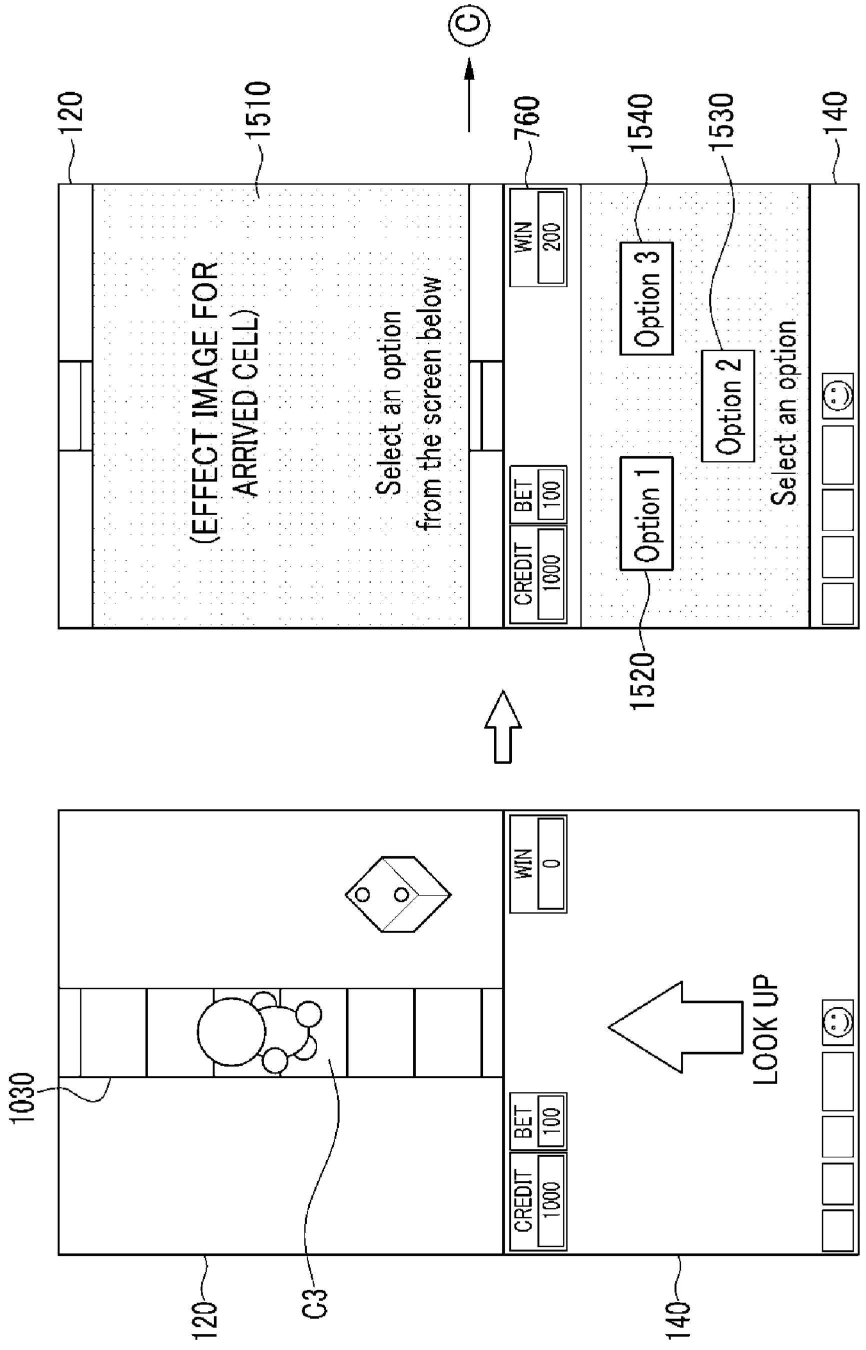
FIG. 15A and FIG. 15B show an example of a selection type event in a bonus game according to an embodiment of the present invention.
Figure 15B:
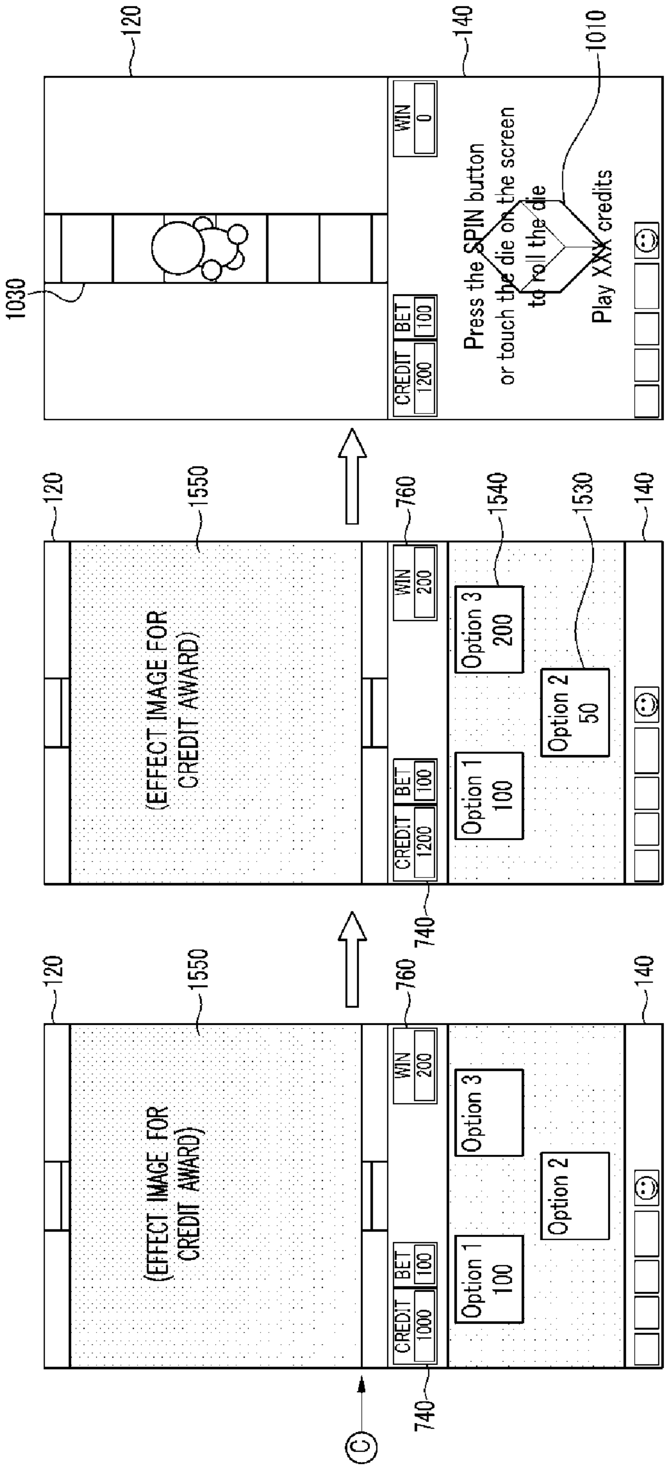

The selection type event is an event that the player selects any one option among a plurality of options. In the selection type event, credits corresponding to a credit value set to the selected option are awarded to the player. FIG. 15A and FIG. 15B show an example of the selection type event in a bonus game according to an embodiment of the present invention.

When the player arrives at the cell C3 to which the selection type event is set, the top display 120 displays an effect image 1510 corresponding to the event and an effect sound corresponding to the event outputs. Next, as shown in FIG. 15A, while the effect image 1510 is displayed in the top display 120, the main display 140 displays an image including a plurality of options 1520, 1530, and 1540. Further, the top display 120 and/or the main display 140 displays an image or a text, which notifies the player to select any one option among the plurality of options 1520 to 1540. The player can select any one option among the options by touching an area representing a desired option in the main display 140.

If the player selects any one option 1520, the main display 140 displays a credit value of the selected option 1520 on the area representing the selected option 1520, as shown in FIG. 15B. Further, the top display 120 displays an effect image 1550 for awarding the credits to the player according to the credit value. At this time, the awarded credits are determined by multiplying the credit value of the selected option 1520 by a current BET. The awarded credits are also shown in the win display section 760 of the main display 140. Subsequently, the awarded credits are added to the current credits of the player such that the awarded credits are provided to the player. Further, the added credits are shown in the credit display section 740 of the main display 140. In this case, the main display 140 also displays credit values of non-selected options 1530 and 1540 on areas representing the non-selected options 1530 and 1540.

After the credits are provided to the player, the event ends. The top display 120 displays the map 1030 again, and the main display 140 displays the image for rolling the die 1010 again. In other words, the top display 120 and the main display 140 display images for a next unit game. The player can continue the next unit game using additional credits, and change the bet amount of the next unit game.

[Start Over Type]

The start over type event is an event similar to the selection type event. Differently from the selection type event, at least one option of a plurality of options included in the start over type event is a start over option. In the start over type event, credits corresponding to a credit value set to the selected option are awarded to the player, or the character of the player returns to the start point. FIG. 16A, FIG. 16B, FIG. 16C, and FIG. 16D show an example of the start over type event in a bonus game according to an embodiment of the present invention.

When the player arrives at the cell C4 to which the start over type event is set, the top display 120 displays an effect image 1610 corresponding to the event and an effect sound corresponding to the event outputs. Next, as shown in FIG.

16A, while the effect image 1610 is displayed in the top display 120, the main display 140 displays an image including a plurality of options 1620, 1630, and 1640. Further, the top display 120 and/or the main display 140 displays an image or a text, which notifies the player to select any one option among the plurality of options 1620 to 1640. The player can select any one option among the options by touching an area representing a desired option in the main display 140.

Figure 16A:
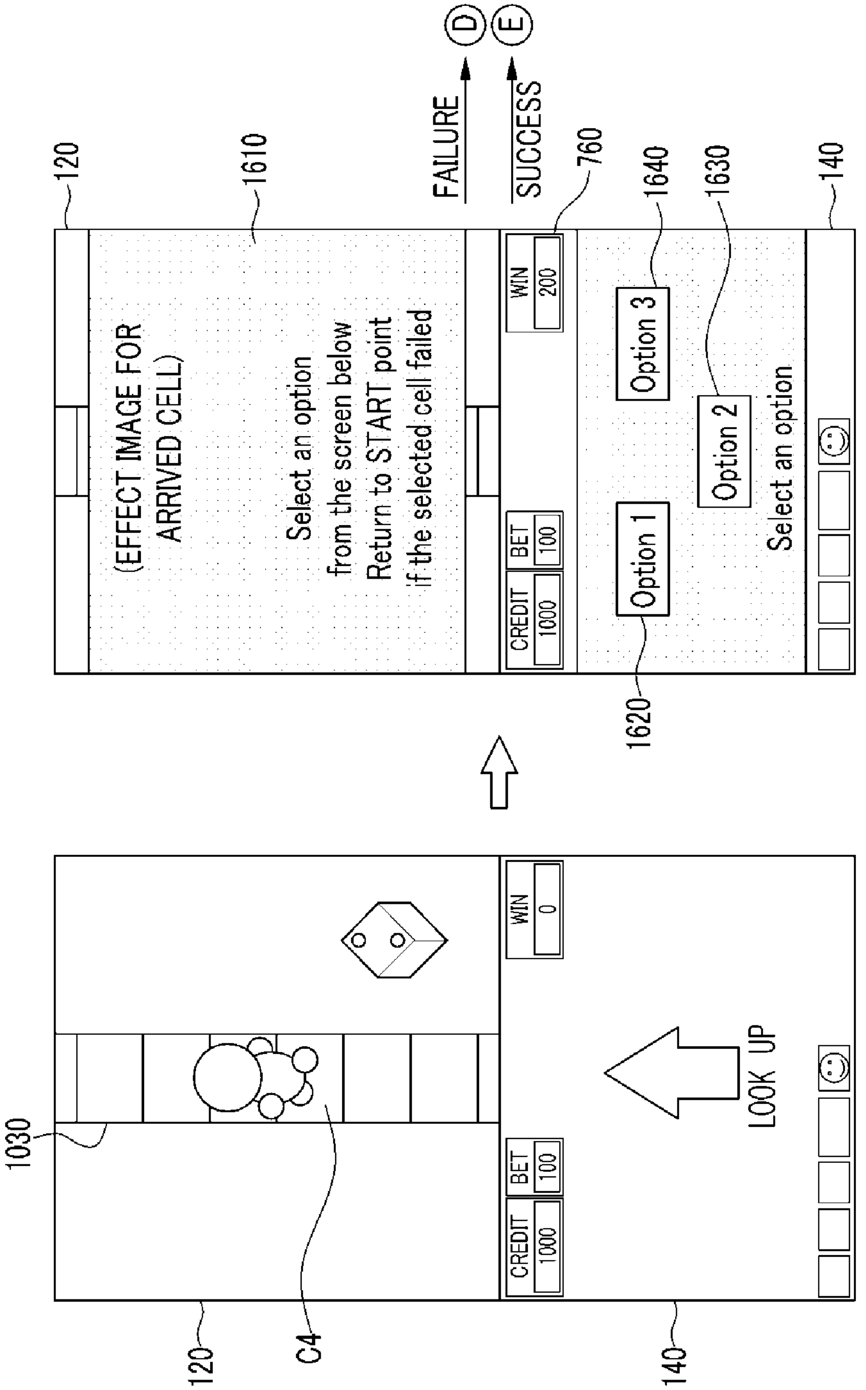
FIG. 16A, FIG. 16B, FIG. 16C, and FIG. 16D show an example of a start over type event in a bonus game according to an embodiment of the present invention.
Figure 16B:
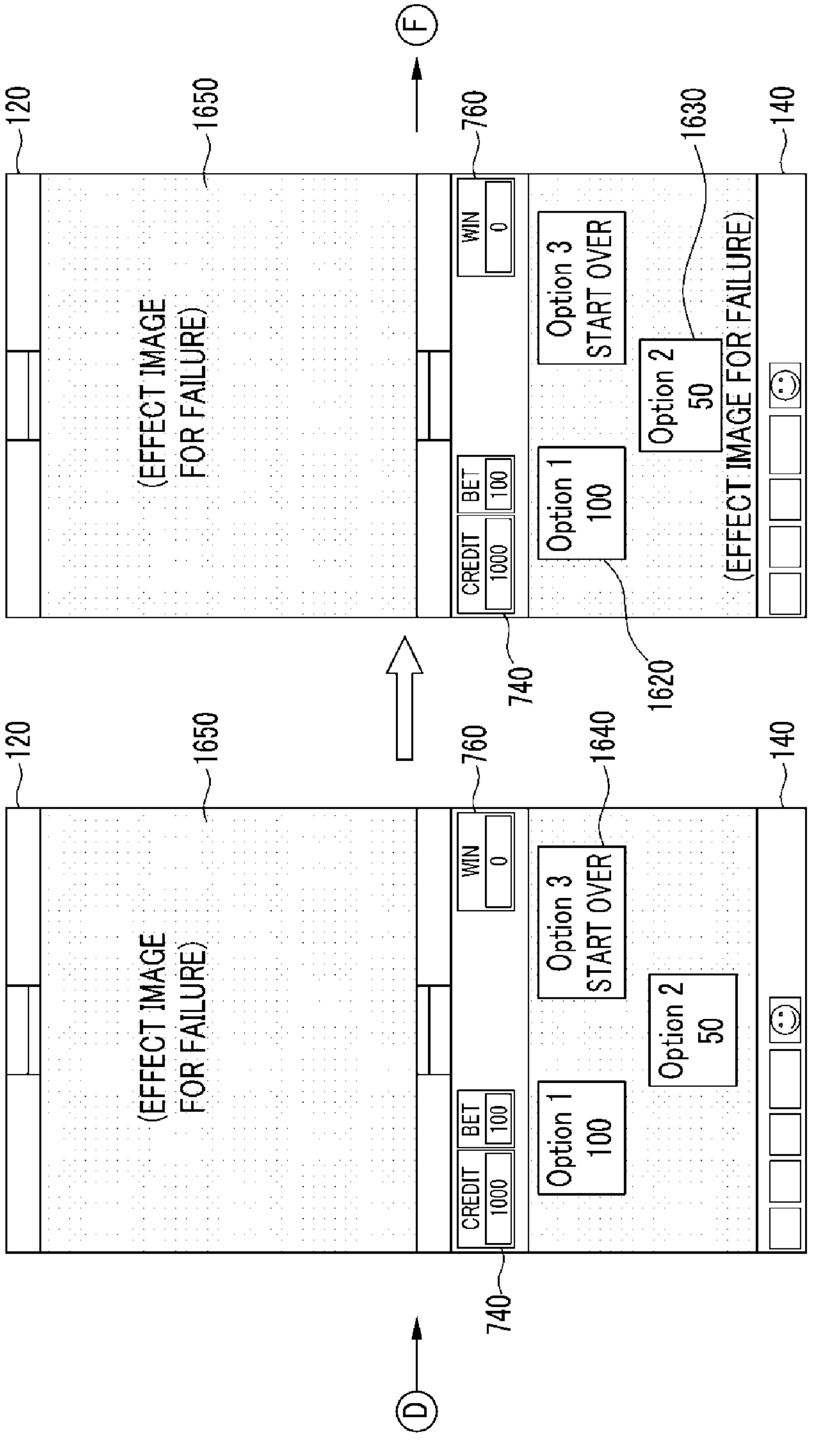
Figure 16C:
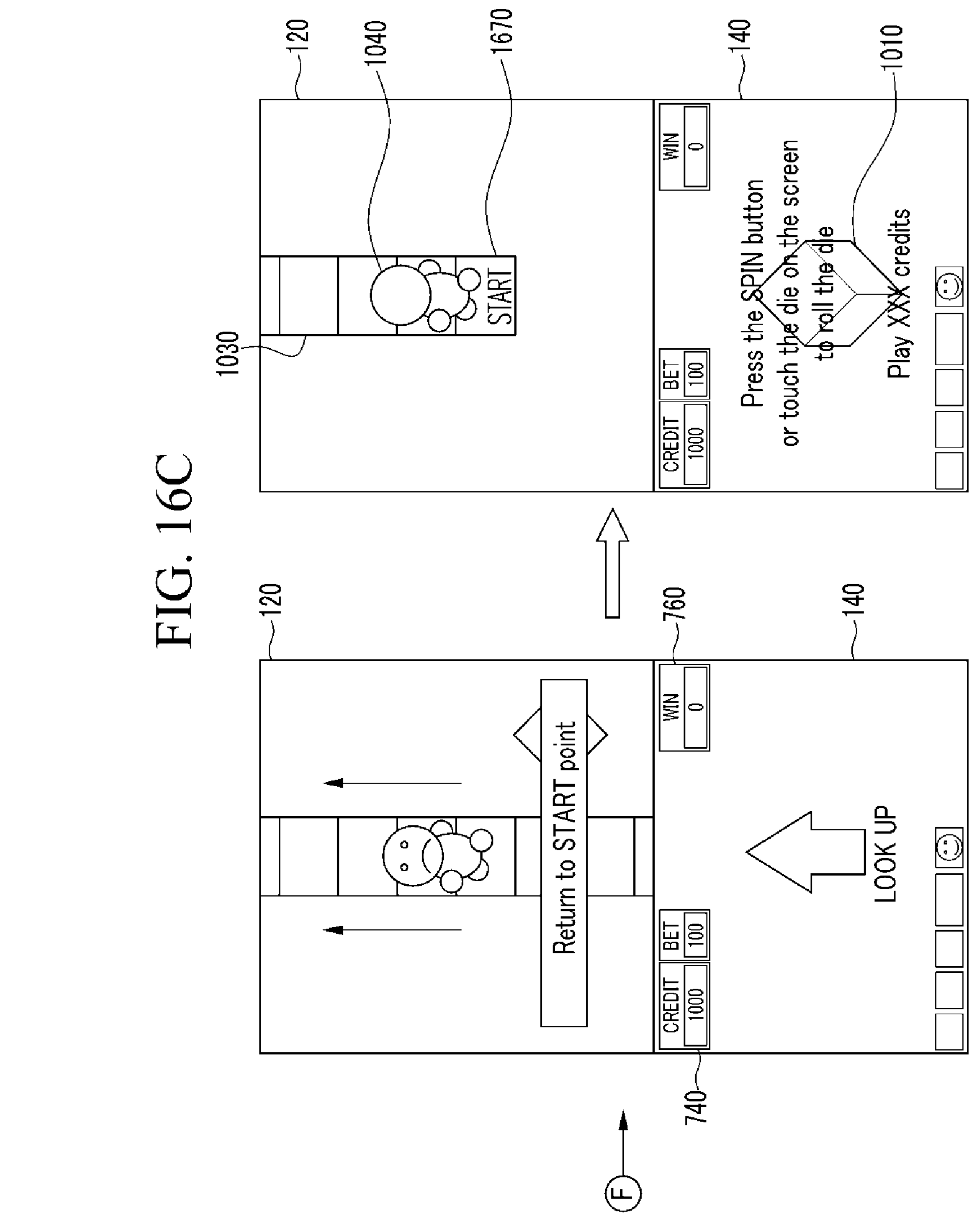

Referring to FIG. 16B, if the option selected by the player is the start over option 1640, the main display 140 displays "START OVER" on an area representing the selected option 1640. Further, the top display 120 displays an effect image 1650 for notifying the player that the player fails to receive credits. Subsequently, the main display 140 displays credit values of non-selected options 1620 and 1630 on areas representing the non-selected options 1620 and 1630. Next, as shown in FIG. 16C, the top display 120 displays an image 1660 representing that the character 1040 returns to the start point 1670, and the main display 140 displays "LOOK UP". After the character 1040 returns to the start point 1670, the event ends. The top display 120 displays the map 1030 again, and the main display 140 displays the image for rolling the die 1010 again. The player can continue a next unit game using additional credits, and change the bet amount of the next unit game.

Figure 16D:
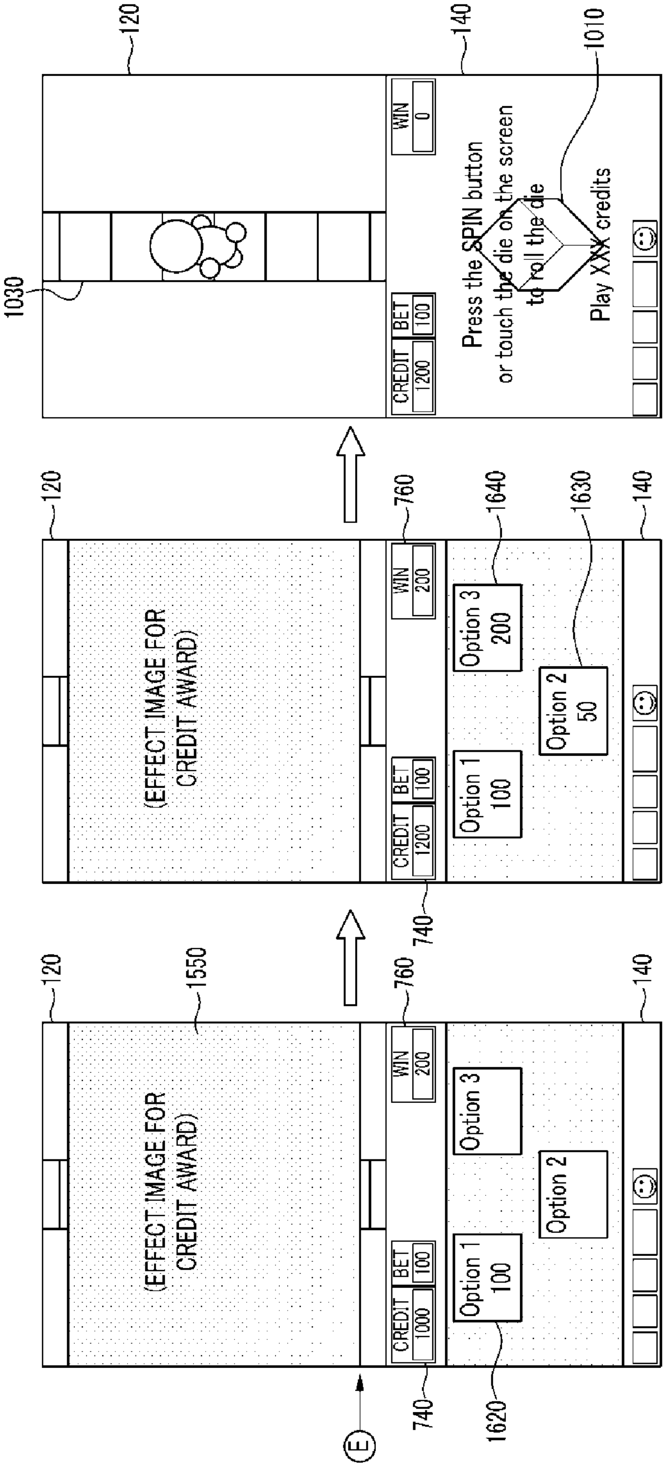

Referring to FIG. 16D, if the option 1620 selected by the player is not the start over option 1640, the gaming machine 100 or the gaming system 10 performs an operation that is described with reference to FIG. 15B.

[Free Game Type]

Figure 17A:
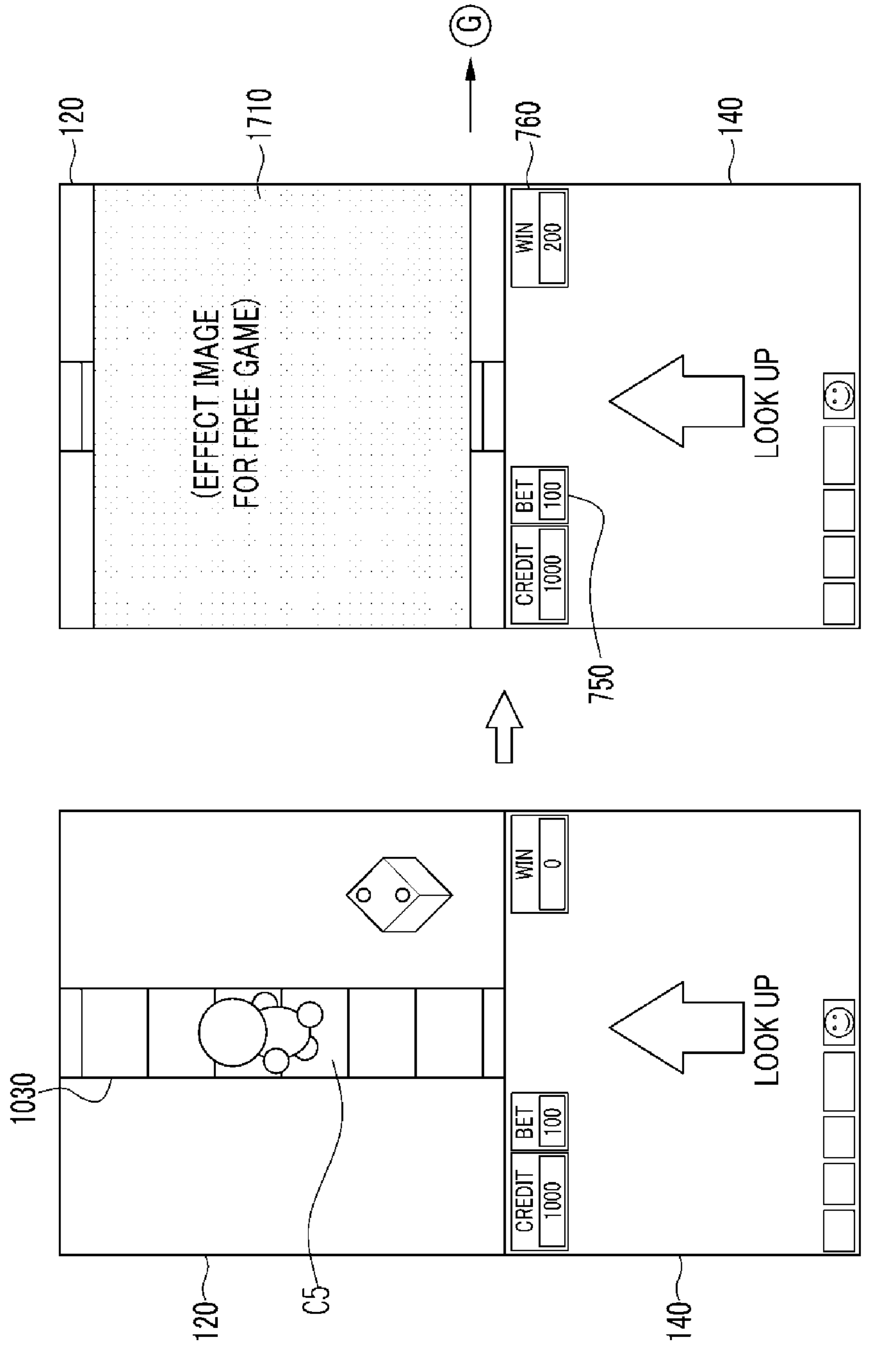
FIG. 17A, FIG. 17B, and FIG. 17C show an example of a free game type event in a bonus game according to an embodiment of the present invention.
Figure 17B:
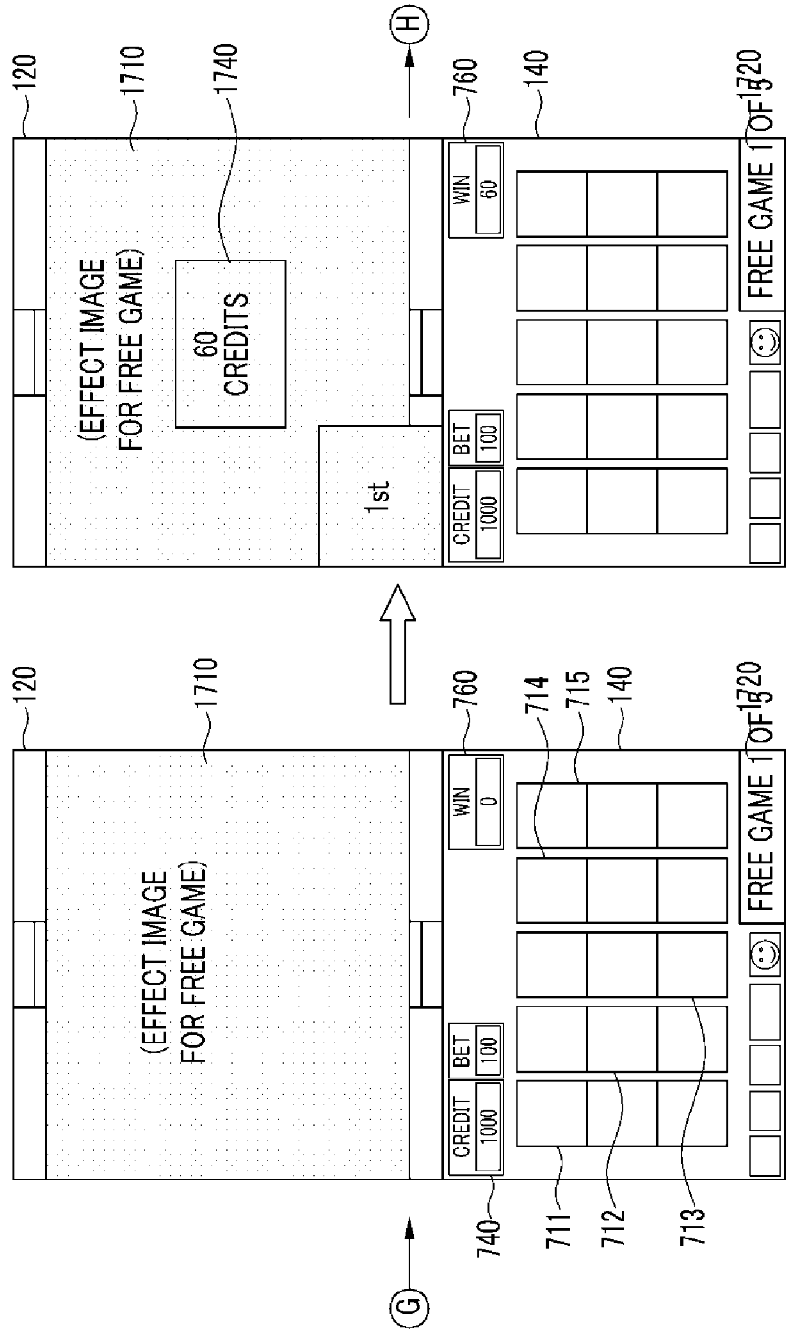
Figure 17C:
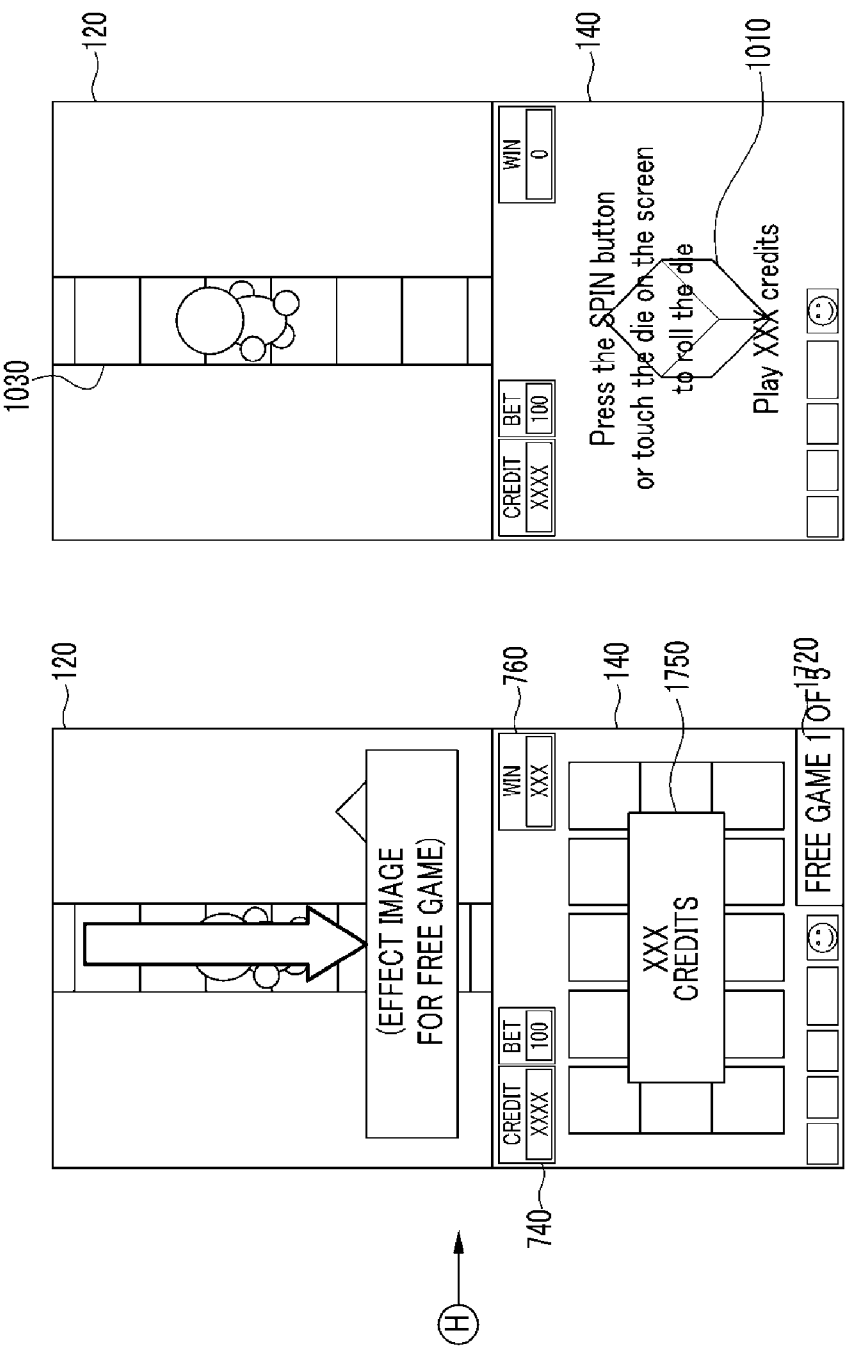

The free game type event is one for providing the player with a free game similar to the base game when the player arrives at the cell C5 to which the free game type event is set. In the free game event, at least one free game that is similar to the base game is performed, and credits corresponding to a result of the free game are awarded to the player. FIG. 17A, FIG. 17B, and FIG. 17C show an example of the free game type event in a bonus game according to an embodiment of the present invention.

When the player arrives at the cell C5 to which the free game type event is set, the top display 120 displays an effect image corresponding to the event and an effect sound corresponding to the event outputs. Next, as shown in FIG. 17A, the top display 120 displays an effect image 1710 for notifying the player of a start of the free game and a rule of the free game. At this time, the main display 140 displays the image for indicating "LOOK UP".

Subsequently, as shown in FIG. 17B, the game machine 100 displays a display window including a plurality video reels 711 to 715 for the free game in the main display 140. As described in the base game, the player pushes a spin button (153 of FIG. 3) to start the free game. Then, the gaming machine 100 and/or the gaming machine 10 counts up the free game counter, and displays images 1720 and 1730 representing the free game counter in the main display 140 and the top display 120, respectively. The image 1720 displayed in the main display 140 may represent a relationship between the number of the performed free games and the number of total free games, for example, "FREE GAME 1 OF 5", "FREE GAME 2 OF 5", . . . , "FREE GAME 5 OF 5". The image 1730 displayed in the top display 120 may represent the number of the performed free games, for example, "1st", "2nd", . . . , "5th". In addition, if the spin button 153 is pushed, symbols start scrolling and then the scrolling of symbols is stopped and the symbols are rearranged. If a combination of the rearranged symbols is a winning combination, the top display 120 displays an effect image 1740 for awarding the credits to the player according to the credit value. At this time, the awarded credits are cumulatively added to credits of a win display section 760 of the main display 140.

The free game is repeated until the free game counter reaches a predetermined number. That is, free games whose number is equal to the predetermined number are performed. After the plurality of free games are performed, as shown in FIG. 17C, the main display 140 displays an image 1750 representing total credits that are awarded to the player in the free games. The total credits are the credits that are cumulatively added in the win display section 760, and are added to the credits of a credit display section 740 of the main display 140. Further, the gaming machine 100 or the gaming system 10 scrolls down the effect image for the free game in the top display 120.

After the credits are provided to the player, the event ends. The top display 120 displays the map 1030 again, and the main display 140 displays the image for rolling the die 1010 again. In other words, the top display 120 and the main display 140 display images for a next unit game.

[Turning Point Type]

Figure 18:
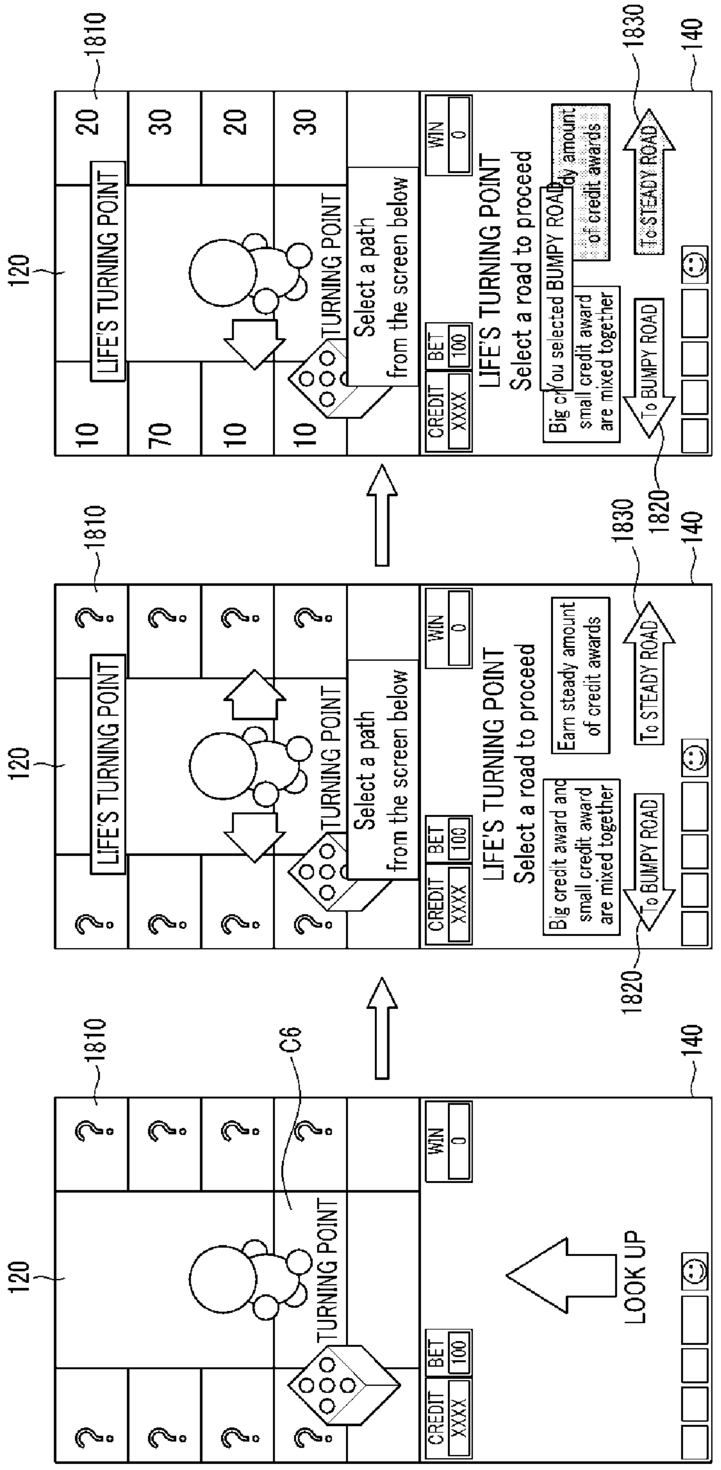
FIG. 18 shows an example of a turning point in a bonus game according to an embodiment of the present invention.

A turning point is a cell that allows the player to select any one among a plurality of paths for a plurality of courses. The character of the player can proceed to the path selected in the turning point. FIG. 18 shows an example of the turning point in a bonus game according to an embodiment of the present invention.

Referring to FIG. 18, if the destination cell at which the character arrives according to the number indicated by the die 1010 is the turning point C6 or the turning point C6 exists between the current cell and the destination cell, an event for turning point starts.

At the turning point, the main display 140 displays effect images for selecting any one among the plurality of paths, for example, two paths. Further, the gaming machine 100 or the gaming system 10 notifies the player to select any one of the two paths by displaying a statement such as "Life's turning point. Select a path." Further, the top display 120 displays courses according to the paths. Each course includes a plurality of cells 1810 forming the course, and a credit value set to each cell 1810 is not shown before the path is selected. The top display 120 may indicate the player to select a path in the main display 140, for example, "Select a path from the screen below." The two paths include a path for a bumpy road and a path for a steady road. The effect images include a path image 1820 for indicating the path for the bumpy road and a path image 1830 for indicating the path for the steady road. The player can select any one of the two paths by touching any one of the path images 1820 and 1830 in the main display 140. The path for the bumpy road provides the player with a course where one or more events for a big credit award and one or more events for a small credit award are mixed together. The path for the steady road provides the player with a course where events for steady amount of credit awards exist. If the player selects any one path, the main display 140 displays an image or a text for indicating the selected path. Further, the credit values set to the cells 1810 forming the courses are shown. The character of the player can proceed to the selected path in the current unit game or a next unit game.

[Goal Point Type]

Figure 19A:
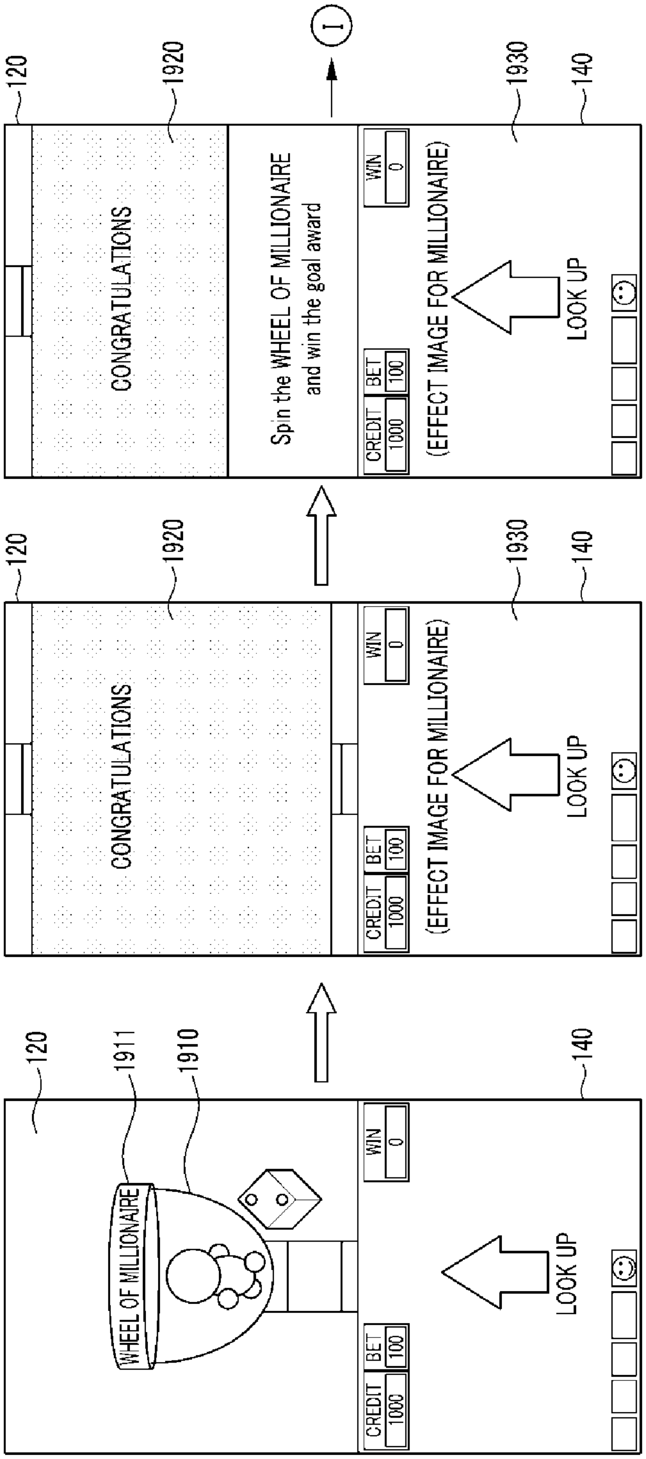
FIG. 19A, FIG. 19B, and FIG. 19C show an example of a goal point in a bonus game according to an embodiment of the present invention.
Figure 19B:
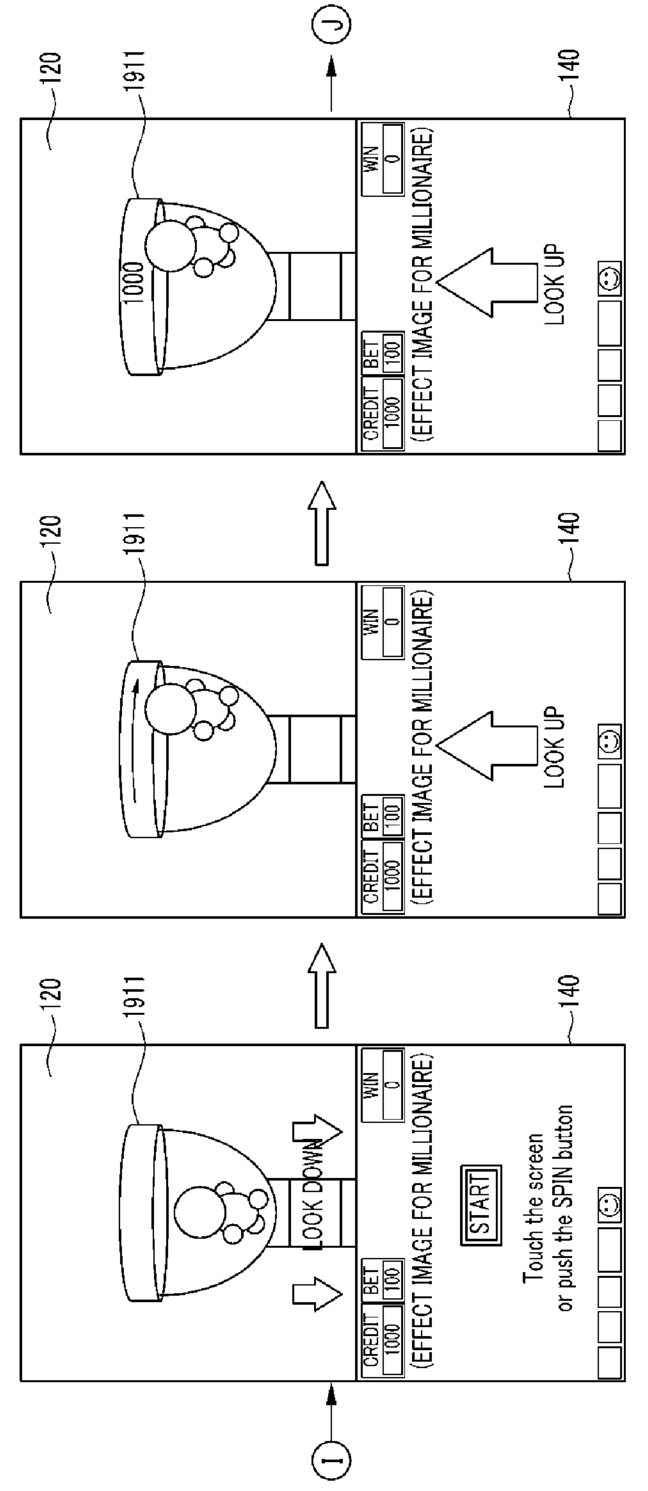
Figure 19C:
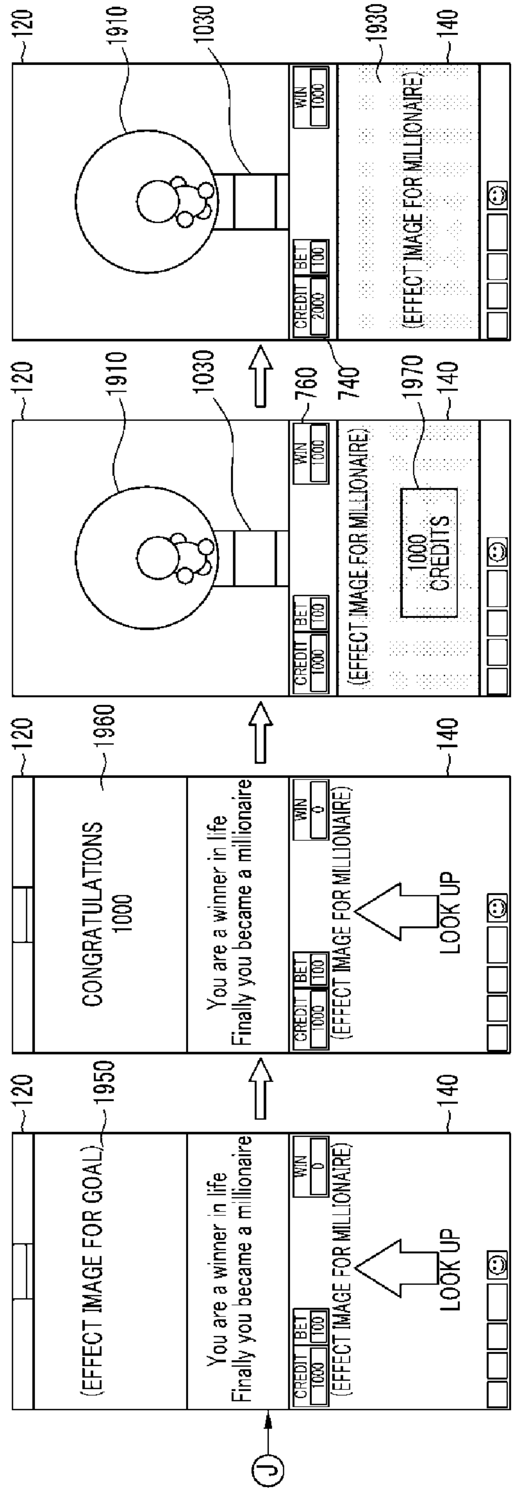

The goal point is a final cell among a plurality of cells forming the map of bonus game. In the goal point, big credits are awarded to the player. FIG. 19A, FIG. 19B, and FIG. 19C show an example of the goal point in a bonus game according to an embodiment of the present invention.

If the character arrives at a goal point 1910 according to the number indicated by the die 1010, an event of the goal point starts. As shown in FIG. 19A, the top display 140 displays an effect image 1920 for congratulating the player on an arrival of the goal point. Further, the main display 140 displays an effect image 1930 for representing a millionaire by the arrival of the goal point as a background, and the main display 140 displays an image or a text for indicating the player to look the top display 120, for example, "LOOK UP". Subsequently, the top display 120 displays an image or a text for indicating the player to start the goal point event. One example of the goal point event is an event for spinning a wheel of millionaire 1911.

As shown in FIG. 19B, the main display 140 displays a start button 1940 for starting the goal point event, and the top display 120 displays an image or a text for indicating the player to look the main display 140, for example, "LOOK DOWN". At this time, the player can start the goal point event by touching the start button 1940 or by pushing a spin button (153 of FIG. 3). If the goal point event is started, the wheel of millionaire 1911 spins. When the wheel of millionaire 1911 stops, credits according to a credit value set to the goal point are shown in the wheel of millionaire 1911. The credits are determined by multiplying the credit value set to the goal point by an average bet per unit game.

Subsequently, as shown in FIG. 19C, the top display 120 displays an effect image 1950 for a goal, and then displays an image 1960 for representing the credits of the goal point. At this time, the main display 140 displays "LOOK UP". Next, the effect image 1960 are scrolled down in the top display 120, and a map 1030 where the character arrives at the goal point 1910 is display in the top display 120 again. Further, the credits of the goal point are awarded to the player, and the main display 140 displays an image 1970 representing the credits that are awarded to the player. The awarded credits are shown in a win display section 760 of the main display 140. Subsequently, the awarded credits are added to credits of a credit display section 740 of the main display 140, and the goal point event ends.

[Select of the Character]

Figure 20:
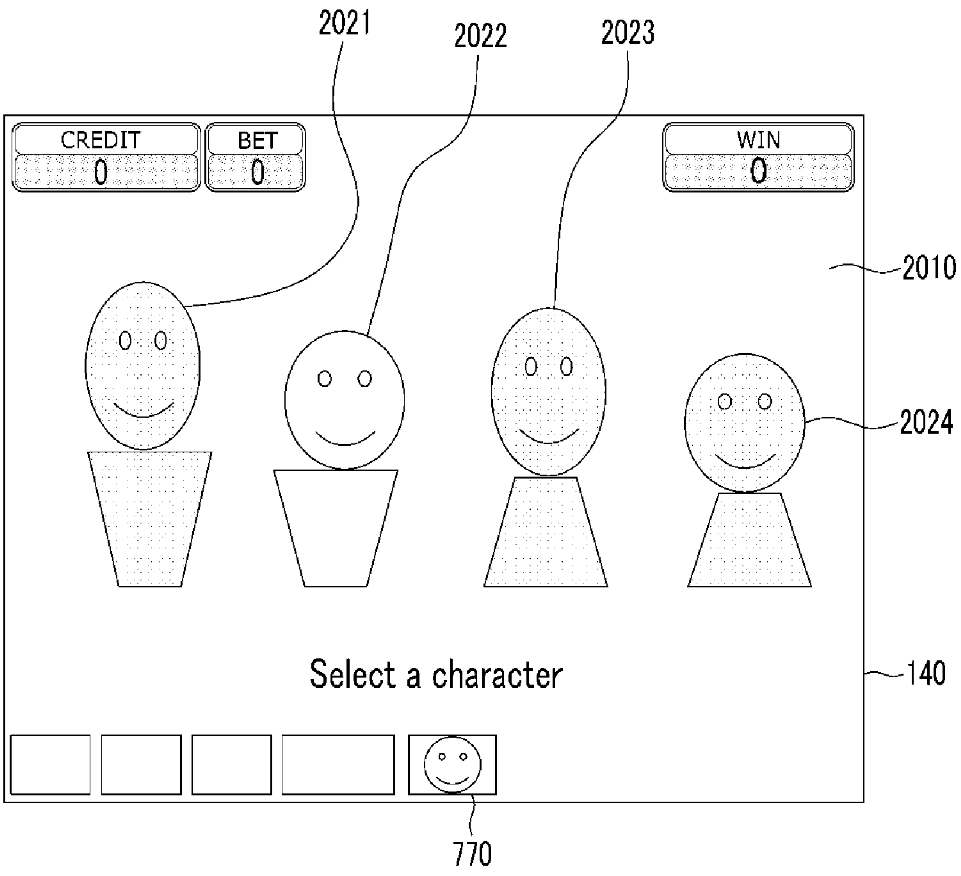
FIG. 20 shows an example of a picture for selecting a character in a bonus game according to an embodiment of the present invention.

FIG. 20 shows an example of a picture for selecting a character in a bonus game according to an embodiment of the present invention.

According to an embodiment of the present invention, a character select button 770 of a main display 140 is activated when a character of the player locates at a start point, and is inactivated when the character does not locate at the start point.

When the character is located at a cell of the start point among a plurality of cells (1031 of FIG. 10) forming courses, the main display 140 displays a display window 2010 for selecting the character, as shown in FIG. 20. The player can select or change the character by touching any one of a plurality of characters 2021, 2022, 2023, and 2024 shown in the display window 2010. At this time, the character 2023 that is selected by a player of a neighbor gaming machine 100*a* cannot be selected among the plurality of characters 2021 to 2024. The character 2023 that is selected by the player of the neighbor gaming machine 100*a* may be inactivated.

Next, a gaming method in the gaming machine according to an embodiment of the present invention will be described with reference to FIG. 21 to FIG. 25.

Figure 21:
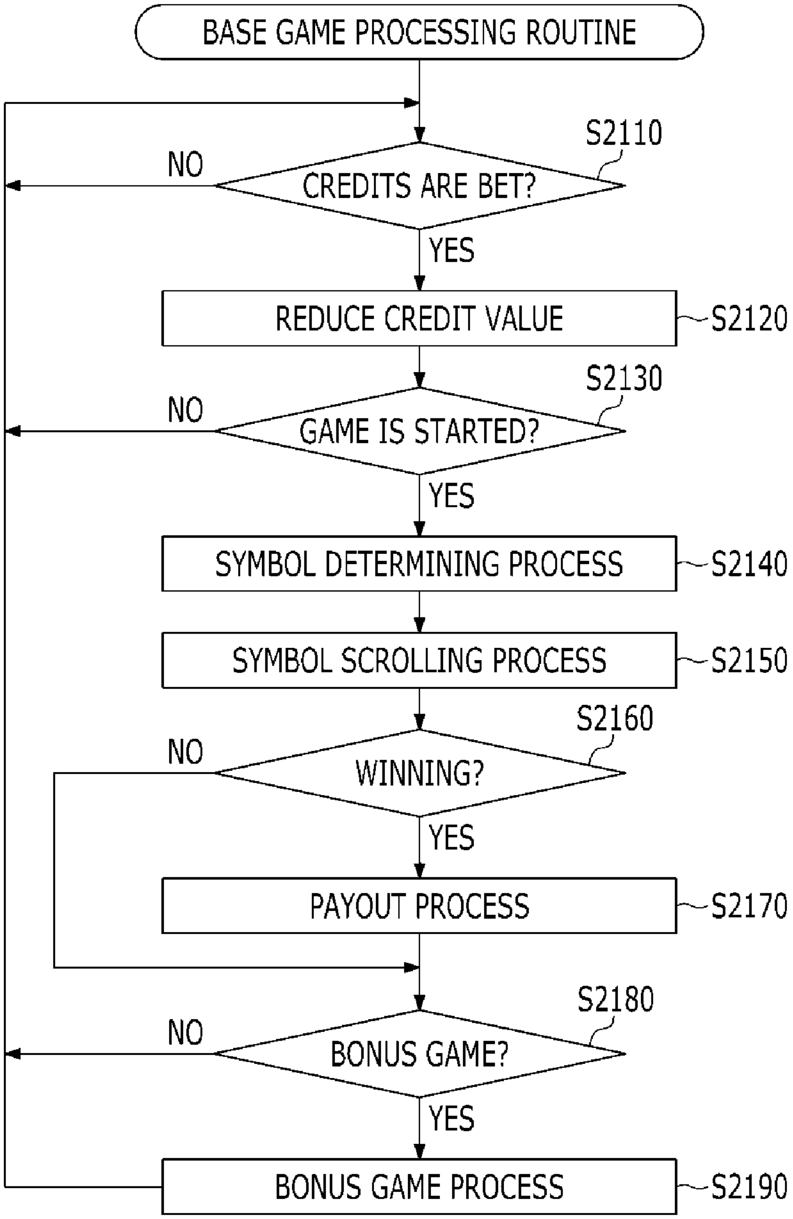
FIG. 21 is a flowchart of a base game process according to an embodiment of the present invention.

FIG. 21 is a flowchart of a base game process according to an embodiment of the present invention.

According to an embodiment of the present invention, a controller, i.e., a control unit (610*a* of FIG. 6A) of the gaming machine 100 executes the base game process as shown in FIG. 21 to execute the base game.

Referring to FIG. 21, in the base game process, the controller determines whether credits are bet (S2110). In this process, the controller may determine whether a signal output from any one of BET×1, BET×2 BET×3, BET×4, and BET×5 switch circuits (617*d* of FIG. 6A) is received by pushing any one of BET×1, BET×2 BET×3, BET×4, and BET×5 buttons (152*a*, 152*b*, 152*c*, 152*d*, and 152*e* of FIG. 5). When the credits are not bet (S2110: NO), the step S2110 is re-executed and the gaming machine is under a standby state until credits are bet.

In the meantime, when the credits are bet (S2110: YES), a credit value stored in a RAM (612 of FIG. 6A) is reduced corresponding to the number of credits bet (S2120). In addition, if the number of credits bet is larger than the credit-value stored in the RAM 612, the process of reducing the credit value is not carried out and the process proceeds to the step S2130.

Next, the controller determines whether the game is started by a spin button (220 of FIG. 5). If the game is not started (S2130: NO), the process is returned to the step S2110. In addition, if the game is not started (for example, if the game is not started and an instruction to end the game is input), the subtraction result from the step S2120 is canceled.

If the game is started (S2130: YES), the controller executes a symbol determining process (S2140). In other words, the controller generates a random number for each of video reels (711 to 715 of FIG. 7A) of a display window (700 of FIG. 7A), and determines symbols to be displayed (i.e., to be stopped) in each of the video reels 711 to 715 of the display window 700 based on the random number. Accordingly, a combination of symbols to be stopped on pay lines is determined. At this time, the controller may determine the symbols displayed in each of the video reels 711 to 715 referring to data stored in a memory. The memory may be a RAM (612 of FIG. 6A) or a storage device (613 of FIG. 6A). The data represents a relationship between the symbols displayed in each video reel and the range of random numbers and are stored in table form.

Then, a scroll process of scroll-displaying the symbols in a main display (140 of FIG. 3) is executed (S2150). In the scroll process, the symbols are scrolled in the direction indicated by an arrow symbol and then the symbols determined in the step S14 are stopped (i.e., rearranged) in the display window 700.

Next, on the basis of the combination of symbols 640 rearranged in the display window 700, the controller determines whether the combination is a winning combination or not (S2160). When the combination is the winning combination (S2160: YES), a payout process is executed (S2170). In other words, if the combination is the winning combination, the controller calculates the number of credits to be paid out according to a type of the winning combination.

When the payout process in the step S2170 is executed or the combination is not the winning combination (S2160: NO), the controller continues to determine whether a bonus game is triggered (S2180). Specifically, the controller determines that the bonus game is triggered when special symbols (for example, symbols of "BONUS") of a number higher than the predetermined number (for example, three) are rearranged on the pay line. If the bonus game is not triggered (S2180: NO), the process of the step S2110 is executed.

Figure 22:
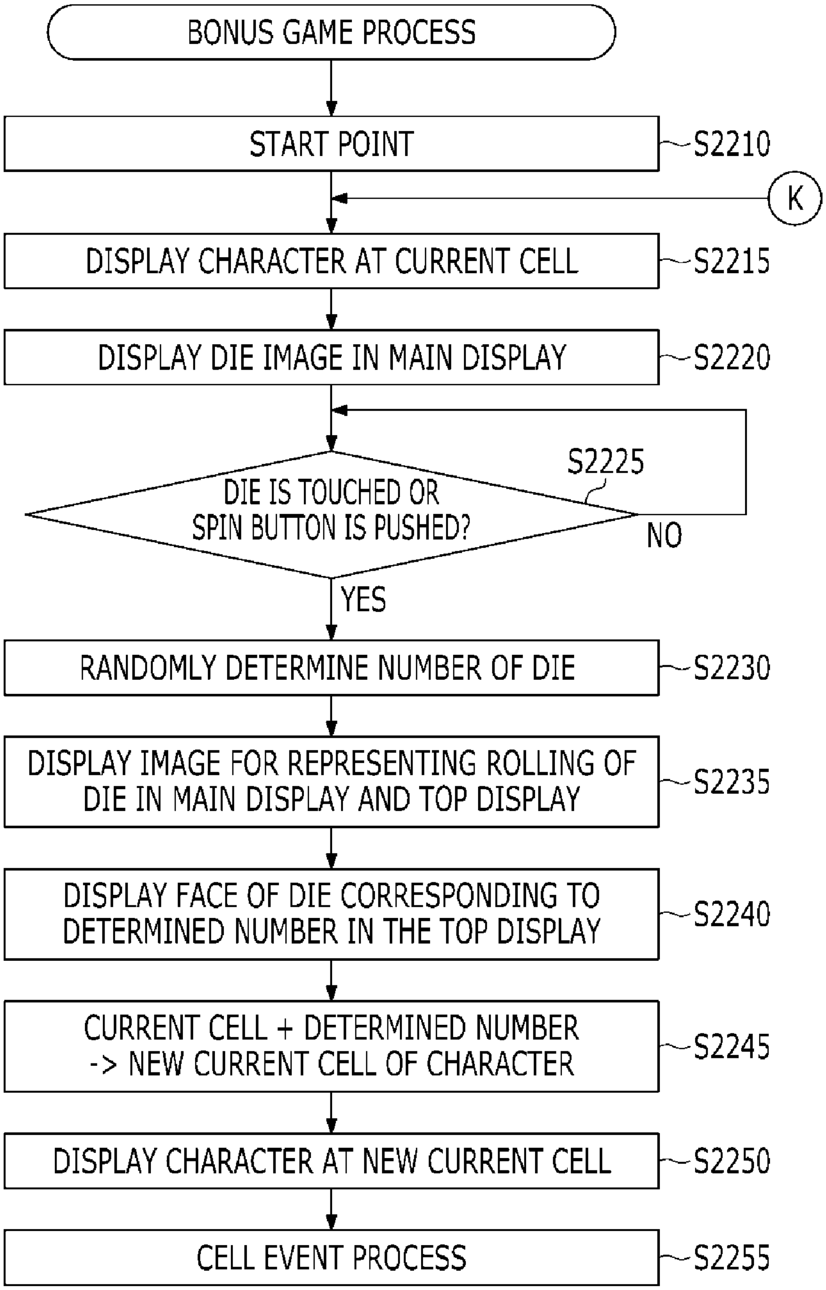
FIG. 22 is a flowchart of a bonus game process according to an embodiment of the present invention.
Figure 23:
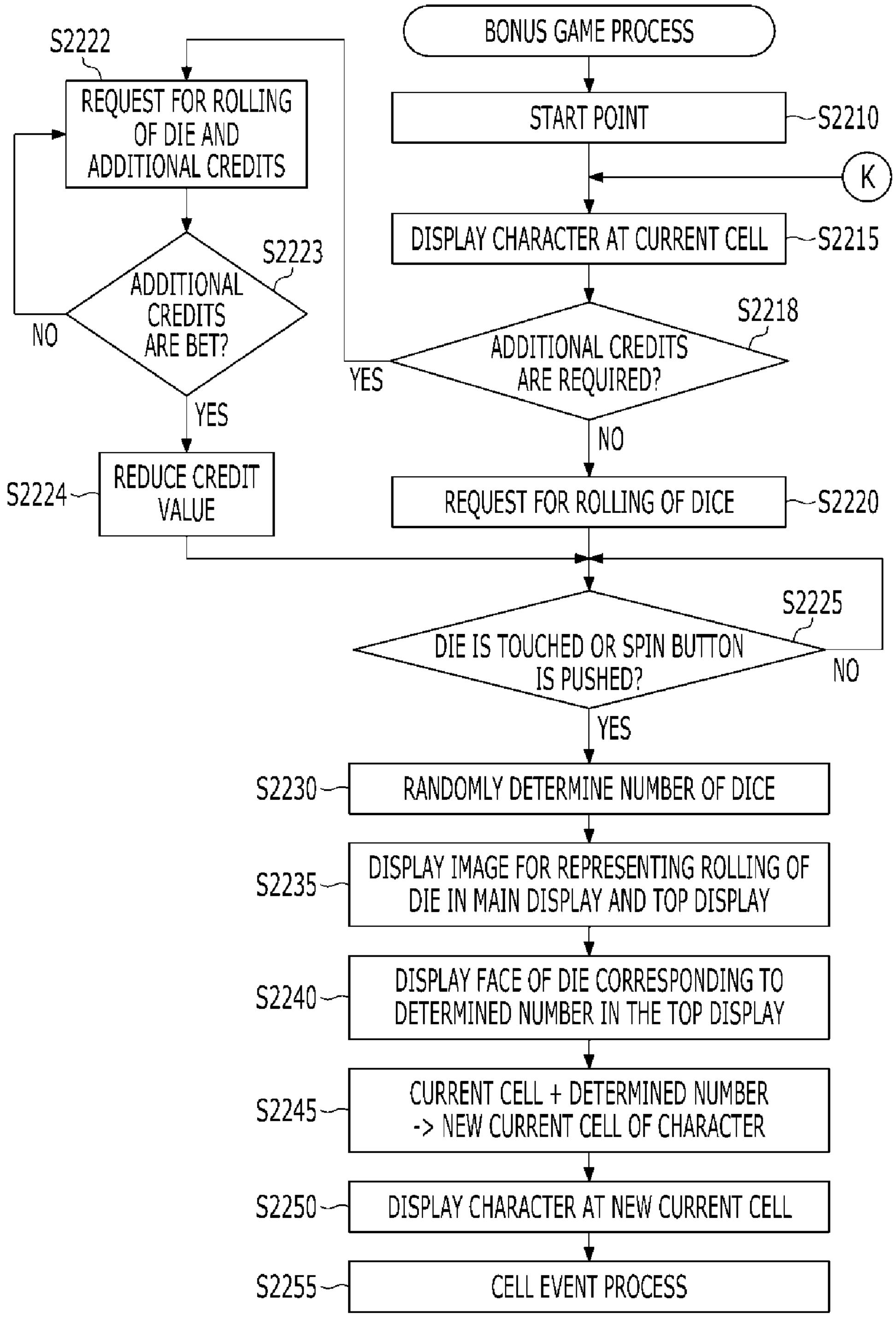
FIG. 23 is a flowchart of a bonus game process according to another embodiment of the present invention.

The gaming machine 100 executes a bonus game process (S2190). According to an embodiment of the present invention, a controller of the gaming machine 100 may execute the bonus game process (S2190) as shown in FIG. 22 or FIG. 23. The controller may be a control unit (610*a* of FIG. 6A) and/or a common control unit (640 of FIG. 6A or 6B).

FIG. 22 is a flowchart of a bonus game process according to an embodiment of the present invention, and FIG. 23 is a flowchart of a bonus game process according to another embodiment of the present invention.

Referring to FIG. 22, in the bonus game process, the controller initializes a position of a character corresponding to the player (S2210). That is, the position of the character is initialized to a start point of a map. Next, the controller displays the character located at a current cell of the map in a top display (120 of FIG. 3) (S2215), and requests the player to roll a die displayed in the main display 140 (S2220). That is, the controller displays a die image for rolling a die in the main display 140.

If the player touches an area corresponding to the die image in the main display 140 or pushes a spin button (220 of FIG. 3) of the gaming machine 100 (S2225: YES), the controller randomly determines a number of the die (S2230). That is, the controller generates a random number, and determines the number of the die based on the random number. At this time, the controller may determine the number of the die referring to data stored in a memory. The memory may be a RAM (612 of FIG. 6A) or a storage device (613 of FIG. 6B). The data represents a relationship between the number of the die and the range of random numbers and are stored in table form. If the player does not touch the area corresponding to the die image and push the spin button 220 (S2225: NO), the controller is under a standby state until the player touches the area corresponding to the die image or pushes the spin button 220.

After determining the number of the die in the step S2230, the controller displays an image representing a status where the die is being rolled in the main display 140 and the top display 120 (S2235). The controller displays in the top display 120 an image that rolling of the die stops and a face of the die corresponding to the determined number is turned upward (S2240). Subsequently, the controller determines a new position of the character as a cell which is moved from the current cell by the determined number (S2245). The controller moves the character from the current cell of the map to a destination cell corresponding to the new position, and updates the current cell as the destination cell. Further, the controller displays the character located at the updated current cell of the map (S2250).

Figure 24:
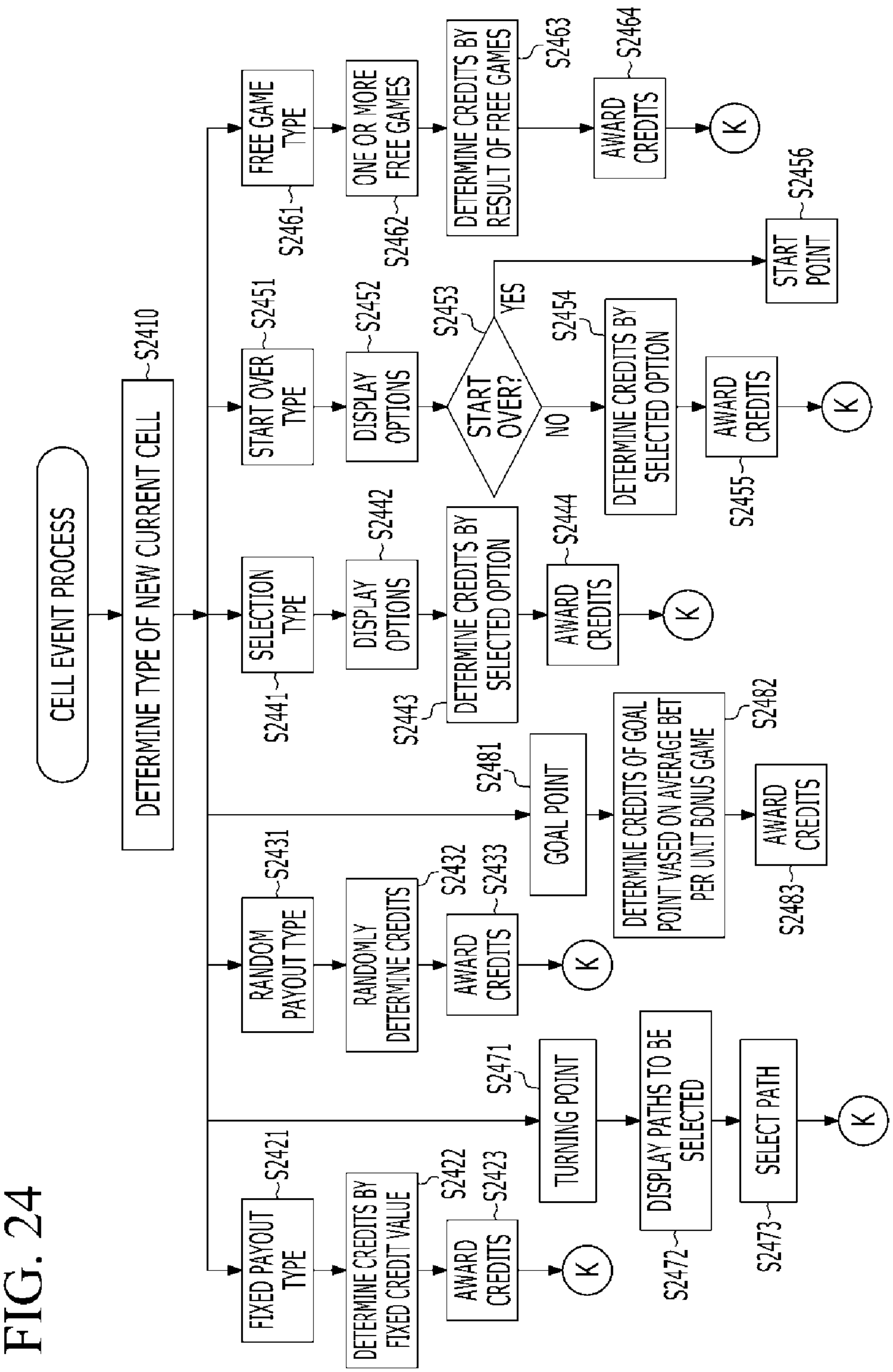
FIG. 24 is a flowchart of a cell event process of a bonus game according to an embodiment of the present invention.

Next, the controller executes a cell event process of the destination cell (S2255). According to an embodiment of the present invention, the controller may execute the cell event process (S2255) as shown in FIG. 24.

The process of the steps S2215 to S2255 corresponds to a unit game process in the bonus game process. The unit game process may be repeated in the bonus game process until the character arrives at a goal point.

According to another embodiment of the present invention, the controller executes the bonus game process (S19 of FIG. 21) as shown in FIG. 23.

Referring to FIG. 23, in the bonus game process, the controller determines whether a current unit game requires additional credits (S2218) before requesting the player to roll a die displayed in the main display 140 (S2220). If the current unit game requires the additional credits (S2218: YES), the controller displays an image for requiring the player to bet the additional credits as well as the die image for rolling the die in the main display 140 (S2222). Further, the controller determines whether the additional credits are bet (S2223). The player can bet the additional credits by pushing any one of the BET×1, BET×2 BET×3, BET×4, and BET×5 buttons 152$a$, 152$b$, 152$c$, 152$d$, and 152$e$. When the additional credits are not bet (S2223: NO), the gaming machine 100 is under a standby state until the additional credits are bet.

When the additional credits are bet (S2223: YES), a credit value stored in the RAM 43 is reduced corresponding to the number of credits that are additionally bet (S2224). If the number of credits is larger than the credit-value stored in the RAM 43, the process of reducing the credit value is not carried out and the process proceeds to the step S2222.

If the additional credits are bet (S2222: YES), the controller executes the process of the step S2225 to S2255 as described with reference to FIG. 22. If the current unit game does not require the additional credits (S2218: NO), the controller displays the die image for rolling the die in the main display 140 (S2220), and executes the process of the step S2225 to S2255.

Next, cell event processes according to embodiments of the present invention are described with reference to FIG. 24.

FIG. 24 is a flowchart of a cell event process of a bonus game according to an embodiment of the present invention.

Referring to FIG. 24, the controller determines whether the new current cell is a fixed payout type, a random payout type, a selection type event, a start over type, a free game type, a turning point, or a goal point (S2410).

If the new current cell is the fixed payout type cell (S2421), the controller executes a fixed payout type event set to the new current cell. The controller determines credits be paid out to the player according to a credit value of the fixed payout type event (S2422). The credits be paid out to the player may be determined by multiplying the credit value of the new current cell by a current BET. Subsequently, the controller awards the credits to the player (S2423). Next, the controller performs a process that begins from the step S2215 of FIG. 22 or FIG. 23 again.

If the new current cell is the random payout type cell (S2431), the controller executes a random payout type event set to the new current cell. The controller randomly determines credits be paid out to the player (S2432). The controller may generate a random number, and a credit value of the random payout type event. At this time, the controller may determine the credit value referring to data stored in a memory. The memory may be a RAM (612 or 642 of FIG. 6A or 6B) or a storage device (613 or 643 of FIG. 6A or 6B). The data represents a relationship between the credit value and the range of random numbers and are stored in table form. Further, the credits be paid out to the player may be determined by multiplying the credit value of the new current cell by the current BET. Subsequently, the controller awards the credits to the player (S2433). Next, the controller performs a process that begins from the step S2215 of FIG. 22 or FIG. 23 again.

If the new current cell is the selection type cell (S2441), the controller executes a selection type event set to the new current cell. The controller displays a plurality of options in the main display 140 (S2442), and waits for a selection of the player. When the player selects any one of the plurality of options, the controller determines credits be paid out to the player according to a credit value of the selected option (S2423). The credits be paid out to the player may be determined by multiplying the credit value of the new current cell by the current BET. Subsequently, the controller awards the credits to the player (S2444). Next, the controller performs a process that begins from the step S2215 of FIG. 22 or FIG. 23 again.

If the new current cell is the start over type cell (S2451), the controller executes a start over type event set to the new current cell. The controller displays a plurality of options in the main display 140 (S2452), and waits for a selection of the player. If an option selected by player among the plurality of options is not a start over option (S2453: NO), the controller determines credits be paid out to the player according to a credit value of the selected option (S2454). The credits be paid out to the player may be determined by multiplying the credit value of the new current cell by the current BET. Subsequently, the controller awards the credits to the player (S2455). If the selected option is the start over option (S2453: YES), the controller moves the character to the start point (S2456). Next, the controller performs a process that begins from the step S2215 of FIG. 22 or FIG. 23 again.

If the new current cell is the free game type cell (S2461), the controller executes a free game type event set to the new current cell. The controller provides the player with one or more free games according to the free game type event (S2462). For example, in each free game, the controller may display five video reels in the main display 140, and rearrange symbols in the five video reels according to an operation of the player. Subsequently, the controller determines credits be paid out to the player according to a result of the one or more free games (S2463). The credits be paid out to the player may be determined by multiplying the credit value that are accumulated in the one or more free games by the current BET. Subsequently, the controller awards the credits to the player (S2464). Next, the controller performs a process that begins from the step S2215 of FIG. 22 or FIG. 23 again.

If the new current cell is the turning point (S2471), the controller executes a turning point event set to the new current cell. The controller displays a plurality of paths in the main display 140 (S2472), and waits for a selection of the player. When the player selects any one of the plurality of paths (S2473), the controller determines the selected path as a path to which player proceeds to in the current unit game or a next unit game. Next, the controller performs a process that begins from the step S2215 of FIG. 22 or FIG. 23 again.

If the new current cell is the goal point (S2481), the controller executes a goal point event. The controller determines credits be paid out to the player based on an average BET per unit game (S2482). The average BET per unit game is an average BET of the unit games executed while the character moves from the start point to the goal point. Subsequently, the controller awards the credits to the player (S2483).

In FIG. 22 to FIG. 24, images displayed in the top display 120 or data related to the top display 120 may be controlled by a common control unit (640 of FIG. 6A or 6B) of the controller, and images displayed in the main display 140 or data related to the main display 140 may be controlled by control units (610*a* of FIG. 6A) of the controller. Further, the top display 120 may be a top display portion (210 of FIG. 4B) of a common display (200 of FIG. 4B).

Next, a character change process according to embodiments of the present invention will be described with reference to FIG. 25.

Figure 25:
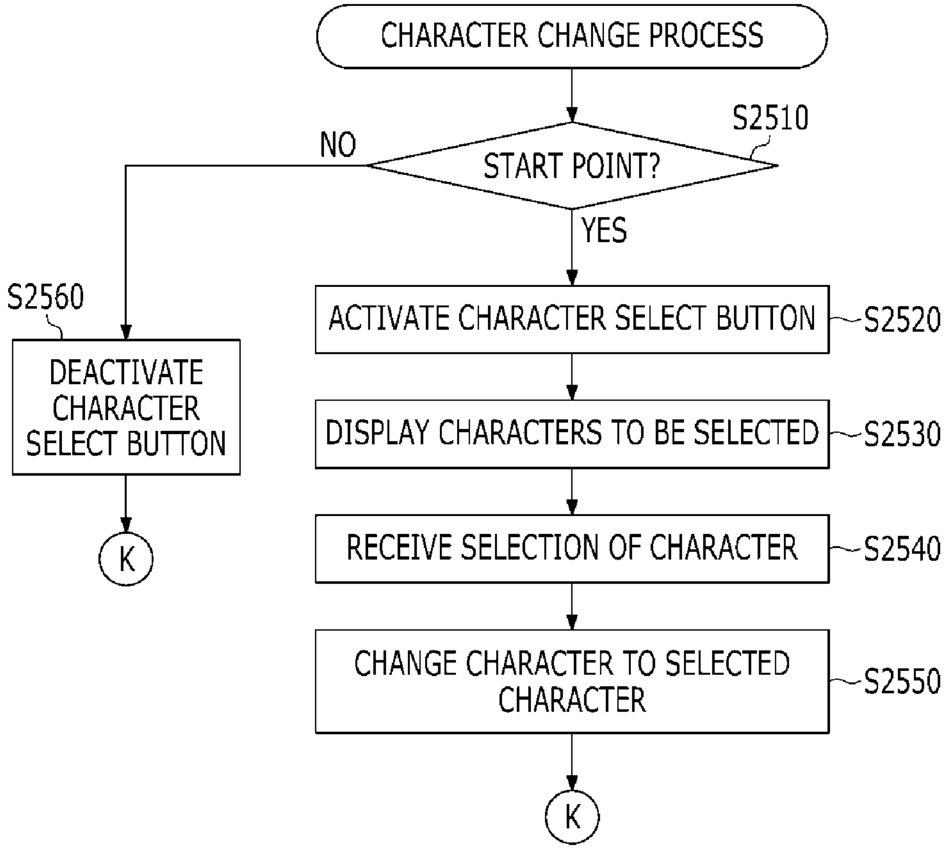
FIG. 25 is a flowchart of a character change process of a bonus game according to an embodiment of the present invention.

FIG. 25 is a flowchart of a character change process of a bonus game according to an embodiment of the present invention.

Referring to FIG. 25, when a character of the player locates at the start point of the map (S2510: YES), the controller of the gaming machine 100 activates a character select button (770 of FIG. 7A) of the main display 140 (S2520). The controller may be a control unit (610*a* of FIG. 6A). Further, the controller displays a plurality of characters in the main display (S2530), and waits for a selection of the player. If the player selects any one of the plurality of characters by touching an area representing a desired character in the main display 140 (S2540), the controller changes the character of the player to the selected character (S2550). Next, the controller performs a process that begins from the step S2215 of FIG. 22 or FIG. 23.

If the character does not locate at the start point (S2510: NO), the controller deactivates the character select button 770 of the main display 140 (S2560). Subsequently, the controller performs the process that begins from the step S2215 of FIG. 22 or FIG. 23.

Next, an expected value determining process according to embodiments of the present invention will be described with reference to FIG. 26 to FIG. 31.

Figure 26:
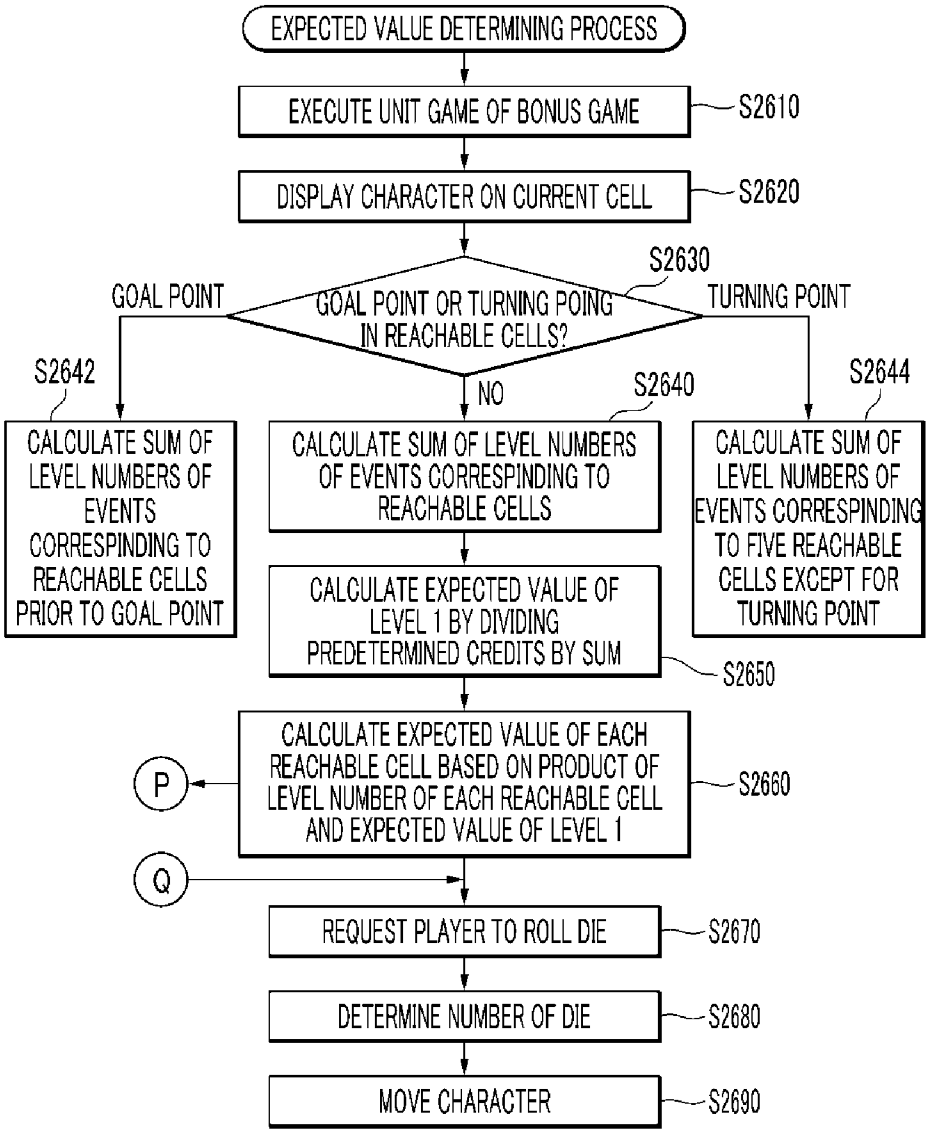
FIG. 26 is a flowchart of an expected value determining process according to an embodiment of the present invention.
Figure 27:
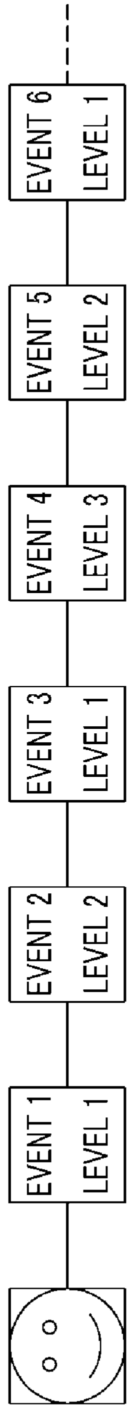
FIG. 27 shows an example of general reachable cells.
Figure 29:
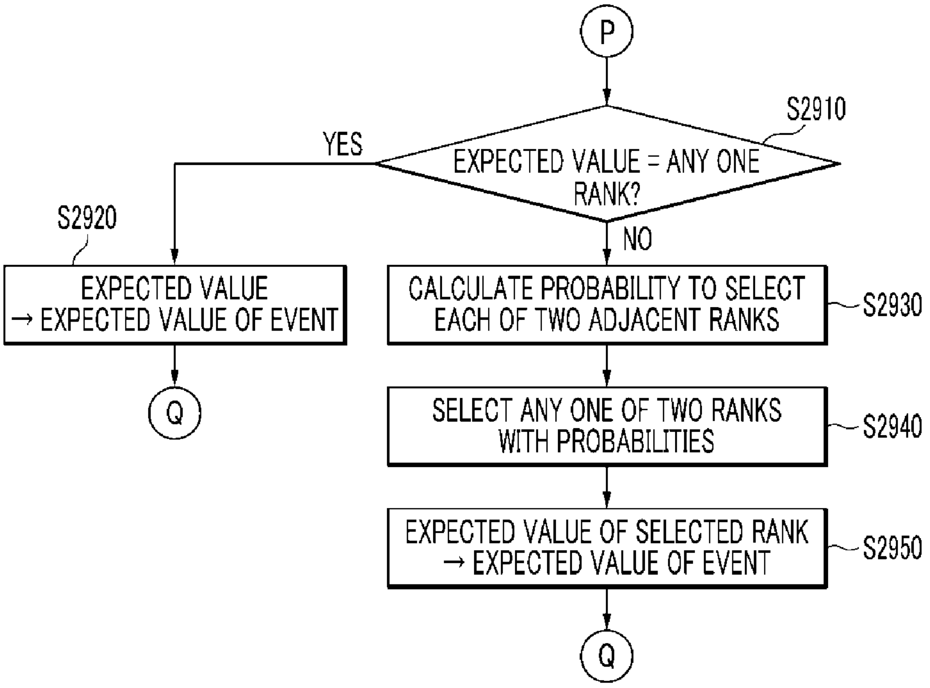
FIG. 29 is a flowchart of an expected value determining process according to another embodiment of the present invention.
Figure 30:
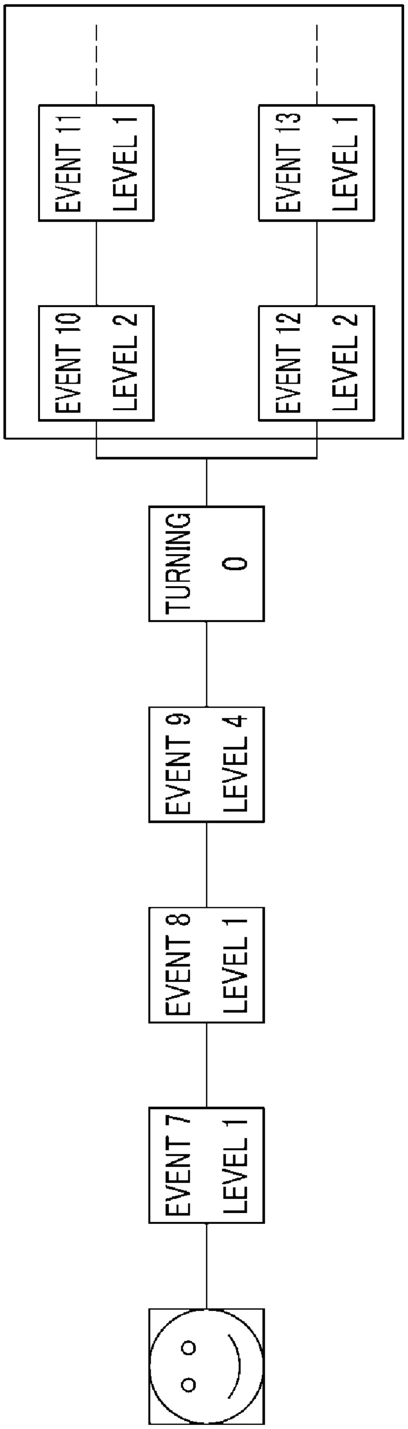
FIG. 30 shows an example of reachable cells including a goal point.
Figure 31:
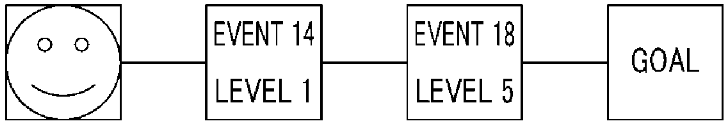
FIG. 31 shows an example of reachable cells including a turning point.

FIG. 26 is a flowchart of an expected value determining process according to an embodiment of the present invention, FIG. 27 shows an example of general reachable cells, FIG. 28 shows an example of data representing a relationship between a plurality of ranks and a plurality of expected values, FIG. 29 is a flowchart of an expected value determining process according to another embodiment of the present invention, FIG. 30 shows an example of reachable cells including a goal point, and FIG. 31 shows an example of reachable cells including a turning point.

Referring to FIG. 26, a controller of a gamine machine 100 or a gaming system 10 executes a unit game of a bonus game (S2610), and displays a character of the gaming machine 100 on a current cell of a map (S2620). The controller determines whether a turning point or a goal point exists in reachable cells of the character (S2630). That is, the controller determines whether six reachable cells from the current cell include the turning point or the goal point.

If the reachable cells do not include the turning point and the goal point, the controller distributes predetermined credits to the six reachable cells. In detail, the controller calculates a sum of level numbers of the events corresponding to the reachable cells (S2640), and calculates an expected value of a level 1 by dividing the predetermined credits by the sum (S2650). The controller determines the expected value of each reachable cell based on a product of the level number of the event corresponding to each reachable cell and the expected value of the level 1 (S2660). That is, the controller determines the expected value of each level based on a product of the level number of each level and the expected value of the level 1.

For example, as shown in FIG. 27, it is assumed that the predetermined credits are 780 credits and the six reachable cells that can be arrived from the current cell have an event of level 1, an event of level 2, an event of level 1, an event of level 3, an event of level 2, and an event of level 1. The sum of level numbers of the events is 10. The expected value of level 1 is 78 credits. Accordingly, the expected values of level 1, level 2, and level 3 are 78, 156, and 234 credits.

In the step S2660 of FIG. 26, the controller may use the product the level number of each event and the expected value of the level 1 as the expected value of each event. In this case, the expected value may have various values according to the sum of the level numbers. As the example of FIG. 27, since the expected value is 78, 156, or 234 credits, the award provided in each cell may not have an appropriate value.

In another embodiment, the controller may select any one of a plurality of expected values based on the product the level number of each event and the expected value of the level 1. This embodiment will be described with reference to FIG. 28 and FIG. 29.

A gaming machine 100 or a gaming system 10 stores data representing a plurality of ranks to which a plurality of expected values are allocated. The data may be stored to a memory in a table form, and the memory may be a RAM (612 of FIG. 6A or 642 of FIG. 6B) or a storage device (613 of FIG. 6A or 643 of FIG. 6B). For example, 16 ranks may be defined, and expected values allocated to the 16 ranks may be 30, 50, 75, 100, 150, 200, 250, 300, 350, 400, 500, 600, 700, and 1000, as shown in FIG. 28.

Referring to FIG. 29, a controller of the gaming machine 100 or the gaming system 10 compares the expected value of the event calculated in the step 2660 of FIG. 26 with the plurality of ranks (S2910). If the expected value of the event is equal to the expected value allocated to any one of the ranks (S2910: YES), the controller determines the expected value as a final expected value of the event (S2920).

If the expected value of the event is between two expected values allocated to two adjacent ranks (S2910: NO), the controller selects any one of the two adjacent ranks and determines the expected value of the selected rank as a final expected value of the event. In detail, the controller calculates a probability with which a rank #i of the two ranks is selected and a probability with which a rank #(i+1) of the two ranks is selected (S2930). The probability of the rank #i is calculated as Equation 1, and the probability of the rank #(i+1) is calculated as Equation 2.

$$\text{Probability of rank } \#i = (\text{expected value of rank } \#(i+1) - \text{expected value of event})/(\text{expected value of rank } \#(i+1) - \text{expected value of rank } \#i) \quad (1)$$

$$\text{Probability of rank } \#(i+1) = (\text{expected value of rank } \#i - \text{expected value of event})/(\text{expected value of rank } \#i - \text{expected value of rank } \#(i+1)) \quad (2)$$

Next, the controller randomly selects any one of the rank #i and the rank #(i+1) with the probabilities (S2940). At this time, the rank #i can be selected with the probability of Equation 1, and the rank #(i+1) can be selected with the probability of Equation 2. The controller determines the expected value of the selected rank as the final expected value of the event (S2950).

In the example of FIG. 27 and FIG. 28, since the expected value of level 2 is 156, the expected value of level 2 is between the rank #5 and the rank #6. Accordingly, in the event having level 2, the expected value can be determined as 150 credits with a probability of 88% (=(200−156)/(200−150)) and 200 credits with a probability of 12% (=(150−156)/(150−200)). Referring to FIG. 26 again, after determining the expected value of each reachable cell, the controller requests the player to roll a die displayed in a main display (140 of FIG. 3) (S2670). At this time, the controller may request the player to bet additional credits. If the player touches an area corresponding to a die image in the main display 140 or pushes a spin button (220 of FIG. 3), the controller randomly determines a number of the die (S2680). Next, the controller moves the character from the current cell to a destination cell according to the number of the die (S2690).

In the meantime, if the controller determines that the reachable cells include the goal point in the step S2630, the controller calculates a sum of level numbers of events corresponding to reachable cells that are located prior to the goal point (S2642). Subsequently, the controller performs a process of the steps S2650 and S2660.

For example, as shown in FIG. 30, it is assumed that the predetermined credits are 780 credits, the third cell from the current cell is the goal point, and two reachable cells that are located prior to the goal point have an event of level 1 and an event of level 5. The sum of level numbers of the events is 6. The expected value of level 1 is 130 credits. Accordingly, the expected values of level 1 and level 5 are 130 and 650 credits.

When the reachable cells include the goal point, the controller may also perform the process described with reference to FIG. 29.

Referring to FIG. 26 again, if the controller determines that the reachable cells include the turning point in the step S2630, the controller selects calculates a sum of level numbers of events corresponding to five reachable cells except for the turning point (S2644). Subsequently, the controller performs a process of the steps S2650 and S2660. In this case, if the reachable cells include one or more cells after the turning point, the controller selects any one of paths after the turning point, and calculates the sum using reachable cells prior to the turning point and the one or more cells located on the selected path.

For example, as shown in FIG. 31, it is assumed that the predetermined credits are 780 credits and the fourth cell from the current cell is the turning point. Further, it is assumed that three reachable cells that are located prior to the turning point have an event of level 1, an event of level 1 and an event of level 4, and two reachable cells that are located on one path after the turning point have an event of level 2 and an event of level 1. The sum of level numbers of the events is 9. The expected value of level 1 is 86.7 credits. Accordingly, the expected values of level 1, level 2 and level 4 are 86.7, 173.3 and 346.7 credits. At this time, a sum of level numbers of the two reachable cells may equal to a sum of level numbers of the two reachable cells on the one path. Alternatively, two reachable cells on the other path may have the same levels as the two reachable cells on the one path.

When the reachable cells include the turning point, the controller may also perform the process described with reference to FIG. 29.

As described above, according to embodiments of the present invention, since the predetermined credits are distributed to six reachable cells each time the unit game is executed, an expected value of an award provided in the unit game can be maintained at a uniform value. Accordingly, the gaming machine or the gaming system can prevent the player from increasing a bet amount in a unit game that can provide a greater award.

Next, a process for determining a level of a cell after a turning point will be describe with reference to FIG. 32 to FIG. 34E.

Figure 32:
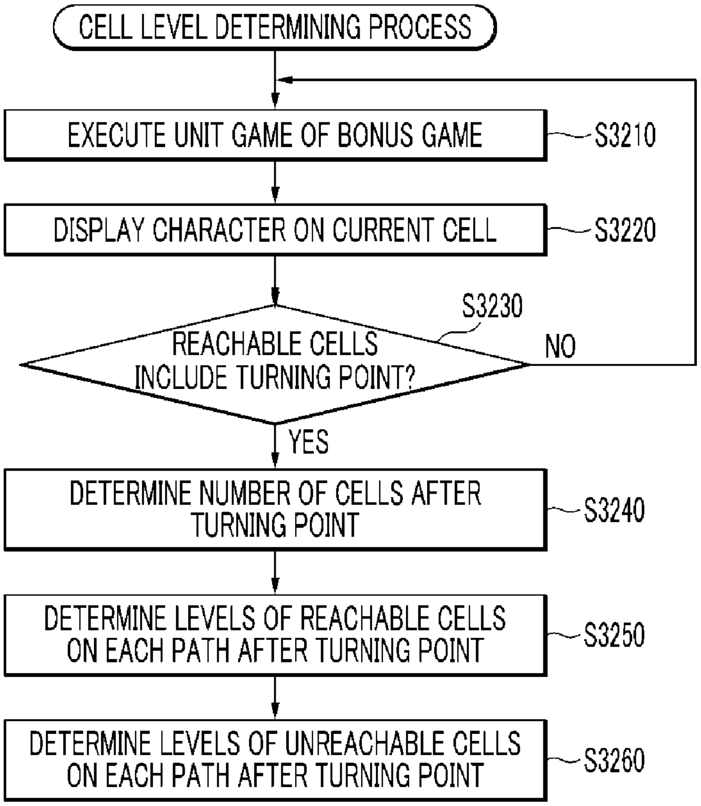
FIG. 32 is a flow chart of a level determining process after a turning point according to an embodiment of the present invention.

FIG. 32 is a flow chart of a level determining process after a turning point according to an embodiment of the present invention, FIG. 33A to FIG. 33E show examples of cases according to a position of turning point, and FIG. 34A to FIG. 34E show examples of event tables for cases shown in FIG. 33A to FIG. 33E.

Referring to FIG. 32, a controller of a gaming machine 100 or a gaming system 10 executes a unit game of a bonus game (S3210), and displays a character of the gaming machine 100 on a current cell of a map (S3220). The controller determines whether reachable cells of the character include a turning point (S3230).

If the reachable cells include the turning point (S3230: YES), the controller determines the number of reachable cells after the turning point in the unit game (S3240). Subsequently, the controller determines levels (i.e., events having the levels) of the reachable cells on each of paths after the turning point (S3250) and determines levels (i.e., events having the levels) of unreachable cells on each path (S3260). The unreachable cells are cells that cannot be arrived from the current cell in the unit game.

At this time, the controller may determine the levels of each path such that a sum of level numbers of the reachable cells on one path is equal to a sum of level numbers of the reachable cells on the other path. Accordingly, an expected value of an award provided in the unit game can be maintained at a uniform value.

Further, the controller may determine the levels of the reachable cells and the levels of the unreachable cells on each path based on a characteristic of each path. That is, the controller may determine the levels of the reachable cells and the levels of the unreachable cells on a path for a bumpy road (a bumpy path) such that one or more events for a big credit award and one or more events for a small credit award are mixed together. The controller may determine the levels of the reachable cells and the levels of the unreachable cells on a path for a steady road (a steady path) such that events for steady amount of credit awards exist.

For example, as shown in FIG. 33A to FIG. 33E and FIG. 34A to FIG. 34E, assuming that five cells exists on a path after the turning point, five cases exist.

Figure 33A:
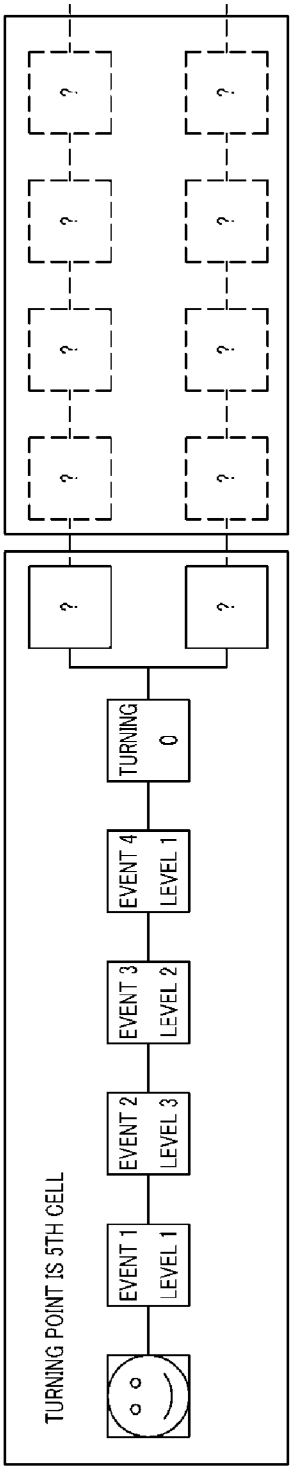
FIG. 33A to FIG. 33E show examples of cases according to a position of turning point.
Figure 33B:
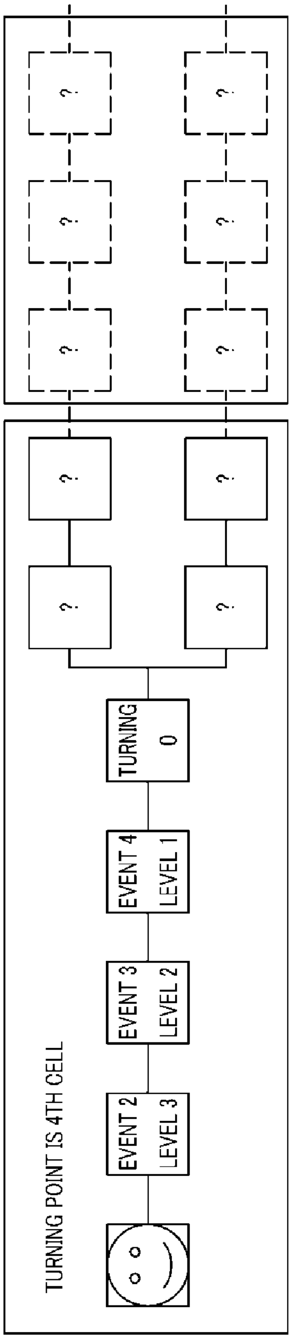
Figure 33C:
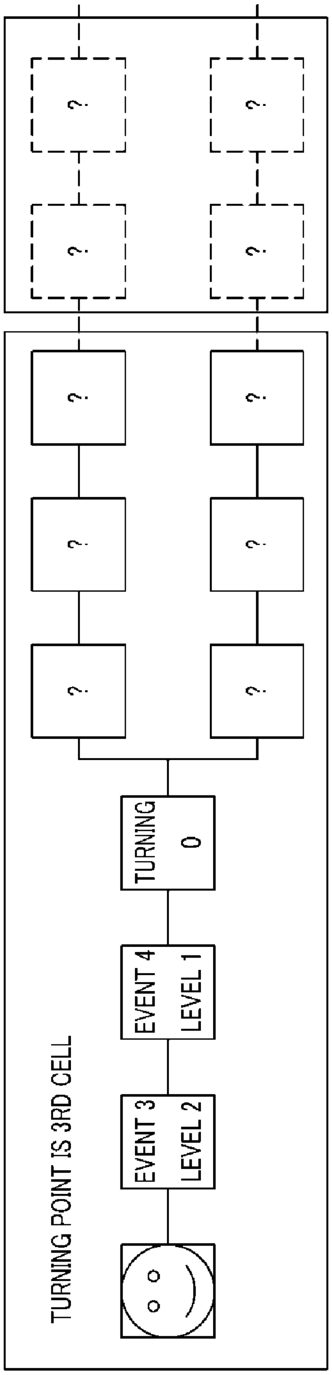
Figure 33D:
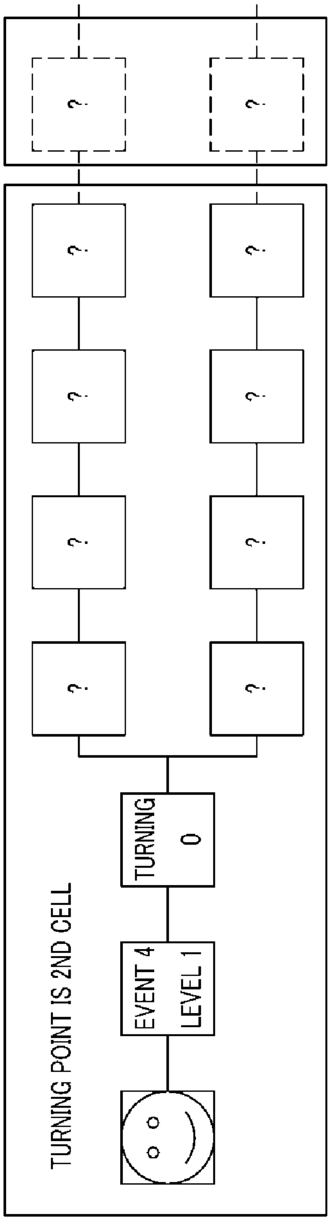
Figure 33E:
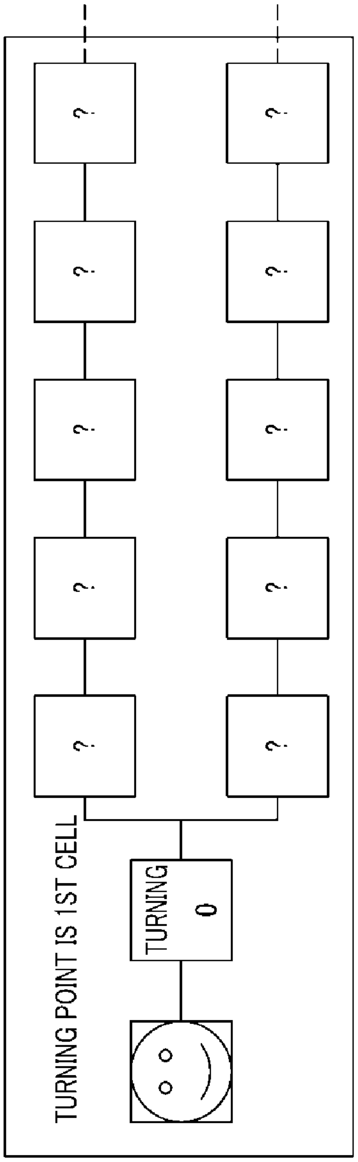

In a case 1, as shown in FIG. 33A, the turning point is the fifth cell from the current cell, and one reachable cell and fourth unreachable cells exist on each path. In a case 2, as shown in FIG. 33B, the turning point is the fourth cell from the current cell, and two reachable cells and three unreachable cells exist on each path. In a case 3, as shown in FIG. 33C, the turning point is the third cell from the current cell, and three reachable cells and two unreachable cells exist on each path. In a case 4, as shown in FIG. 33D, the turning point is the second cell from the current cell, and four reachable cells and one unreachable cell exist on each path. In a case 5, as shown in FIG. 33E, the turning point is the first cell from the current cell, and fifth reachable cells exist on each path.

Further, tables representing possible events of reachable cells and unreachable cells for five cases of each turning point are stored in a memory, for example a RAM (612 of FIG. 6A or 642 of FIG. 6B) or a storage device (613 of FIG. 6A or 643 of FIG. 6B).

For example, a table for one reachable cell and a table for four unreachable cells of the case 1 may include events as shown in FIG. 34A. A table for two reachable cells and a table for three unreachable cells of the case 2 may include events as shown in FIG. 34B. A table for three reachable cells and a table for two unreachable cells of the case 3 may include events as shown in FIG. 34C. A table for four reachable cells and a table for one unreachable cell of the case 4 may include events as shown in FIG. 34D. A table for five reachable cells and a table for no unreachable cell of the case 5 may include events as shown in FIG. 34E. At this time, levels of the events included in the table for the reachable cell(s) and the table for the unreachable cell(s) of each path are set to represent the characteristic of each path. Accordingly, the controller may determine an event of a reachable cell on the bumpy path and an event of a reachable cell on the steady path by randomly draw an event from the tables for the reachable cell(s) and the unreachable cell(s) of each path. For example, in the bumpy path of the case 3, the first cell, the second cell and the third cell of reachable cells may be event 9, event 10 and event 6, and the first cell and the second cell of unreachable cells may be event 8 and event 7. In the steady path of the case 3, the first cell, the second cell and the third cell of reachable cells may be event 11, event 13 and event 12, and the first cell and the second cell of unreachable cells may be event 14 and event 15.

As described above, according to an embodiment of the present invention, when the reachable cells of the current cell include the turning point, levels of reachable cells on each path are determined before the number of die is determined. Accordingly, although the reachable cells of the current cell include the turning point, an expected value of an award provided in the unit game can be maintained at a uniform value and the characteristic of each path can be reflected to the events of each path.

According to another embodiment of the present invention, a versus event is randomly triggered while the player plays the base game. The versus event is an event in which players of adjacent gaming machines compete with each other to obtain an award. Next, the versus event according to another embodiment of the present invention will described with reference to FIG. 35 to FIG. 37C.

Figure 35:
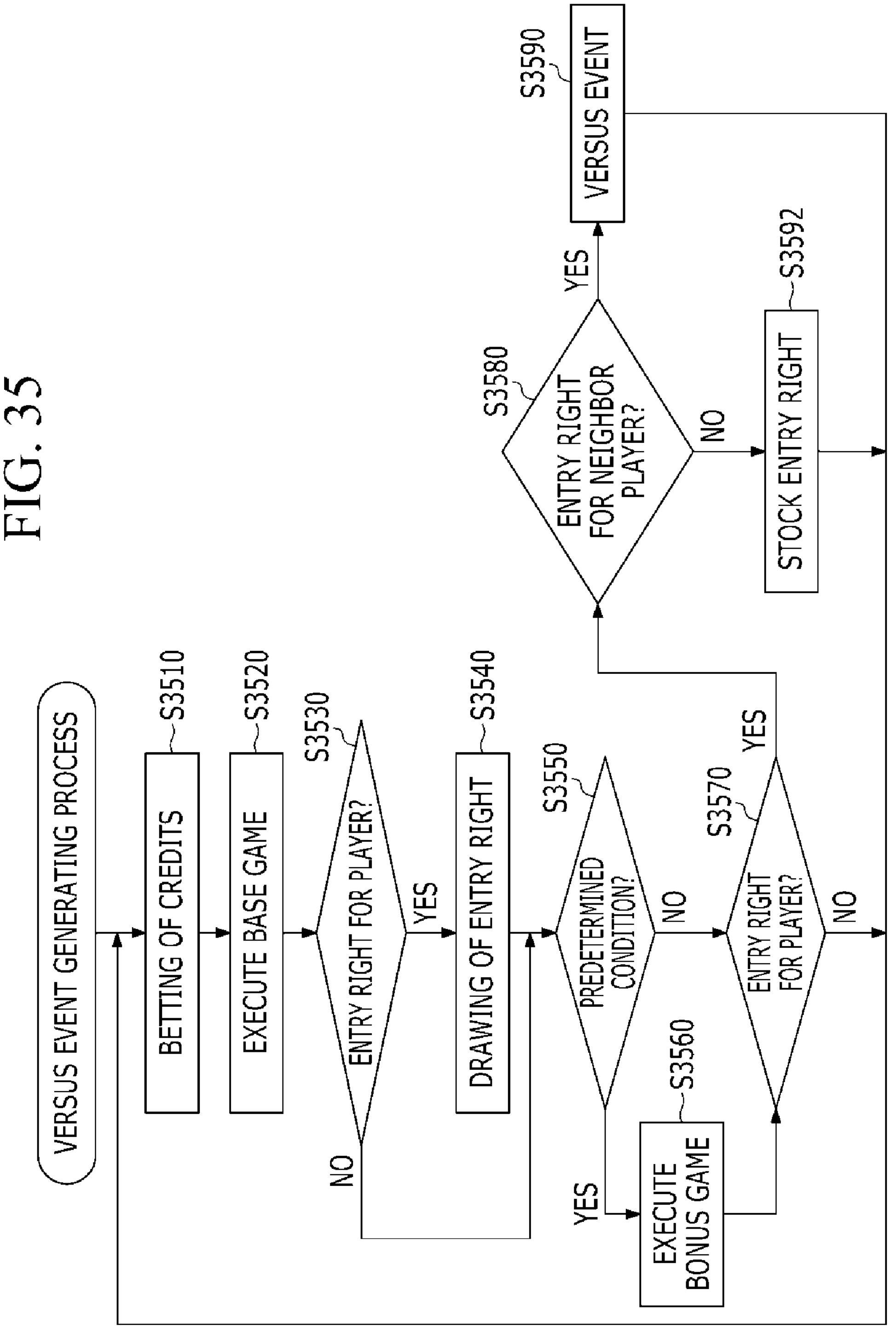
FIG. 35 is a flowchart of a versus event generating process in a gaming machine according to another embodiment of the present invention.
Figure 36A:
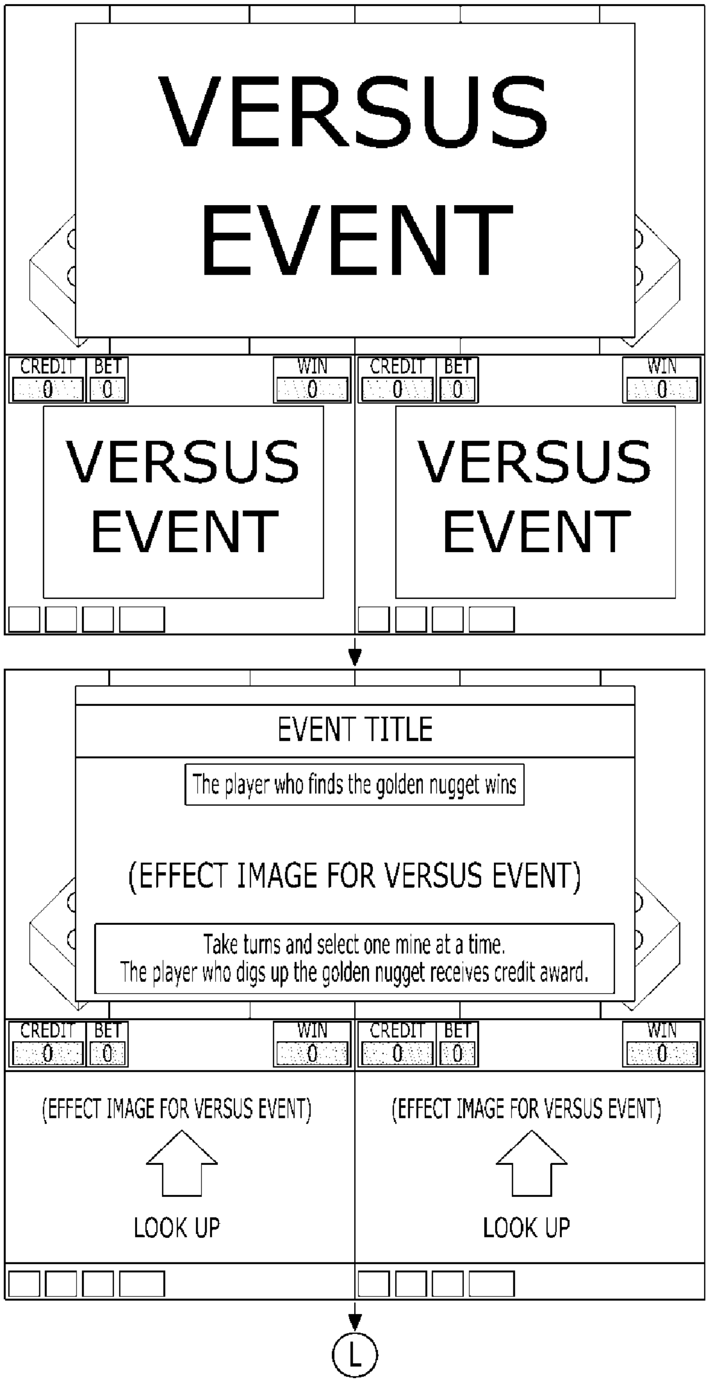
FIG. 36A and FIG. 36B show an example of a versus event according to another embodiment of the present invention.
Figure 36B:
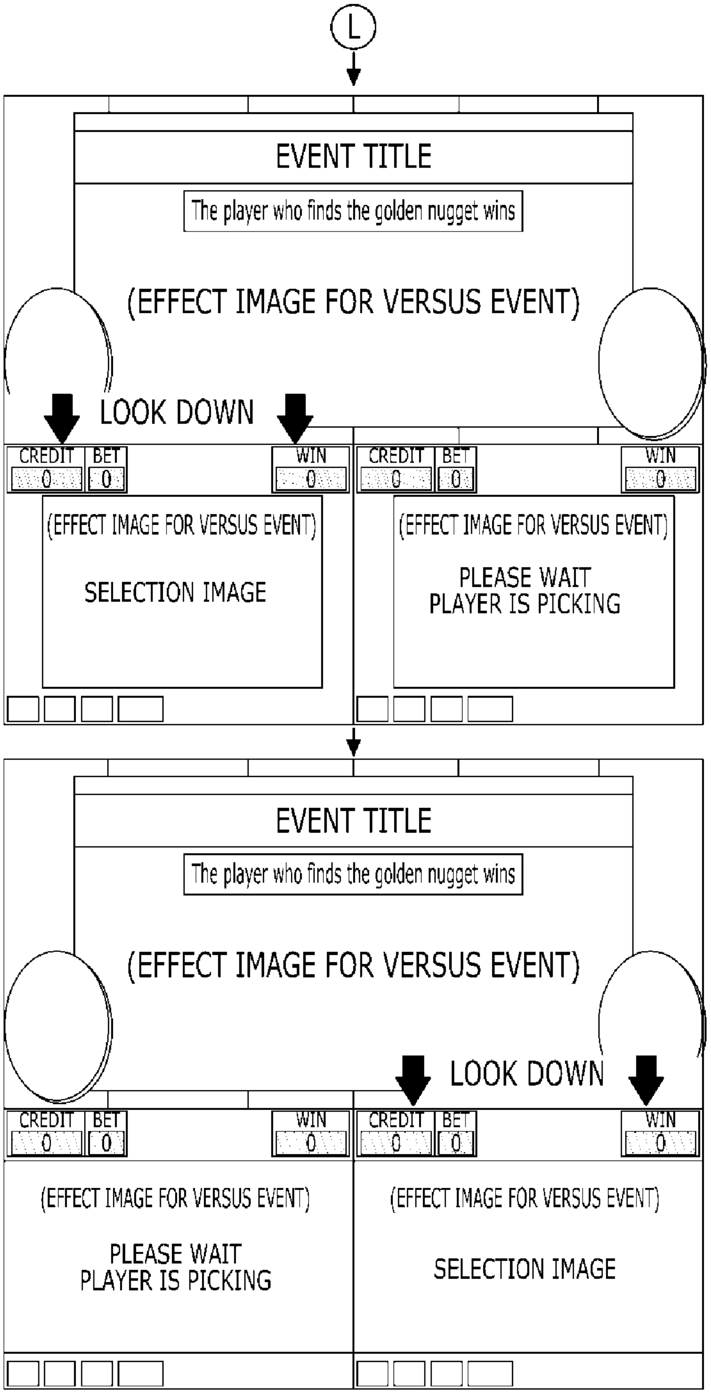

FIG. 35 is a flowchart of a versus event generating process in a gaming machine according to another embodiment of the present invention, and FIG. 36A and FIG. 36B show an example of the versus event according to another embodiment of the present invention.

Referring to FIG. 35, the player of a gaming machine 100 bets credits to play a base game (S3510), and executes the base game (S3520). That is, a controller of the gaming machine 100 executes the base game to scroll video reels (711 to 715 of FIG. 7A).

When the base game is executed, the controller determines whether the entry right for the player is stored to a memory. The memory may be a RAM (612 or 642 of FIG. 6A or 6B) or a storage device (613 or 643 of FIG. 6A or 6B). That is, the controller determines whether the player has an entry right for entering the versus event. In one embodiment, a versus event flag may be stored in a memory of the gaming machine 100. The versus event flag may be set to "ON" when the player of the gaming machine 100 has the entry right. The versus event flag may be set to "OFF" when the player of the gaming machine 100 does not have the entry right.

If the entry right for the player is not stored (S3530: NO), the controller performs drawing of the entry right for the player (S3540). In one embodiment, the drawing of the entry right may be performed (S3540) when executing the base game. In another embodiment, the drawing of the entry right may be performed (S3540) after betting credits and before executing the base game. In yet another embodiment, the drawing of the entry right may be performed (S3540) when the base game ends.

If a result of the base game satisfies a predetermined condition (S3550: YES), the controller executes a bonus game (S3560).

After the bonus game ends or if the result of the base game does not satisfy the predetermined condition (S3550: NO), the controller determines whether the player has the entry right (S3570). If the player has the entry right (S3570: YES), the controller determines whether a neighbor player of a neighbor gaming machine has the entry right for entering the versus event (S3580). If the neighbor player has the entry right (S3580: YES) when the player has the entry right, the controller triggers the versus event (S3590). That is, if the versus event flag for the player and the versus event flag for the neighbor player are set to "ON", the controller triggers the versus event. After the versus event ends, the player can start another base game.

If the neighbor player does not have the entry right (S3580: NO), the controller does not trigger the versus event and stocks the entry right of the player to a memory (S3592). Further, if the player does not have the entry right (S3570: NO), the controller does not trigger the versus event. If the versus event is not triggered, the player can start another base game.

When the versus event is triggered, a common display (200 of FIG. 4) displays an image for notifying the versus event as shown in FIG. 36A. Further, main displays (140 and 140*a* of FIG. 4) of the gaming machine 100 and the neighbor gaming machine 100*a* display the image for notifying the versus event. In an embodiment, images displayed in the common display 200 or data related to the common display 200 may be controlled by a common control unit (640 of FIG. 6B) of the controller(s), and images displayed in the main displays 140 and 140*a* or data related to the main displays 140 and 140*a* may be controlled by control units (610*a* of FIG. 6A) of the controllers.

Next, the common display 200 displays an effect image of the versus event and an image or a text for informing rules of the versus event. Further, the main displays 140 and 140*a* display an effect image of the versus event and an image for indicating "LOOK UP".

Next, as shown in FIG. 36B, the main display 140 of the gaming machine 100 displays an image for selecting any one among a plurality of options, and the main display 140*a* of the neighbor gaming machine 100*a* displays an image for instructing the neighbor player to wait.

After the player of the gaming machine 100 selects any one of the plurality of options, the main display 140*a* of the neighbor gaming machine 100*a* displays an image for selecting any one among a plurality of options, and the main display 140 of the gaming machine 100 displays the image for instructing the player to wait.

As such, the player and the neighbor player can competitively select options, and then can receive or cannot receive an award according to the selected result.

Figure 37A:
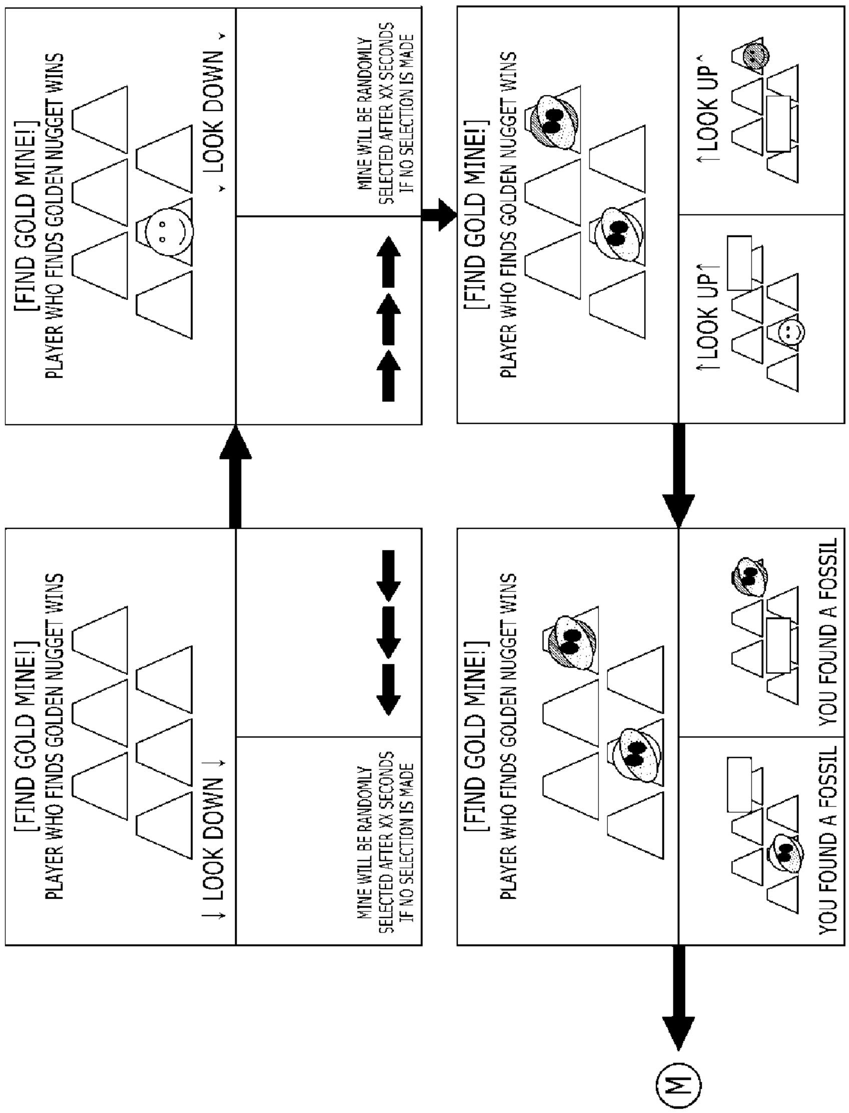
FIG. 37A, FIG. 37B, and FIG. 37C show another example of the versus event according to another embodiment of the present invention.
Figure 37B:
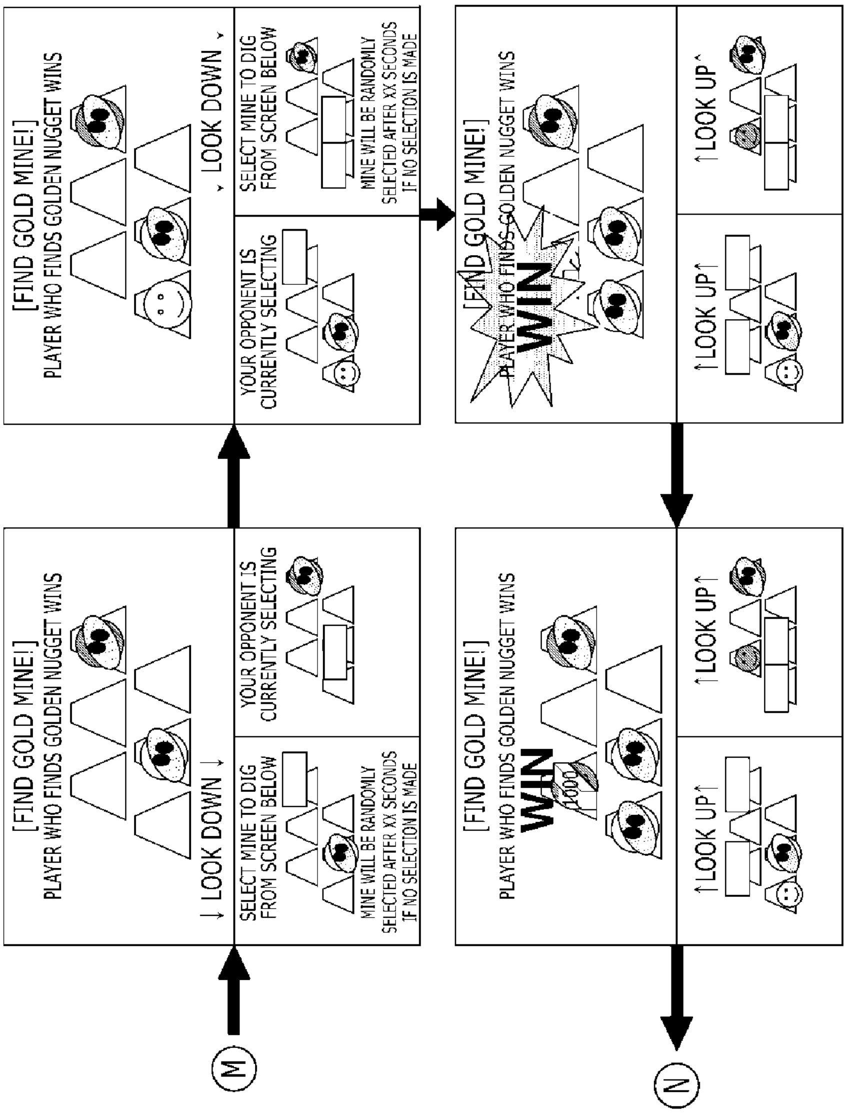
Figure 37C:
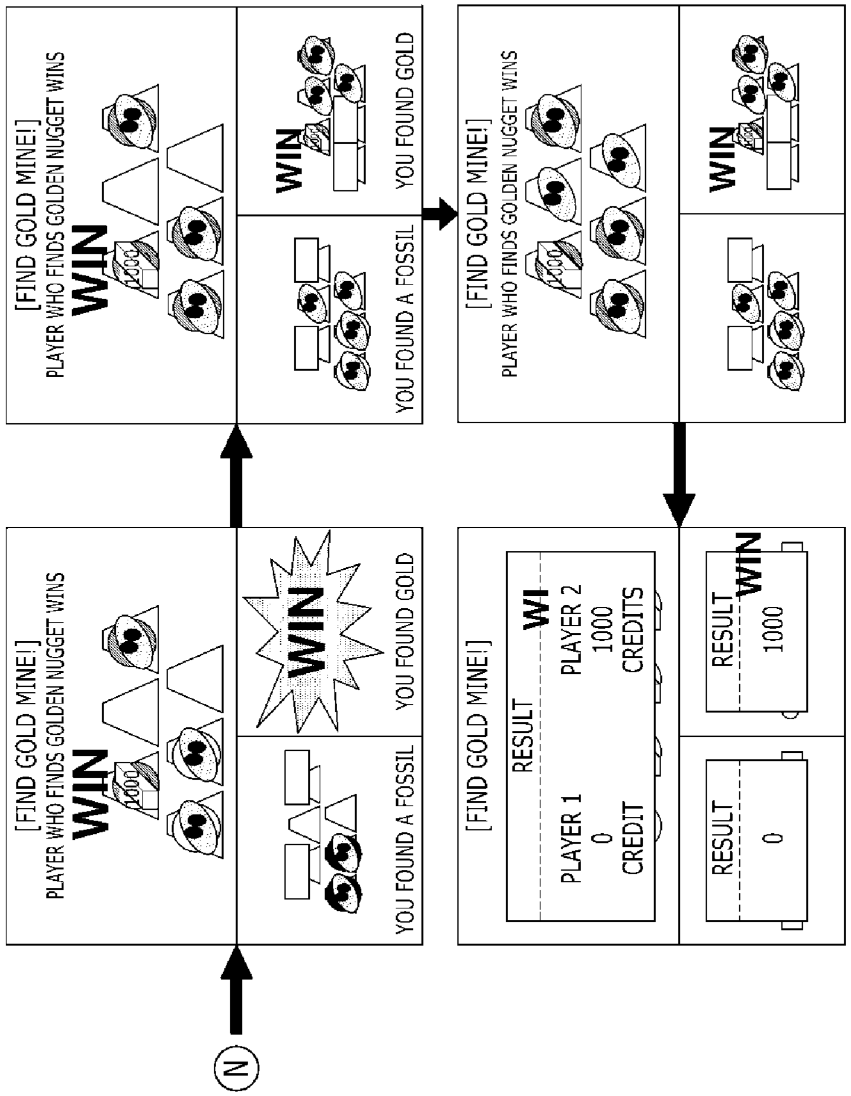

Next, an example of the versus event will be described with reference to FIG. 37A to FIG. 37C. FIG. 37A, FIG. 37B, and FIG. 37C show another example of the versus event according to another embodiment of the present invention. The example of the versus event is an event for finding a gold mine among a plurality of mines.

As shown in FIG. 37A, a player 1 of the gaming machine 100 selects any one of the plurality of mines on the main display 140, and a player 2 of the neighbor gaming machine 100*a* waits while the player 1 is selecting any one mine. After the player 1 selects any one mine, the player 2 selects any one of the plurality of mines on the main display 140*a*. At this time, the player 1 waits while the player 2 is selecting any one mine, and the mine selected by the player 1 cannot be selected among the plurality of mines.

If the player 1 and the player 2 select the mines, the common display 200 displays contents of the selected mines. In this case, the two players 1 and 2 have selected fossil mines not the gold mine. Further, the main display 140 displays the content of the mine selected by the player 1, and the main display 140*a* displays the content of the mine selected by the player 2.

Next, as shown in FIG. 37B, the player 1 and the player 2 select any one of the plurality of mines except for the selected mines again. If the player 2 has selected the gold mine, the common display 200 displays an image (for example, "WIN") for representing that the player 2 has selected the gold mine, and then displays a credit value of the gold mine on the mine selected by the player 2.

Next, as shown in FIG. 37C, the main displays 140*a* displays an image (for example, "WIN") for representing that the player 2 has selected the gold mine, and then displays a credit value of the gold mine on the mine selected by the player 2. Subsequently, the common display 200 and the main displays 140 and 140*a* display contents of non-selected mines. Next, the common display 200 displays results of the players 1 and 2, the main display 140 displays a result of the player 1, and the main display 140*a* display a result of the layer 2 so that the versus event ends.

As described above, according to another embodiment of the present invention, players of adjacent gaming machines can competitively play a game such that players' interest can be increased by the competitive game.

Next, a win display section (760 of FIG. 7A) displayed in a main display (140 of FIG. 3) of the gaming machine 100 will be described with reference to FIG. 38 to FIG. 40.

Figure 38:
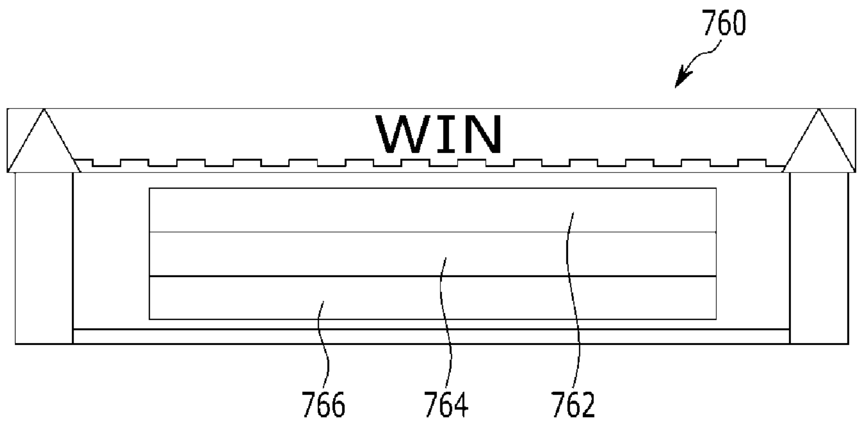
FIG. 38 shows a picture of a win display section according to an embodiment of the present invention.

FIG. 38 shows a picture of a win display section according to an embodiment of the present invention.

A win display section 760 displays details of an award when the award is provided to a player according to a result of a game. Referring to FIG. 38, the win display section 760 includes a win credit display section 762, a detail display section 762, and a total display section 766.

The win credit display section 762 displays win credits of the player, i.e., credits of the award provided to the player according to the result of the game. The game may a base game, a bonus game, or a versus event. A credit value of the credits (for example, 12345678) may be displayed in an upper portion of the win credit display section 762, and an amount of money (for example, $123,456.78) corresponding to the credits may be displayed in a lower portion of the win credit display section 762.

The detail display section 762 displays whether the award is an award of the base game, an award of the bonus game, or an award of the versus event. For example, the detail display section 762 may display "LINE xx WIN=12345678" in the award of the base game, "BONUS WIN=12345678" in the award of the bonus game, and "VERSUS EVENT=12345678" in the award of the versus event. In "LINE xx WIN=12345678", "xx" denotes a number of a pay line shown in FIG. 7B and FIG. 7C.

The total display section 766 displays total credits of the detail display section 762. For example, the total display section 766 may display "TOTAL WIN=12345678".

In the win display section 760, a value of the credits is smoothly incremented (i.e., counted up) from an initial value to a target value.

In one embodiment, a controller of the gaming machine 100 controls a speed for incrementing the value of the credits by one count based on the number of remaining counts. The one count may correspond to predetermined credits. At this time, the controller may control a speed for incrementing the value of the credits by one count referring to a table shown in FIG. 39. FIG. 39 shows an example of a table representing a relationship between the speed for increment by one count and the number of remaining counts. In FIG. 39, the speed for increment is inversely proportional to the number of remaining counts. For example, the controller may increment the value of the credits by one count during about 1.20 sec when the number of remaining counts is 5.

When the number of remaining counts is equal to or greater than an upper limit (for example, 101), the controller subtracts a predetermined number (for example, 60) from the number of remaining counts to switch the number of remaining counts. The controller increments the value of the credits based on the switched number of remaining counts and the predetermined number. For example, assuming that the number of remaining counts is 110, the controller switch 110 to 50 (=110−60), increments the value of credits by 60 counts, and then increments the value of credits by 50.

In another embodiment, a controller of the gaming machine 100 controls a speed for incrementing the value of the credits based on a relationship between the award and a magnitude of a BET. At this time, the controller may control the speed for incrementing the value of the credits referring to a table shown in FIG. 40. FIG. 40 shows an example of a table representing a relationship between the speed for incrementing the value of the credits and times between the award and the BET magnitude. In FIG. 40, the speed for increment is proportional to an amount of times. For example, the controller may increment the value of the credits during 10 sec when the award is 10 times of the BET magnitude.

Embodiments of the present invention can also be embodied as a computer readable program on a computer-readable recording medium. The computer readable recording medium is any data storage device that can store data that can be read thereafter by a computer. Examples of the computer readable recording medium include ROMs, RAMs, CD-ROMs, magnetic tapes, floppy disks, and optical data storage devices. The computer readable recording medium can also be distributed over a network coupled computer system so that the computer readable code is stored and executed in a distributed fashion.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A gaming machine, comprising: a first display configured to display a base game image in a base game and to display a bonus game image in a bonus game; a second display configured to display a map including a plurality of cells that form a course on which a character of a player moves in the bonus game; and a controller configured to execute the base game, to trigger the bonus game including a plurality of unit games when a result of the base game satisfies a predetermined condition, to determine reachable cells of the character in each unit game of the bonus game, the reachable cells being cells at which the character can arrive from the current cell among the plurality of cells, in each unit game, to determine an expected value of an award provided in each reachable cell of a current unit game by distributing predetermined credits to the reachable cells of the current unit game based on a number of the reachable cells of the current unit game and events corresponding to the reachable cells of the current unit game, to determine a number of cells by which the character moves along with the course in each unit game, to move the character to any one of the reachable cells according to the number of cells in each unit game, to determine an award to be provided to the player according to the expected value of a cell at which the character arrives in each unit game;

wherein, when each of the reachable cells corresponds to any one of a plurality of events having respective levels, and the controller is configured to calculate a sum of the levels of the events corresponding to the reachable cells, to calculate an expected value of a level one by dividing the predetermined credits by the sum, and to determine the expected value of each reachable cell based on a product of the level of the event corresponding to each reachable cell and the expected value of the level one;

comprising a memory configured to store data representing a plurality of ranks to which a plurality of expected values are respectively allocated, and wherein the controller is configured to determine the product as the expected value of each reachable cell if the product is equal to any one of the plurality of expected values allocated to the plurality of ranks, and to determine any one of a first expected value and a second expected value as the expected value of each reachable cell if the product is between the first and second expected values allocated to two adjacent ranks among the plurality of ranks, and wherein the controller is configured to determine the first expected value as the expected value of each reachable cell with a probability corresponding to a difference between the second expected value and the product divided by a difference between the second expected value and the first expected value, and to determine the second expected value as the expected value of each reachable cell with a probability corresponding to a difference between the first expected value and the product divided by a difference between the first expected value and the second expected value.

2. The gaming machine of claim 1, wherein, when the reachable cells include a goal cell corresponding to a goal point of the course and each of reachable cells prior to the goal cell corresponds to any one of a plurality of events having respective levels, the controller is further configured to calculate a sum of the levels of the events corresponding to the reachable cells prior to the goal cell, to calculate an expected value of a level one by dividing the predetermined credits by the sum, and to determine the expected value of each reachable cell prior to the goal cell based on a product of the level of the event corresponding to each reachable cell and the expected value of the level one.

3. The gaming machine of claim 1, wherein, when the reachable cells include a turning cell corresponding to a turning point having a plurality of paths including a first path and a second path to be selected by the player, the controller is further configured to determine any one of a plurality of events having respective levels be allocated to a reachable cell on the first path, and to determine any one of the plurality of events to be allocated to a reachable cell on the second path.

4. The gaming machine of claim 3, wherein the controller is further configured to calculate a sum of the levels of the events corresponding to reachable cells that is prior to the turning cell or is located on any one of the plurality of paths, to calculate an expected value of a level one by dividing the predetermined credits by the sum, and to determine the expected value of each reachable cell based on a product of the level of the event corresponding to each reachable cell and the expected value of the level one.

5. The gaming machine of claim 4, wherein a sum of the levels of the events corresponding to the reachable cells on the first path is equal to a sum of the levels of the events corresponding to the reachable cells on the second path.

6. The gaming machine of claim 3, wherein the controller is further configured to determine any one of the plurality of events to be allocated to a cell on the first path that does not belong to the reachable cells, and to determine any one of the plurality of events to be allocated to a cell on the second path that does not belong to the reachable cells.

7. The gaming machine of claim 1, wherein the controller is further configured to display a die in the first display each time the unit game is executed, to determine a face of the die that is uppermost according to an input of the player, and to determine a number in the face of the die as the number of cells by which the character moves.

8. A gaming system, comprising: a plurality of main displays for a plurality of players, each main display configured to display a bonus game image in the bonus game including a plurality of unit games;

a common display installed on the main displays, and configured to display maps for the players, wherein each map includes a plurality of cells that form a course on which a character of a corresponding player moves in the bonus game;

a controller configured to determine reachable cells of the character in each unit game of the bonus game, the reachable cells being cells at which the character can arrive from the current cell among the plurality of cells, in each unit game, to determine an expected value of an award provided in each reachable cell of a current unit game by distributing predetermined credits to the reachable cells of the current unit game based on a number of the reachable cells of the current unit game and events corresponding to the reachable cells of the current unit game to determine a number of cells by which the character moves along with the course in each unit game, to move the character to any one of the reachable cells according to the number of cells in each unit game, to determine an award to be provided to the player according to the expected value of a cell at which the character arrives in each unit game; and wherein the controller is further configured to calculate a sum of the levels of the events corresponding to the reachable cells, to calculate an expected value of a level one by dividing the predetermined credits by the sum, and to determine the expected value of each reachable cell based on a product of the level of the event corresponding to each reachable cell and the expected value of the level one; and wherein the controller is configured to determine the product as the expected value of each reachable cell if the product is equal to any one of a plurality of expected values that are respectively allocated to a plurality of ranks, and to determine any one of a first expected value and a second expected value as the expected value of each reachable cell if the product is between the first and second expected values allocated to two adjacent ranks among the plurality of ranks; and wherein the controller is configured to determine the first expected value as the expected value of each reachable cell with a probability corresponding to a difference between the second expected value and the product divided by a difference between the second expected value and the first expected value, and to determine the second expected value as the expected value of each reachable cell with a probability corresponding to a difference between the first expected value and the product divided by a difference between the first expected value and the second expected value.

9. The gaming system of claim 8, wherein, when the reachable cells include a turning cell corresponding to a turning point having a plurality of paths including a first path and a second path to be selected by the player, the controller is further configured to determine any one of a plurality of events having respective levels be allocated to a reachable cell on the first path, to determine any one of the plurality of events to be allocated to a reachable cell on the second path, to determine any one of the plurality of events to be allocated to a cell on the first path that does not belong to the reachable cells, and to determine any one of the plurality of events to be allocated to a cell on the second path that does not belong to the reachable cells.

10. The gaming machine of claim 9, wherein a sum of the levels of the events corresponding to the reachable cells on the first path is equal to a sum of the levels of the events corresponding to the reachable cells on the second path.

11. A gaming method of a gaming machine including a first display and a second display, the method comprising: displaying a base game image on the first display in a base game; executing the base game; triggering a bonus game including a plurality of unit games when a result of the base game satisfies a predetermined condition; displaying a map for a player on the second display in the bonus game, wherein the map includes a plurality of cells that form a course on which a character of the player moves; determining reachable cells of the character in each unit game of the bonus game, the reachable cells being cells at which the character can arrive from the current cell among the plurality of cells;

in each unit game, determining an expected value of an award provided in each reachable cell of a current unit game by distributing predetermined credits to the reachable cells of the current unit game based on a number of the reachable cells of the current unit game and events corresponding to the reachable cells of the current unit game;

determining a number of cells by which the character moves along with the course in each unit game; moving the character to any one of the reachable cells according to the number of cells in each unit game; and determining an award to provided to the player according to the expected value of a cell at which the character arrives in each unit game; and wherein determining the expected value comprises:

calculating a sum of the levels of the events corresponding to the reachable cells; calculating an expected value of a level one by dividing the predetermined credits by the sum; and determining the expected value of each reachable cell based on a product of the level of the event corresponding to each reachable cell and the expected value of the level one; and wherein determining the expected value of each reachable cell comprises:

determining the product as the expected value of each reachable cell if the product is equal to any one of a plurality of expected values that are respectively allocated to a plurality of ranks; and determining any one of a first expected value and a second expected value as the expected value of each reachable cell if the product is between the first and second expected values allocated to two adjacent ranks among the plurality of ranks; and wherein determining any one of the first expected value and the second expected value comprises: determining the first expected value as the expected value of each reachable cell with a probability corresponding to a difference between the second expected value and the product divided by a difference between the second expected value and the first expected value; and determining the second expected value as the expected value of each reachable cell with a probability corresponding to a difference between the first expected value and the product divided by a difference between the first expected value and the second expected value.

* * * * *